US012117523B2

(12) United States Patent
Prabhakar et al.

(10) Patent No.: US 12,117,523 B2
(45) Date of Patent: Oct. 15, 2024

(54) SYSTEM AND METHOD FOR GENERATING PANORAMIC ACOUSTIC IMAGES AND VIRTUALIZING ACOUSTIC IMAGING DEVICES BY SEGMENTATION

(71) Applicant: Fluke Corporation, Everett, WA (US)

(72) Inventors: Dileepa Prabhakar, Edmonds, WA (US); Michael D. Stuart, Issaquah, WA (US)

(73) Assignee: Fluke Corporation, Everett, WA (US)

( * ) Notice: Subject to any disclaimer, the term of this patent is extended or adjusted under 35 U.S.C. 154(b) by 407 days.

(21) Appl. No.: 17/472,442

(22) Filed: Sep. 10, 2021

(65) Prior Publication Data

US 2022/0082692 A1  Mar. 17, 2022

Related U.S. Application Data

(60) Provisional application No. 63/077,449, filed on Sep. 11, 2020, provisional application No. 63/077,441, filed on Sep. 11, 2020.

(51) Int. Cl.
*G01S 15/89* (2006.01)
*G01S 15/42* (2006.01)
*G06T 7/11* (2017.01)

(52) U.S. Cl.
CPC .......... *G01S 15/8925* (2013.01); *G01S 15/42* (2013.01); *G06T 7/11* (2017.01)

(58) Field of Classification Search
CPC .... G01S 15/00; G01S 15/42; G01S 15/88–89; G01S 15/8925; G06T 7/11
See application file for complete search history.

(56) References Cited

U.S. PATENT DOCUMENTS 5,579,768 A    12/1996 Klesenski
6,711,433 B1   3/2004 Geiger et al.
(Continued)

FOREIGN PATENT DOCUMENTS

JP   3994469 B2 * 10/2007 ............. H04N 5/225
JP   2012-21969 A   2/2012
WO   2020/023622 A1  1/2020

OTHER PUBLICATIONS

Machine translation of JP-3994469-B2 (Year: 2007).*
(Continued)

*Primary Examiner* — Nguyen Q. Ha
(74) *Attorney, Agent, or Firm* — Seed IP Law Group LLP

(57) ABSTRACT

An acoustic analysis system includes an acoustic sensor array that receives acoustic signals from a target scene and outputs acoustic data based on the one or more acoustic signals. A processor receives a first set of acoustic data representing a first portion of the target scene and having a first field of view (FOV), generates a first acoustic image based on the first set of acoustic data, receives a second set of acoustic data representing a second portion of the target scene and having a second FOV, wherein the second FOV is different than the first FOV, generates a second acoustic image based on the second set of acoustic data, registers the first acoustic image and the second acoustic image to form an aligned first acoustic image and second acoustic image, and generate a panorama comprising the aligned first acoustic image and second acoustic image for presentation on a display.

24 Claims, 26 Drawing Sheets

(56) References Cited

U.S. PATENT DOCUMENTS

| | | | |
|---|---|---|---|
| 7,862,511 B2 | 1/2011 | Rafter | |
| 7,930,019 B2 | 4/2011 | Siejko et al. | |
| 8,717,418 B1 | 5/2014 | Prince | |
| 8,970,665 B2 * | 3/2015 | Yang | G03B 17/18 348/36 |
| 9,198,680 B2 | 12/2015 | Fraser et al. | |
| 9,610,063 B2 | 4/2017 | Foroughi et al. | |
| 9,736,580 B2 * | 8/2017 | Cahill | G01S 3/801 |
| 9,964,747 B2 | 5/2018 | Ntziachristos et al. | |
| 10,152,811 B2 | 12/2018 | Johnson et al. | |
| 10,349,917 B2 | 7/2019 | Boctor et al. | |
| 2013/0155248 A1 | 6/2013 | Neeley et al. | |
| 2013/0155249 A1 | 6/2013 | Neeley et al. | |
| 2013/0162835 A1 | 6/2013 | Forland et al. | |
| 2016/0073087 A1 | 3/2016 | Davis et al. | |
| 2018/0192033 A1 | 7/2018 | Gallup et al. | |
| 2019/0128730 A1 | 5/2019 | Stuart et al. | |
| 2019/0128739 A1 | 5/2019 | Stuart | |
| 2019/0129027 A1 | 5/2019 | Stuart | |
| 2020/0100770 A1 | 4/2020 | Noguchi | |
| 2021/0344831 A1 * | 11/2021 | Vilermo | H04N 23/67 |

OTHER PUBLICATIONS

Bottenus, N. et al., "Implementation of swept synthetic aperture imaging", Proceedings of SPIE 9419, Medical Imaging 2015: Ultrasonic Imaging and Tomography, 94190H, Mar. 17, 2015, 15 pgs.

Browne, T.M., "Underwater Acoustic Imaging Devices for Portable Scour Monitoring", Henry Hydralic Engineering Repository, 2010, 11 pgs.

Flach, B. et al., "PURE: Panoramic Ultrasound Reconstruction by Seamless Stitching of Volumes", Simulation and Synthesis in Medical Imaging. First International Workshop, Sashimi 2016, held in conjunction with Miccai 2016. Proceedings: LNCS 9968, 75-84, 2016; ISBN-13: 978-3-319-46629-3; DOI: 10.1007/978-3-319-46630-9_8; Conference: Simulation and Synthesis in Medical Imaging. First International Workshop, Sashimi 2016, held in conjunction with Miccai 2016, Oct. 21, 2016, Athens, Greece; Springer International Publishing, Cham, Switzerland, 10 pgs.

Patel, R.C. et al., "Segmentation of 3D acoustic images for object recognition purposes", IEEE Xplore, 1998, 5 pgs.

Solovey, I., "Segmentation of 3D Carotid Ultrasound Images Using Weak Geometric Priors", University of Waterloo, Waterloo, Ontario, Canada, 2010, 88 pgs.

International Search Report and Written Opinion for International Application No. PCT/US2021/049968, dated Mar. 21, 2022, 21 pgs.

* cited by examiner

SYSTEM AND METHOD FOR GENERATING PANORAMIC ACOUSTIC IMAGES AND VIRTUALIZING ACOUSTIC IMAGING DEVICES BY SEGMENTATION

BACKGROUND

When monitoring an area using various acoustic imaging techniques, it may be necessary or desired to monitor a large area. In some cases, this area can be bigger than the field-of-view (FOV) of existing systems and solutions. Additionally or alternatively, it may be necessary or desired to monitor different regions of an area at different points in time. However, it may not be technically feasible or commercially viable to have multiple acoustic imaging systems installed for monitoring such different regions.

For some area monitoring applications, it may be necessary to monitor an area where problems only become apparent over a period of time. Sometimes, these problems may be intermittent and may be missed with periodic checks.

Additionally or alternatively, in some cases, sounds emanating from different locations within a scene and/or at different times can have different acoustic parameters, which can lead to difficulties in imaging such sounds. Optimally imaging one such sound (e.g., within a first frequency range) may lead to a suboptimal detection and/or display of a different sound having different acoustic parameters (e.g., within a second frequency range different from the first).

DETAILED DESCRIPTION

Figure 1B:
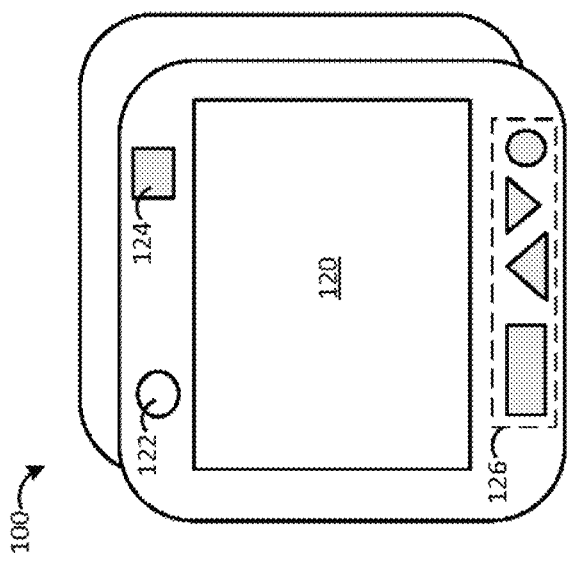
FIGS. 1A and 1B show front and back views of an example acoustic imaging device.
Figure 1A:
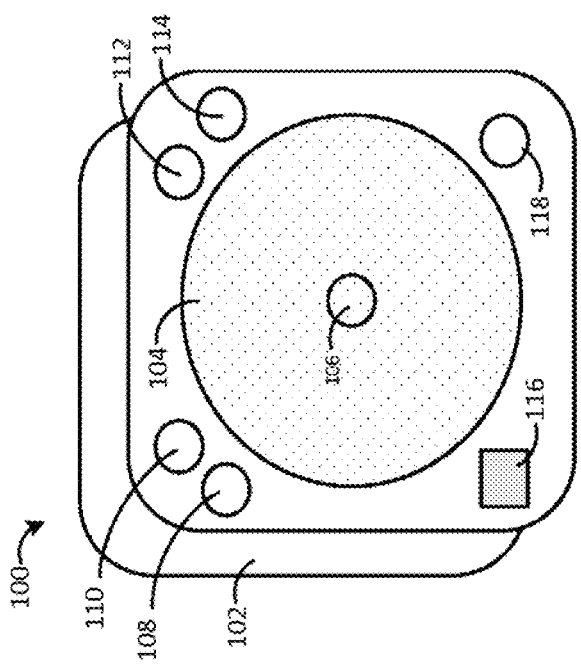

FIGS. 1A and 1B show front and back views of an example acoustic imaging device. FIG. 1A shows a front side of an acoustic imaging device 100 having a housing 102 supporting an acoustic sensor array 104 and an electromagnetic imaging tool 106. In some embodiments, the acoustic sensor array 104 includes a plurality of acoustic sensor elements, each of the plurality of acoustic sensor elements being configured to receive (e.g., passively) acoustic signals that are emitted from an acoustic scene and output acoustic data based on the received acoustic signals. The electromagnetic imaging tool 106 can be configured to receive electromagnetic radiation from a target scene and output electromagnetic image data representative of the received electromagnetic radiation. The electromagnetic imaging tool 106 can be configured to detect electromagnetic radiation in one or more of a plurality of ranges of wavelengths, such as visible light, infrared, ultraviolet, or the like.

In the illustrated example, the acoustic imaging device 100 includes an ambient light sensor 108 and a location sensor 116, such as a GPS. The device 100 includes a laser pointer 110, which in some embodiments, includes a laser distance meter. The device 100 includes a torch 112, which can be configured to emit visible light radiation toward a scene, and an infrared illuminator 118, which can be configured to emit infrared radiation toward a scene. In some examples, device 100 can include an illuminator for illuminating a scene over any range of wavelengths. Device 100 further includes a projector 114, such as an image reprojector, which can be configured to project a generated image onto a scene, such as a colorized image, and/or a dot projector configured to project a series of dots onto a scene, for example, to determine a depth profile of the scene.

FIG. 1B shows a back side of the acoustic imaging device 100. As shown, the device includes display 120, which can present image or other data. In some examples, display 120 comprises a touch screen display. The acoustic imaging device 100 includes a speaker 122, which can provide audio feedback signals to a user, and a wireless interface 124, which can enable wireless communication between the acoustic imaging device 100 and an external device. The device further includes controls 126, which can include one or more buttons, knobs, dials, switches, or other interfacing components to enable a user to interface with the acoustic imaging device 100. In some examples, controls 126 and a touchscreen display combine to provide a user interface of the acoustic imaging device 100.

In various embodiments, acoustic imaging devices need not include every element shown in the embodiment of FIGS. 1A and 1B. One or more illustrated components can be excluded from an acoustic imaging device. In some examples, one or more components shown in the embodiment of FIGS. 1A and 1B can be included as a part of an acoustic imaging system but included separately from the housing 102. Such components can communicate with other components of an acoustic imaging system via wired or wireless communication techniques, for example, using wireless interface 124.

Figure 2:
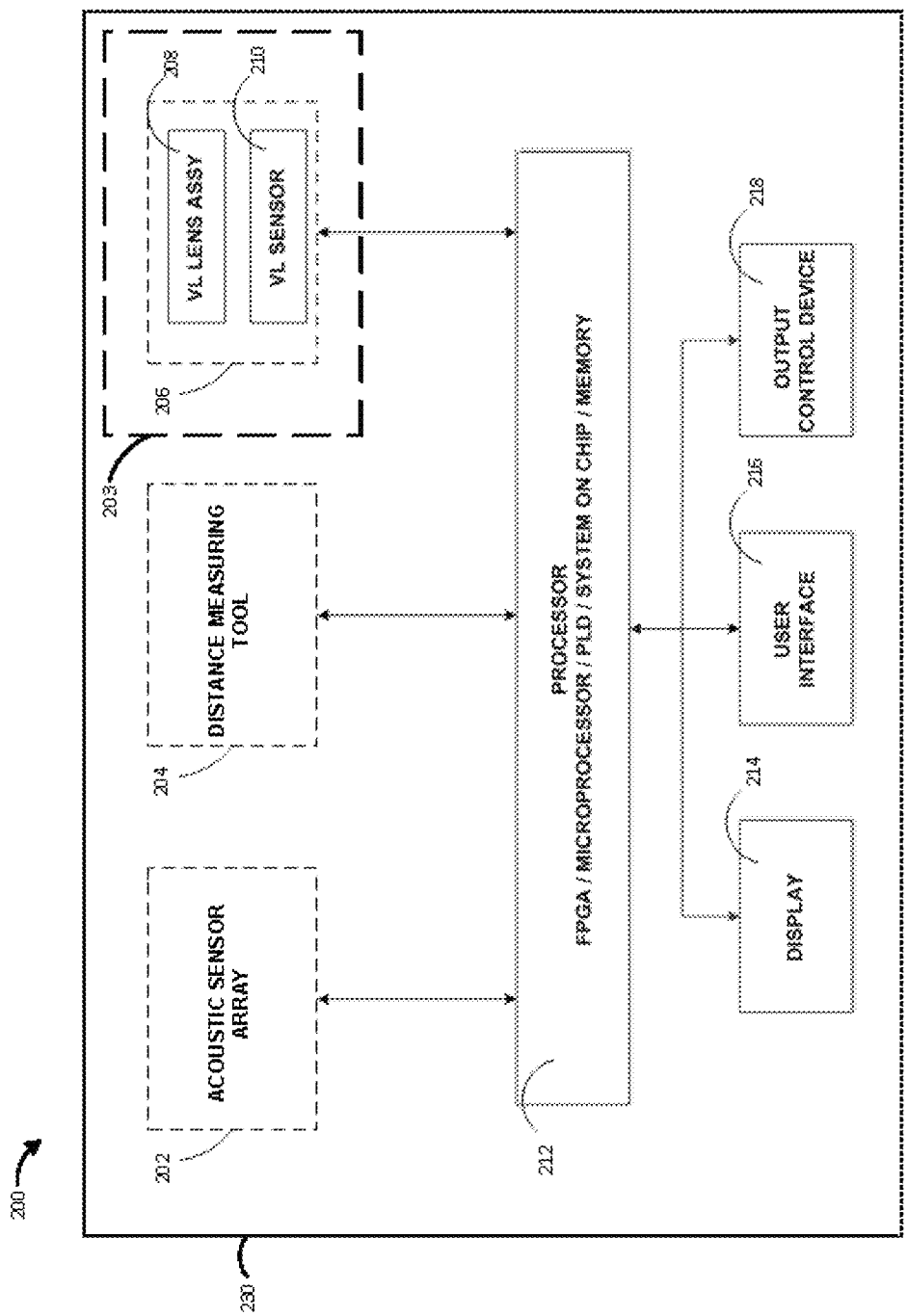
FIG. 2 is a functional block diagram illustrating components of an example of acoustic analysis system.

FIG. 2 is a functional block diagram illustrating components of an example of acoustic analysis system 200. The exemplary acoustic analysis system 200 of FIG. 2 can include a plurality of acoustic sensors such as microphones, MEMS, transducers, etc. arranged in an acoustic sensor array 202 to capture acoustic signals travelling through the air. Such arrays can be one-dimensional, two-dimensional, or three-dimensional. In various examples, the acoustic sensor array can define any suitable size and shape. In some examples, acoustic sensor array 202 includes a plurality of acoustic sensors arranged in a grid pattern such as, e.g., an array of sensor elements arranged in vertical columns and horizontal rows. In various examples, acoustic sensor array 202 can include an array of vertical columns by horizontal rows of, e.g., 8×8, 16×16, 32×32, 64×64, 128×128, 256×256, etc. Other examples are possible, and various sensor arrays need not necessarily include the same number of rows as columns. In some embodiments, such sensors can be positioned on a substrate, for example, such as a printed circuit board (PCB) substrate.

In the configuration shown in FIG. 2, a processor 212 in communication with the acoustic sensor array 202 can receive acoustic data from each of the plurality of acoustic sensors. During exemplary operation of acoustic analysis system 200, processor 212 can communicate with acoustic sensor array 202 to generate acoustic image data. For example, processor 212 can be configured to analyze data received from each of a plurality of acoustic sensors arranged in the acoustic sensor array and determine an acoustic scene by "back propagating" acoustic signals to the source of the acoustic signals. In some embodiments, processor 212 can generate a digital "frame" of acoustic image data by identifying various source locations and intensities of acoustic signals across a two-dimensional scene. By generating a frame of acoustic image data, processor 212 captures an acoustic image of a target scene at substantially a given point in time. In some examples, a frame comprises a plurality of pixels making up the acoustic image, wherein each pixel represents a portion of the source scene to which acoustic signals have been back-propagated.

Components described as processors within the acoustic analysis system 200, including processor 212, may be implemented as one or more processors, such as one or more microprocessors, digital signal processors (DSPs), application specific integrated circuits (ASICs), field programmable gate arrays (FPGAs), programmable logic circuitry, or the like, either alone or in any suitable combination. Processor 212 may also include memory that stores program instructions and related data that, when executed by processor 212, cause acoustic analysis system 200 and processor 212 to perform the functions attributed to them in this disclosure. Memory may include any fixed or removable magnetic, optical, or electrical media, such as RAM, ROM, CD-ROM, hard or floppy magnetic disks, EEPROM, or the like. Memory may also include a removable memory portion that may be used to provide memory updates or increases in memory capacities. A removable memory may also allow acoustic image data to be easily transferred to another computing device, or to be removed before acoustic analysis system 200 is used in another application. Processor 212 may also be implemented as a System on Chip that integrates some or all components of a computer or other electronic system into a single chip. The processor 212 (processing circuitry) can be configured to communicate the processed data to a display 214 or other output/control device 218.

In some embodiments, acoustic sensors in acoustic sensor array 202 generate a series of signals corresponding to the acoustic signals received through the air by each acoustic sensor to represent an acoustic image. A "frame" of acoustic image data is generated when the signal from each acoustic sensor is obtained by scanning all of the rows that make up the acoustic sensor array 202. In some examples, processor 212 can acquire acoustic image frames at a rate sufficient to generate a video representation (e.g., 30 Hz, or 60 Hz) of the acoustic image data. Independent of the specific circuitry, acoustic analysis system 200 may be configured to manipulate acoustic data representative of the acoustic profile of a target scene so as to provide an output that can be displayed, stored, transmitted, or otherwise utilized by a user.

In some embodiments, the "back propagation" of received acoustic signals in order to generate acoustic image data comprises analyzing the received signals at the plurality of acoustic sensors in the acoustic sensor array 202, for example, via the processor. In various examples, performing the back propagation is a function of one or more parameters, including a distance to target, frequency, sound intensity (e.g., dB level) sensor array dimensions/configuration, including, for example, the spacing and arrangement of individual sensors within one or more arrays, etc. In some embodiments, such parameters can be pre-programmed into the system, for example, in memory. For example, acoustic sensor array 202 properties can be stored in memory, such as internal memory or memory associated particularly with the acoustic sensor array 202. Other parameters, such as a distance to target, can be received a variety of ways. For instance, in some examples, the acoustic analysis system 200 includes a distance measuring tool 204 in communication with the processor 212. The distance measuring tool can be configured to provide distance information representative of the distance from the distance measuring tool 204 to a particular location in the target scene. Various distance measuring tools can include a laser distance meter or other known distance measuring devices, such as other optical or audio distance measurement devices. Additionally or alternatively, a distance measuring tool can be configured to generate three-dimensional depth data such that each portion of a target scene has an associated distance-to-target value. Thus, in some examples, a distance to target measurement as used herein can correspond to a distance to each location within a target scene. Such three-dimensional depth data can be generated, for example, via a plurality of imaging tools having different view of a target scene, or via other known distance scanning tools. In general, in various embodiments, a distance measuring tool can be used to perform one or more distance measurement functions, including but not limited to: laser distance measurement, active sonic distance measurement, passive ultrasonic distance measurement, LIDAR distance measurement, RADAR distance measurement, millimeter wave distance measurement, and the like.

Distance information from the distance measuring tool 204 can be used in the back propagation calculation. Additionally or alternatively, the system 200 can include a user interface 216 into which a user may manually enter a distance to target parameter. For example, a user may enter a distance to target value into the system 200 in the event that the distance to a component suspected of producing acoustic signals is known or is difficult to measure with the distance measuring tool 204.

In the illustrated embodiment, acoustic analysis system 200 includes an electromagnetic imaging tool 203 for generating image data representative of a target scene. Exemplary electromagnetic imaging tools can be configured to receive electromagnetic radiation from a target scene and generate electromagnetic image data representative of the received electromagnetic radiation. In some examples, electromagnetic imaging tool 203 can be configured to generate electromagnetic image data representative of a particular range of wavelengths within the electromagnetic spectrum, such as infrared radiation, visible light radiation, and ultraviolet radiation. For instance, in some embodiments, an electromagnetic timing tool 203 can include one or more camera modules configured to generate image data representative of a particular range of wavelengths in the electromagnetic spectrum such as, for example, a visible light camera module 206.

Visible light camera modules are generally well known. For examples, various visible light camera modules are included in smartphones and numerous other devices. In some embodiments, visible light camera module 206 may be configured to receive visible light energy from a target scene and to focus the visible light energy on a visible light sensor for generation of visible light energy data, e.g., that can be displayed in the form of a visible light image on display 214 and/or stored in memory. Visible light camera module 206 can include any suitable components for performing the functions attributed to the module herein. In the example of FIG. 2, visible light camera module 206 is illustrated as including visible light lens assembly 208 and visible light sensor 210. In some such embodiments, visible light lens assembly 208 includes at least one lens that takes visible light energy emitted by a target scene and focuses the visible light energy on visible light sensor 210. Visible light sensor 210 can include a plurality of visible light sensor elements such as, e.g., CMOS detectors, CCD detectors, PIN diodes, avalanche photo diodes, or the like. Visible light sensor 210 responds to the focused energy by generating an electrical signal that can be converted and displayed as a visible light image on display 214. In some examples, the visible light module 206 is configurable by a user, and can provide output, for example, to display 214, in a variety of formats. Visible light camera module 206 may include compensation functionality for varying lighting or other operating conditions or user preferences. The visible light camera module may provide a digital output including image data, which may include data in a variety of formats (e.g., RGB, CYMK, YCbCr, etc.).

In operation of some exemplary visible light camera modules 206, optical energy received from a target scene may pass through visible light lens assembly 208 and be focused on visible light sensor 210. When the optical energy impinges upon the visible light sensor elements of visible light sensor 210, photons within the photodetectors may be released and converted into a detection current. Processor 212 can process this detection current to form a visible light image of the target scene.

During use of acoustic analysis system 200, processor 212 can control visible light camera module 206 to generate visible light data from a captured target scene for creating a visible light image. The visible light data may include luminosity data indicative of the color(s) associated with different portions of the captured target scene and/or the magnitude of light associated with different portions of the captured target scene. Processor 212 can generate a "frame" of visible light image data by measuring the response of each visible light sensor element of acoustic analysis system 200 a single time. By generating a frame of visible light data, processor 212 captures visible light image of a target scene at a given point in time. Processor 212 may also repeatedly measure the response of each visible light sensor element of acoustic analysis system 200 so as to generate a dynamic visible light image (e.g., a video representation) of a target scene. In some examples, the visible light camera module 206 may include its own dedicated processor or other circuitry (e.g., ASIC) capable of operating the visible light camera module 206. In some such embodiments, a dedicated processor is in communication with processor 212 for providing visible light image data (e.g., RGB image data) to processor 212. In alternative embodiments, a dedicated processor for the visible light camera module 206 may be integrated into processor 212.

With each sensor element of visible light camera module 206 functioning as a sensor pixel, processor 212 can generate a two-dimensional image or picture representation of the visible light from a target scene by translating an electrical response of each sensor element into a time-multiplexed electrical signal that can be processed, e.g., for visualization on display 214 and/or storage in memory.

Processor 212 may control display 214 to display at least a portion of a visible light image of a captured target scene. In some examples, processor 212 controls display 214 so that the electrical response of each sensor element of visible light camera module 206 is associated with a single pixel on display 214. In other examples, processor 212 may increase or decrease the resolution of a visible light image so that there are more or fewer pixels displayed on display 214 than there are sensor elements in visible light camera module 206. Processor 212 may control display 214 to display an entire visible light image (e.g., all portions of a target scene captured by acoustic analysis system 200) or less than an entire visible light image (e.g., a lesser port of the entire target scene captured by acoustic analysis system 200).

In some embodiments, processor 212 may control display 214 to concurrently display at least a portion of the visible light image captured by acoustic analysis system 200 and at least a portion of an acoustic image generated via acoustic sensor array 202. Such a concurrent display may be useful in that an operator may reference the features displayed in the visible light image to help view sources of acoustic signals concurrently displayed in the acoustic image. In some cases, the processor 212 is configured to recognize one or more features within the electromagnetic (e.g., visible light) image data and designate (identify or delineate) at least one portion of the acoustic image data based on the one or more recognized features. In various examples, processor 212 may control display 214 to display the visible light image and the acoustic image in side-by-side arrangement, in a picture-in-picture arrangement, where one of the images surrounds the other of the images, or any other suitable arrangement where the visible light and the acoustic image are concurrently displayed.

For example, processor 212 may control display 214 to display the visible light image and the acoustic image in a combined arrangement. In such an arrangement, for a pixel or set of pixels in the visible light image representative of a portion of the target scene, there exists a corresponding pixel or set of pixels in the acoustic image, representative of substantially the same portion of the target scene. In various embodiments, the size and/or resolution of the acoustic and visible light images need not be the same. Accordingly, there may exist a set of pixels in one of the acoustic or visible light images that correspond to a single pixel in the other of the acoustic or visible light image, or a set of pixels of a different size. Similarly, there may exist a pixel in one of the visible light or acoustic images that corresponds to a set of pixels in the other image. Thus, as used herein, corresponding does not require a one-to-one pixel relationship, but may include mismatched sizes of pixels or groups of pixels. Various combination techniques of mismatched sized regions of images may be performed, such as up- or down-sampling one of the images, or combining a pixel with the average value of a corresponding set of pixels. Other examples are known and are within the scope of this disclosure.

Thus, corresponding pixels need not have a direct one-to-one relationship. Rather, in some embodiments, a single acoustic pixel has a plurality of corresponding visible light pixels, or a visible light pixel has a plurality of corresponding acoustic pixels. Additionally or alternatively, in some embodiments, not all visible light pixels have corresponding acoustic pixels, or vice versa. Such embodiments may be indicative of, for example, a picture-in-picture type display as previously discussed. Thus, a visible light pixel will not necessarily have the same pixel coordinate within the visible light image as does a corresponding acoustic pixel. Accordingly, as used herein, corresponding pixels generally refers pixels from any image (e.g., a visible light image, an acoustic image, a combined image, a display image, etc.) comprising information from substantially the same portion of the target scene. Such pixels need not have a one-to-one relationship between images and need not have similar coordinate positions within their respective images.

Similarly, images having corresponding pixels (i.e., pixels representative of the same portion of the target scene) can be referred to as corresponding images. Thus, in some such arrangements, the corresponding visible light image and the acoustic image may be superimposed on top of one another, at corresponding pixels. An operator may interact with user interface 216 to control the transparency or opaqueness of one or both of the images displayed on display 214. For example, the operator may interact with user interface 216 to adjust the acoustic image between being completely transparent and completely opaque and also adjust the visible light image between being completely transparent and completely opaque. Such an exemplary combined arrangement, which may be referred to as an alpha-blended arrangement, may allow an operator to adjust display 214 to display an acoustic-only image, a visible light-only image, of any overlapping combination of the two images between the extremes of an acoustic-only image and a visible light-only image. Processor 212 may also combine scene information with other data, such as alarm data or the like. In general, an alpha-blended combination of visible light and acoustic images can comprise anywhere from 100 percent acoustic and 0 percent visible light to 0 percent acoustic and 100 percent visible light. In some embodiments, the amount of blending can be adjusted by a user of the camera. Thus, in some embodiments, a blended image can be adjusted between 100 percent visible light and 100 percent acoustic.

Additionally, in some embodiments, the processor 212 can interpret and execute commands from user interface 216, and/or output/control device 218. Moreover, input signals may be used to alter the processing of the visible light and/or acoustic image data that occurs in the processor 212.

An operator may interact with acoustic analysis system 200 via user interface 216, which may include buttons, keys, or another mechanism for receiving input from a user. The operator may receive output from acoustic analysis system 200 via display 214. Display 214 may be configured to display an acoustic-image and/or a visible light image in any acceptable palette, or color scheme, and the palette may vary, e.g., in response to user control. In some embodiments, acoustic image data can be presented in a palette in order to represent varying magnitudes of acoustic data from different locations in the scene. For instance, in some examples, display 214 is configured to display an acoustic image in a monochromatic palette such as grayscale. In other examples, display 214 is configured to display an acoustic image in a color palette such as, e.g., amber, ironbow, blue-red, or other high contrast color scheme. Combinations of gray scale and color palette displays are also contemplated. In some examples, the display being configured to display such information may include processing capabilities for generating and presenting such image data. In other examples, being configured to display such information may include the ability to receive image data from other components, such as processor 212. For example, processor 212 may generate values (e.g., RGB values, grayscale values, or other display options) for each pixel to be displayed. Display 214 may receive such information and map each pixel into a visual display.

While processor 212 can control display 214 to concurrently display at least a portion of an acoustic image and at least a portion of a visible light image in any suitable arrangement, a picture-in-picture arrangement may help an operator to easily focus and/or interpret an acoustic image by displaying a corresponding visible image of the same scene in adjacent alignment.

A power supply (not shown) delivers operating power to the various components of acoustic analysis system 200. In various examples, power supply may include a rechargeable or non-rechargeable battery and a power generation circuit, AC power, an inductive power pick-up, a photovoltaic power source, or any other appropriate power supplying component. Combinations of power supplying components are also possible, such as a rechargeable battery and another component configured to provide power to operate the device and/or to charge the rechargeable battery.

During operation of acoustic analysis system 200, processor 212 controls acoustic sensor array 202 and visible light camera module 206 with the aid of instructions associated with program information that is stored in memory to generate a visible light image and an acoustic image of a target scene. Processor 212 further controls display 214 to display the visible light image and/or the acoustic image generated by acoustic analysis system 200.

As noted, in some situations, it can be difficult to identify and differentiate between real-world (visible) features of the target scene in an acoustic image. In addition to supplementing the acoustic image with visible light information, in some embodiments, it can be useful to emphasize visible edges within the target scene. In some embodiments, known edge detection methods can be performed on a visible light image of a target scene. Because of the corresponding relationship between the acoustic image and the visible light image, visible light pixels determined to represent a visible edge in the target scene correspond to acoustic pixels also representing the visible edge in the acoustic image. It will be appreciated that, as used herein, "edges" need not refer to the physical boundary of an object, but may refer to any sufficiently sharp gradient in the visible light image. Examples may include physical boundaries of an object, color changes within an object, shadows across a scene, and the like.

While generally described with respect to FIG. 2 as including a visible light camera module 206, in some examples, electromagnetic imaging tool 203 of acoustic analysis system 200 can additionally or alternatively include imaging tools capable of generating image data representative of a variety of spectrums. For instance, in various examples, electromagnetic imaging tool 203 can include one or more tools capable of generating infrared image data, visible light image data, ultraviolet image data, or any other useful wavelengths, or combinations thereof. In some embodiments, the acoustic imaging system can include an infrared camera module having an infrared lens assembly and an infrared sensor array. Additional components for interfacing with, for example, an infrared camera module can be included, such as those described in U.S. patent application Ser. No. 14/837,757, filed Aug. 27, 2015, and entitled "EDGE ENHANCEMENT FOR THERMAL-VISIBLE COMBINED IMAGES AND CAMERAS," which is assigned to the assignee of the instant application and is hereby incorporated by reference in its entirety.

In some examples, two or more data streams can be blended for display. For example, exemplary systems including a visible light camera module 206, an acoustic sensor array 202, and an infrared camera module (not shown in FIG. 2) can be configured to produce an output image comprising a blend of visible light (VL) image data, infrared (IR) image data, and acoustic (Acoustic) image data. In an exemplary blending scheme, the display image can be represented by: $\alpha \times IR + \beta \times VL + \gamma \times$ Acoustic, wherein $\alpha + \beta + \gamma = 1$. In general, any number of data streams can be combined for display. In various embodiments, blending ratios such as $\alpha, \beta$, and $\gamma$ can be set by a user. Additionally or alternatively, set display programs can be configured to include different image data streams based on alarm conditions (e.g., one or more values in one or more data streams meets a predetermined threshold) or other conditions, for example, as described in U.S. Pat. No. 7,538,326, entitled "VISIBLE LIGHT AND IR COMBINED IMAGE CAMERA WITH A LASER POINTER," which is assigned to the assignee of the instant application, and is hereby incorporated by reference in its entirety.

One of more components in acoustic analysis system 200 described with respect to FIG. 2 can be included in a portable (e.g., handheld) acoustic analysis tool. For instance, in some embodiments, a portable acoustic analysis tool can include a housing 230 configured to house the components in the acoustic analysis tool. In some examples, one or more components of the system 200 can be located external to housing 230 of an acoustic analysis tool. For instance, in some embodiments, processor 212, display 214, user interface 216, and/or output control device 218 can be located external to a housing of an acoustic analysis tool and can communicate with various other system components, for example, via wireless communication (e.g., Bluetooth communication, Wi-Fi, etc.). Such components external to the acoustic analysis tool can be provided, for example, via an external device, such as a computer, smartphone, tablet, wearable device, or the like. Additionally or alternatively, other test and measurement or data acquisition tools configured to act as a master or slave device with respect to the acoustic analysis tool can similarly provide various components of an acoustic analysis system external to the acoustic analysis tool. External devices can communicate with a portable acoustic analysis tool via a wired and/or wireless connection, and can be used to perform various processing, display, and/or interface steps.

In some embodiments, such external devices can provide redundant functionality as components housed in a portable acoustic analysis tool. For example, in some embodiments, an acoustic analysis tool can include a display for displaying acoustic image data and can further be configured to communicate image data to an external device for storage and/or display. Similarly, in some embodiments, a user may interface with an acoustic analysis tool via an application (an "app") running on a smartphone, tablet, computer or the like, in order to perform one or more functions also capable of being performed with the acoustic analysis tool itself.

Figure 3A:
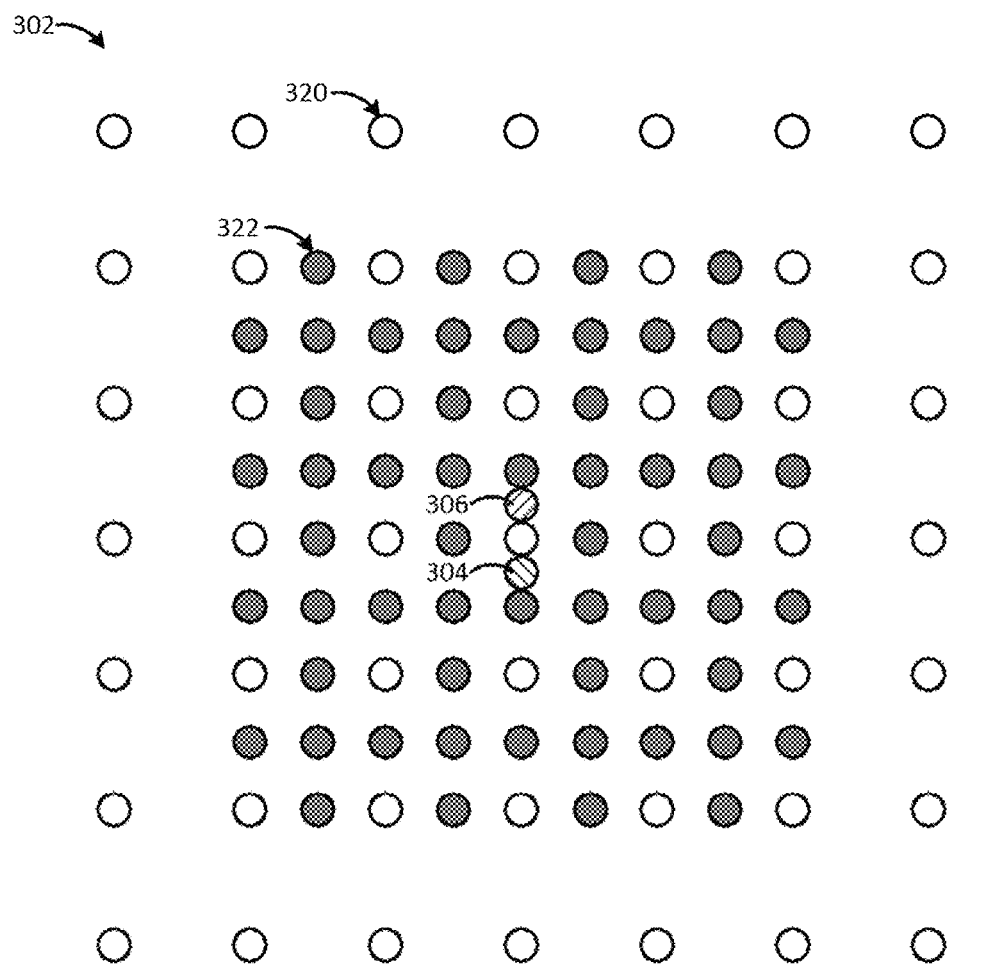
FIGS. 3A, 3B, 3C, and 3D show schematic diagrams of exemplary acoustic sensor array configurations within an acoustic analysis system.

FIG. 3A is a schematic diagram of an exemplary configuration of acoustic sensor array within an acoustic analysis system. In the illustrated example, the acoustic sensor array 302 includes a plurality of first acoustic sensors (shown in white) and a plurality of second acoustic sensors (shaded). The first acoustic sensors are arranged into a first array 320, and the second acoustic sensors are arranged into a second array 322. In some examples, the first array 320 and the second array 322 can be selectively used to, e.g., passively, receive acoustic signals through the air and generate corresponding acoustic image data. For instance, in some configurations, the sensitivity of a particular acoustic sensor array to particular acoustic frequencies is a function of the distance between acoustic sensor elements.

In some configurations, more closely spaced together sensor elements (e.g., second array 322) are better able to resolve higher frequency acoustic signals (for example, sounds having frequencies greater than 20 kHz, such as ultrasound signals between 20 kHz and 100 kHz) than further spaced sensor elements (e.g., first array 320). Similarly, further spaced sensor elements (e.g., first array 320) may be better suited for detecting lower frequency acoustic signals (e.g., <20 kHz) than more closely spaced sensor elements (e.g., second array 322). Various acoustic sensor arrays can be provided having sensor elements spaced apart from one another for detecting acoustic signals of various frequency ranges, such as infrasonic frequencies (<20 Hz), audible frequencies (between approximately 20 Hz and 20 kHz), ultrasound frequencies (between 20 kHz and 100 kHz). In some embodiments, partial arrays can be used (e.g., every other acoustic sensor element from array 320) for optimizing detection of particular frequency bands.

Additionally, in some examples, some acoustic sensor elements may be better suited for detecting acoustic signals having different frequency characteristics, such as low or high frequencies. Thus, in some embodiments, an array configured for detecting low frequency acoustic signals, such as the first array 320 having further spaced sensor elements, may include first acoustic sensor elements better suited for detecting low frequency acoustic signals. Similarly, an array configured for detecting higher frequency acoustic signals, such as second array 322, may include second acoustic sensor elements better suited for detecting high frequency acoustic signals. Thus, in some examples, the first array 320 and the second array 322 of acoustic sensor elements may include different types of acoustic sensor elements. Alternatively, in some embodiments, the first array 320 and the second array 322 can include the same type of acoustic sensor element.

Thus, in an exemplary embodiment, an acoustic sensor array 302 can include a plurality of acoustic sensor element arrays, such as the first array 320 and the second array 322. In some embodiments, arrays can be used individually or in combination. For instance, in some examples, a user may select to use the first array 320, use the second array 322, or use both the first array 320 and the second array 322 simultaneously for performing an acoustic imaging procedure. In some examples, a user may select which array(s) are to be used via the user interface. Additionally or alternatively, in some embodiments, the acoustic analysis system may automatically select the array(s) to use based on analysis of received acoustic signals or other input data, such as an expected frequency range, or the like. While the configuration shown in FIG. 3A generally includes two arrays (first array 320 and second array 322) generally arranged in rectangular lattices, it will be appreciated that a plurality of acoustic sensor elements can be grouped into any number of discrete arrays in any shape. Moreover, in some embodiments, one or more acoustic sensor elements can be included in multiple distinct arrays that can be selected for operation. As described elsewhere herein, in various embodiments, processes for back propagating acoustic signals to establish acoustic image data from the scene is performed based on the arrangement of acoustic sensor elements. Thus, the arrangement of acoustic sensors may be known or otherwise accessible by the processor in order to perform acoustic image generation techniques.

The acoustic analysis system of FIG. 3A further includes a distance measuring tool 304 and a camera module 306 positioned within the acoustic sensor array 302. Camera module 306 can represent a camera module of an electromagnetic imaging tool (e.g., 203), and can include a visible light camera module, an infrared camera module, an ultraviolet camera module, or the like. Additionally, while not shown in FIG. 3A, the acoustic analysis system can include one or more additional camera modules of the same type or of a different type than camera module 306. In the illustrated example, distance measuring tool 304 and camera module 306 are positioned within the lattice of acoustic sensor elements in the first array 320 and the second array 322. While shown as being disposed between lattice sites within the first array 320 and the second array 322, in some embodiments, one or more components (e.g., camera module 306 and/or a distance measuring tool 304 can be positioned at corresponding one or more lattice sites in the first array 320 and/or the second array 322. In some such embodiments, the component(s) can be positioned at the lattice site in lieu of an acoustic sensor element that would typically be in such a location according to the lattice arrangement.

Figure 3C:
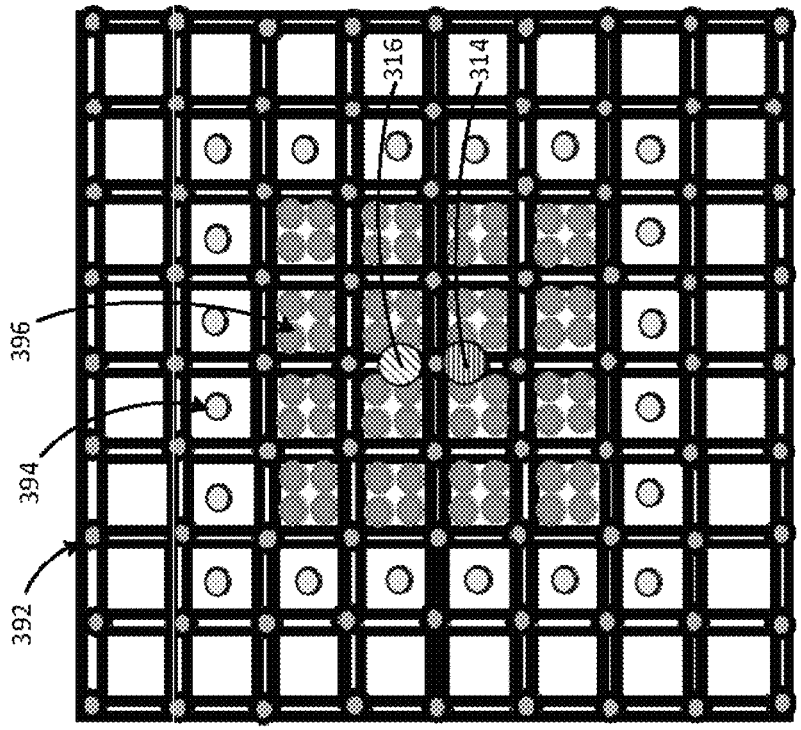
Figure 3B:
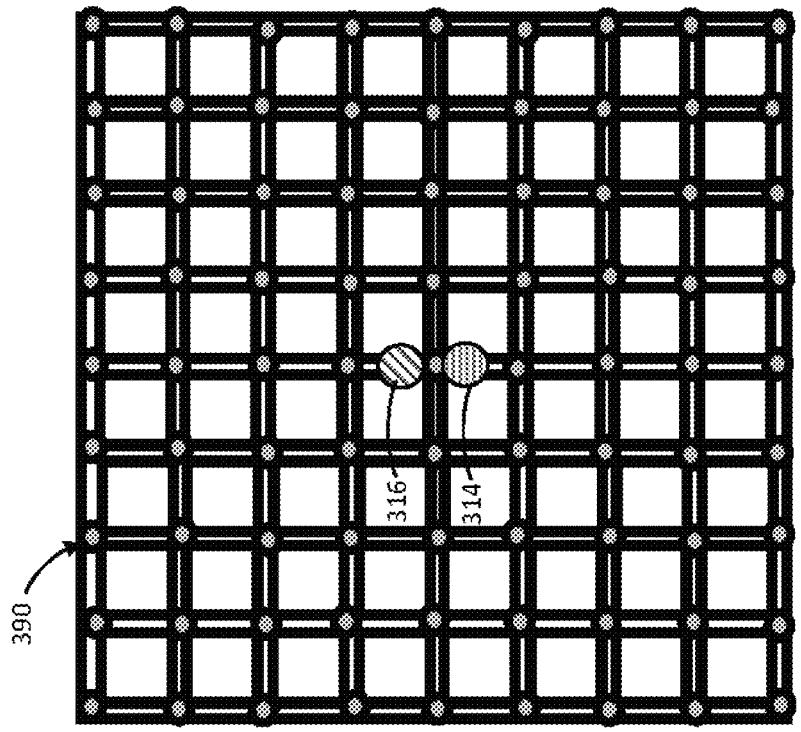

As described elsewhere herein, acoustic sensor arrays can include acoustic sensor elements arranged in any of a variety of configurations to receive, through the air, acoustic signals emitted from an acoustic source located in or near a target scene. FIGS. 3B and 3C are schematic diagrams illustrating exemplary acoustic sensor array configurations. FIG. 3B shows an acoustic sensor array 390 that includes a plurality of acoustic sensor elements spaced evenly apart in an approximately square lattice. Distance measuring tool 314 and camera array 316 are positioned within acoustic sensor array 390. In the illustrated example, the acoustic sensor elements in acoustic sensor array 390 are the same type of sensor, though in some embodiments, different types of acoustic sensor elements can be used in the array 390.

FIG. 3C shows a plurality of acoustic sensor arrays. Acoustic sensor arrays 392, 394, and 396 each include a plurality of acoustic sensor elements arranged in a different shaped array. In the example of FIG. 3C, acoustic sensor arrays 392, 394, and 396 can be used separately or together in any combination to create sensor arrays of various sizes. In the illustrated embodiment, the sensor elements of array 396 are spaced closer together than the sensor elements of array 392. In some examples, array 396 is designed for sensing higher frequency acoustic signals, while array 392 is designed for sensing lower frequency acoustic signals.

In various embodiments, arrays 392, 394, and 396 can include the same or different types of acoustic sensor elements. For example, acoustic sensor array 392 can include sensor elements having a frequency operating range lower than that of sensor elements of acoustic sensor array 396.

As described elsewhere herein, in some examples, different acoustic sensor arrays (e.g., 392, 394, 396) can be selectively turned off and on during various modes of operation (e.g., different desired frequency spectrums to be imaged). Additionally or alternatively, various acoustic sensor elements (e.g., some or all of acoustic sensor elements in one or more sensor arrays) can be enabled or disabled according to a desired system operation. For example, in some acoustic imaging processes, while data from a large number of sensor elements (e.g., sensor elements arranged in a high density, such as in sensor array 396) marginally improves acoustic image data resolution, it is at the expense of required processing to extract acoustic image data from the data received at each sensor element. That is, in some examples, the increased processing demand (e.g., in cost, processing time, power consumption, etc.) necessary for processing a large number of input signal (e.g., from a large number of acoustic sensor elements) compares negatively to any additional signal resolution provided by the additional data streams. Thus, it may be worthwhile in some embodiments to disable or disregard data from one or more acoustic sensor elements depending on the desired acoustic imaging operation.

Similar to the systems of FIGS. 3A and 3B, the system of FIG. 3C includes distance measuring tool 314 and camera array 316 positioned within acoustic sensor arrays 392, 394, and 396. In some examples, additional components, such as additional camera arrays (e.g., used for imaging a different portion of the electromagnetic spectrum from camera array 316), may be similarly positioned within acoustic sensor arrays 392, 394, and 396. It will be appreciated that, while shown in FIGS. 3A-3C as being positioned within one or more acoustic sensor arrays, distance measuring tool and/or one or more imaging tools (e.g., visible light camera module, infrared camera module, ultraviolet sensor, etc.) can be located outside of the acoustic sensor array(s). In some such examples, the distance measuring tool and/or one or more imaging tools located outside of the acoustic sensor array(s) can be supported by an acoustic imaging tool, for example, by a housing that houses the acoustic sensor array(s), or can located externally to the housing of the acoustic imaging tool.

Figure 3D:
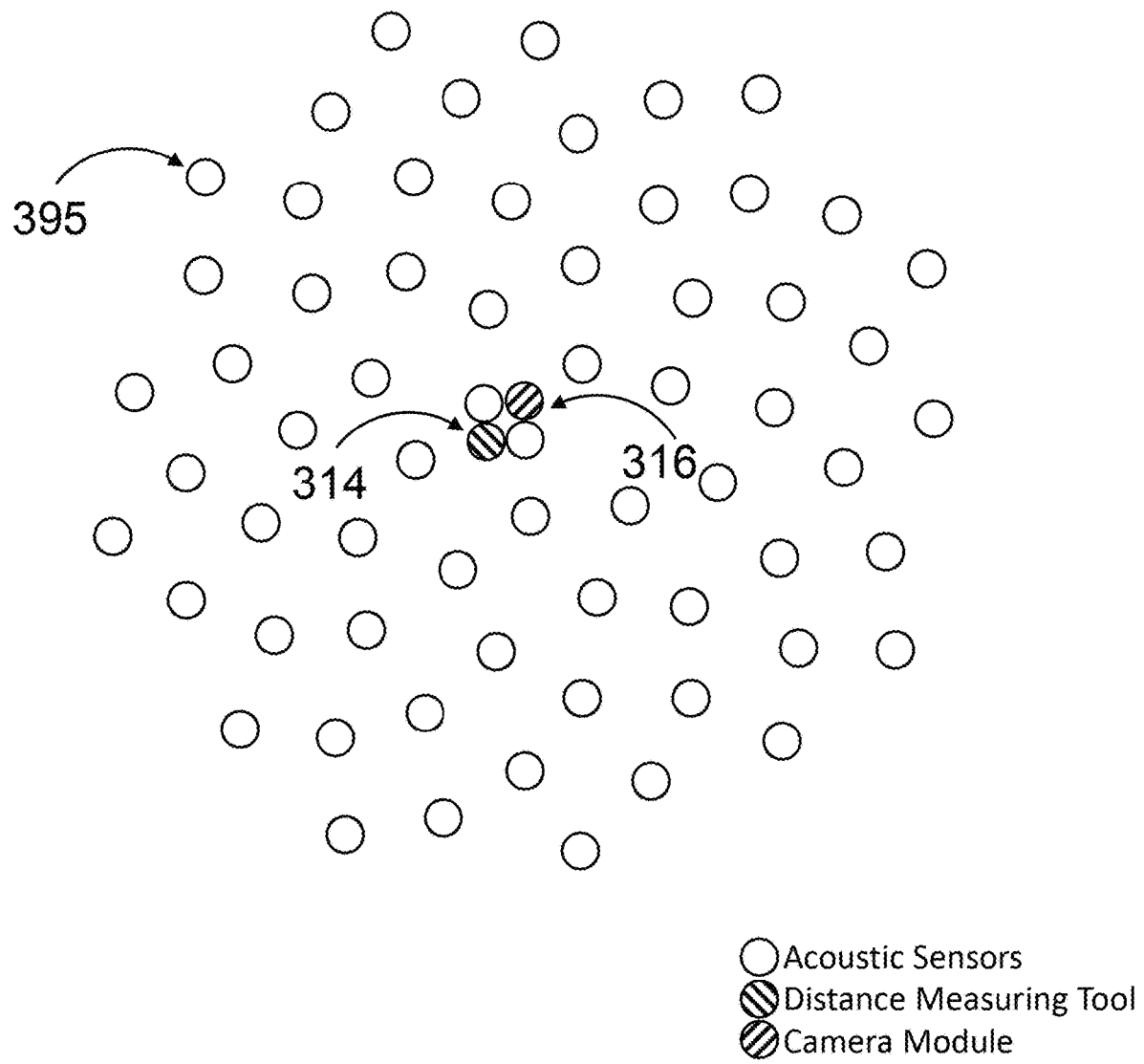

FIGS. 3A-3C provide exemplary acoustic sensor array configurations, however other acoustic sensor array configurations may be used. Acoustic sensor array configurations may comprise a variety of shapes and patterns, such as acoustic sensors arranged in a grid-like pattern, in concentric circles, in a sunflower array, in an ordered circular array, or the like. FIG. 3D provides an exemplary embodiment wherein acoustic sensors 395 are arranged in an ordered circular array configuration. The ordered circular array, such as shown in FIG. 3D, may provide various distances between the acoustic sensors rather than having a uniform distance between the them. Such a configuration may help the acoustic sensor array discern a larger range of frequencies by using various portions of the acoustic sensor array. For example, more closely spaced acoustic sensors may be more effective at detecting higher frequencies; similarly, acoustic sensors spaced farther apart may be more effective at detecting lower frequencies. Thus, having a variety of distances between acoustic sensors, some closer and some farther, may help provide better detection for a larger range of frequencies. Furthermore, the ordered circular array of FIG. 3D may provide differences in time of arrival versus the location of sound for different portions of the array and thus help with focusing the acoustic sensor array and/or determining where an acoustic signal is being emitted from. Additionally the ordered circular array may help resolve spatial aliasing and sidelobes compared to, for example, a rectangular array.

Figure 4A:
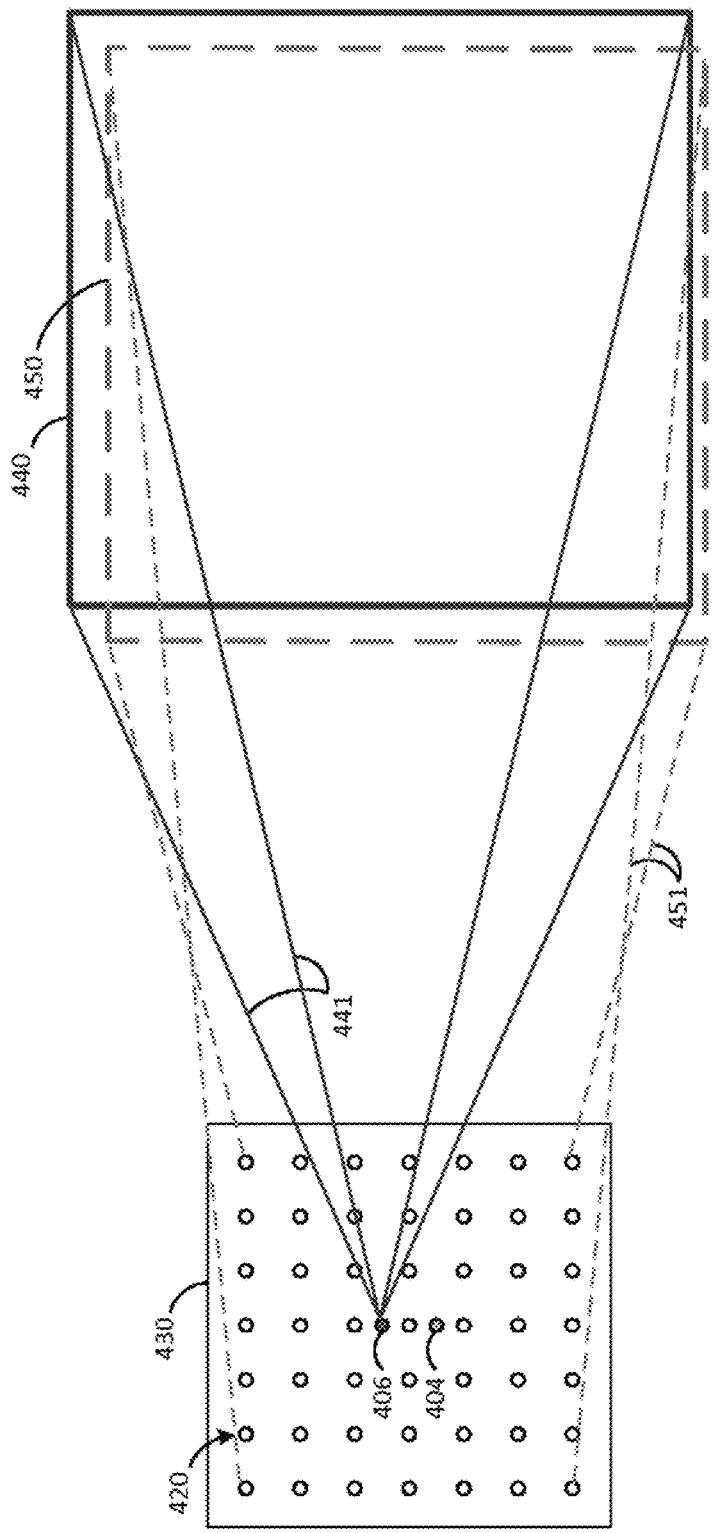
FIGS. 4A and 4B show schematic illustrations of parallax error in the generation of a frame of visible light image data and acoustic image data.

In some examples, general misalignment of an acoustic sensor array and an imaging tool, such as a camera module, can lead to misalignment in corresponding image data generated by the acoustic sensor array and the imaging tool. FIG. 4A shows a schematic illustration of parallax error in the generation of a frame of visible light image data and acoustic image data. In general, parallax error can be vertical, horizontal, or both. In the illustrated embodiment, an acoustic sensor array 420 and an imaging tool comprising a visible light camera module 406. Visible light image frame 440 is shown being captured according to the field of view 441 of the visible light camera module 406 while acoustic image frame 450 is shown as being captured according to the field of view 451 of the acoustic sensor array 420.

As shown, the visible light image frame 440 and the acoustic imaging frame 450 are not aligned with one another. In some embodiments, a processor (e.g., processor 212 of FIG. 2) is configured to manipulate one or both of the visible light image frame 440 and the acoustic image frame 450 in order to align visible light image data and acoustic image data. Such manipulation can include shifting one image frame relative to the other. The amount that the image frames are shifted relative to one another can be determined based on a variety of factors, including, for instance, the distance to the target from the visible light camera module 406 and/or the acoustic sensor array 420. Such distance data can be determined, for example, using distance measuring tool 404 or receiving a distance value via a user interface (e.g., 216).

Figure 4B:
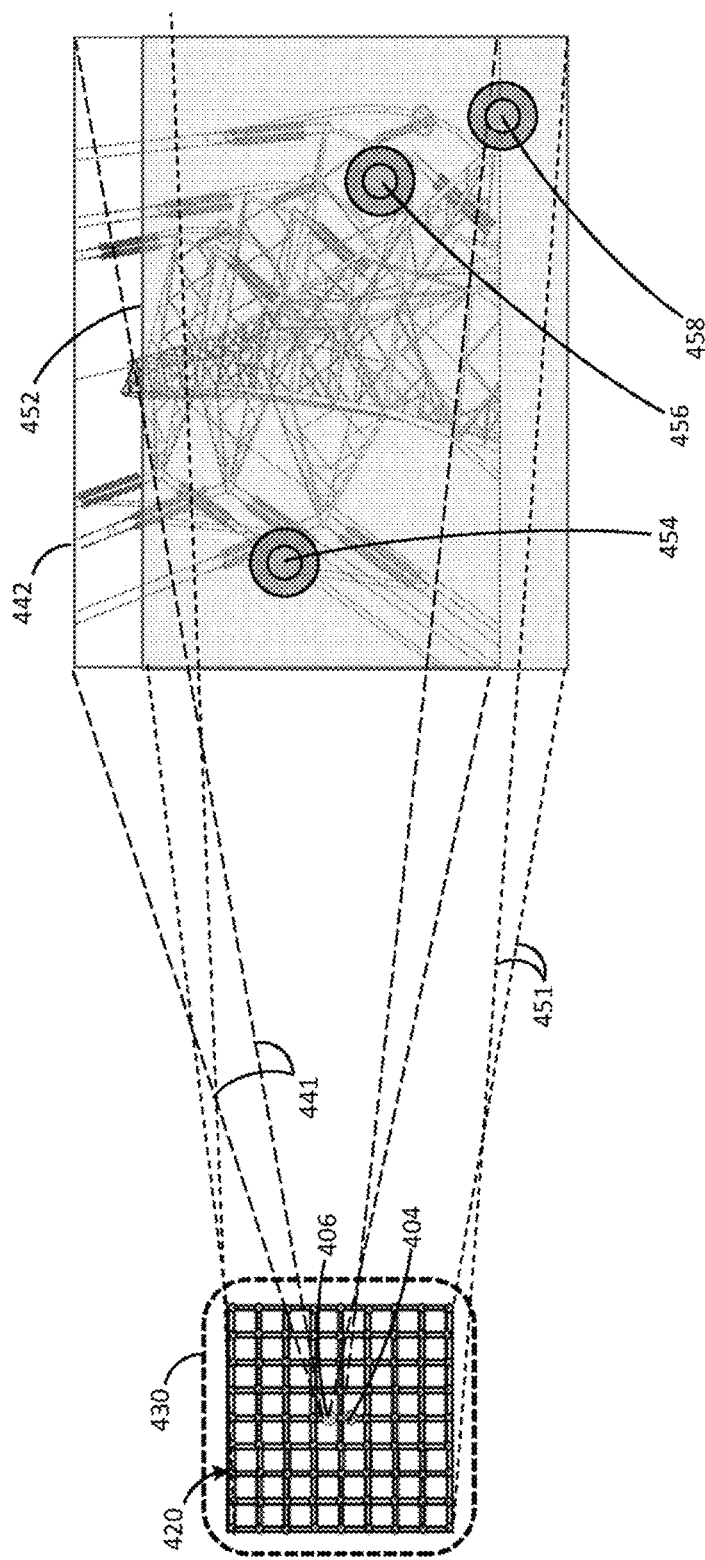

FIG. 4B is a schematic illustration similar to that in FIG. 4A, but including a visible light image of a scene. In the example of FIG. 4B, visible light image 442 shows a scene of a plurality of power lines and a supporting tower. The acoustic image 452 includes a plurality of locations 454, 456, 458 indicating high magnitude acoustic data coming from such locations. As shown, the visible light image 442 and the acoustic image 452 are both displayed simultaneously. However, observation of both images shows at least one acoustic image local maximum at location 458 that does not appear to coincide with any particular structure in the visible light image 442. Thus, one observing both images may conclude that there is misalignment (e.g., parallax error) between the acoustic image 452 and the visible light image 442.

Figure 5A:
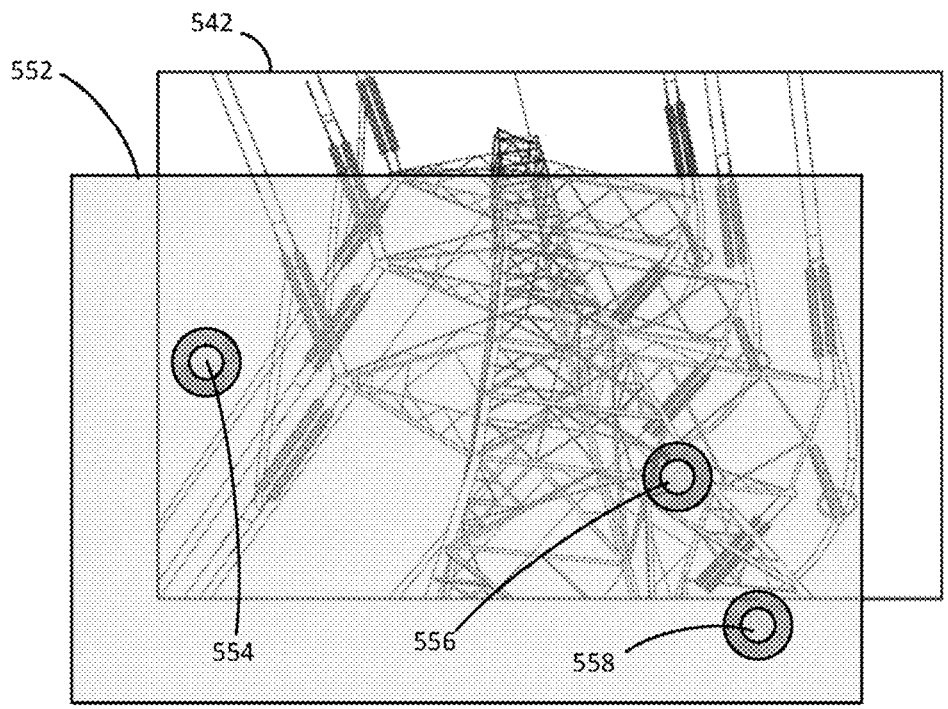
FIGS. 5A and 5B show parallax correction between a visible light image and an acoustic image.
Figure 5B:
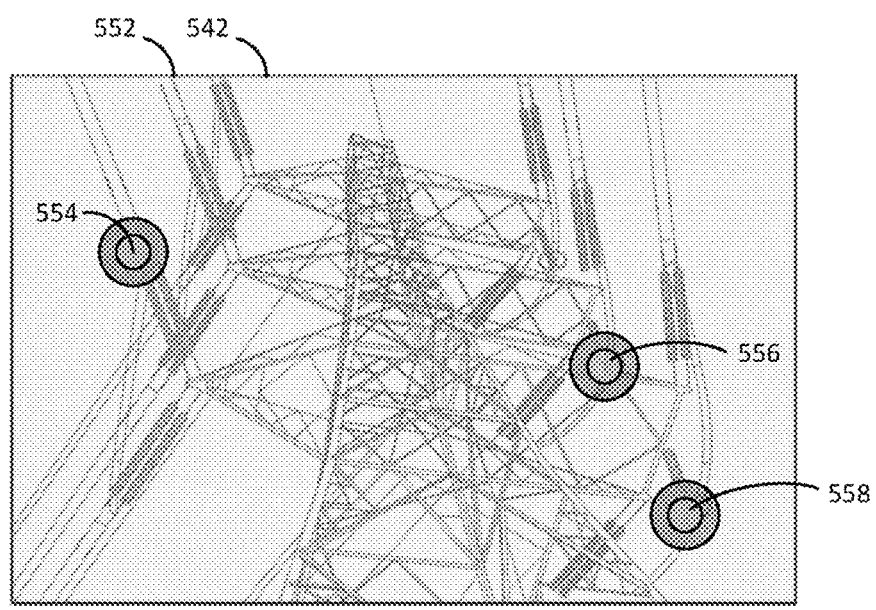

FIGS. 5A and 5B show parallax correction between a visible light image and an acoustic image. FIG. 5A, similar to FIG. 4B, shows a visible light image 542 and an acoustic image 552. The acoustic image 552 includes local maxima at locations 554, 556, and 558. As can be seen, maxima at locations 554 and 558 do not appear to coincide with any structure in the visible light image. In the example of FIG. 5B, the visible light image 542 and the acoustic image 552 are registered with respect to one another. The local maxima at locations 554, 556, and 558 in the acoustic image now appear to coincide with various locations within the visible light image 542.

During use, an operator may view the representation in FIG. 5B (e.g., via display 214) and determine approximate locations in the visible scene 542 that are likely sources of received acoustic signals. Such signals can be further processed in order to determine information regarding the acoustic signature of various components in the scene. In various embodiments, acoustic parameters such as frequency content, periodicity, amplitude, and the like can be analyzed with respect to various locations in the acoustic image. When overlaid onto visible light data so that such parameters can be associated with various system components, acoustic image data may be used to analyze various properties (e.g., performance characteristics) of objects in the visible light image. As shown in FIGS. 5A and 5B, locations 554, 556, and 558 show a circular gradient. As described elsewhere herein, acoustic image data can be visually represented according to a palettization scheme in which each pixel of acoustic image data is colorized based on the acoustic intensity at a corresponding location. Thus, in the exemplary representations of FIGS. 5A and 5B, the circular gradient of locations 554, 556, 558 generally represents a gradient in acoustic intensity in the imaging plane based on back-propagated received acoustic signals.

It will be appreciated that, while the exemplary illustrations in FIGS. 4A, 4B, 5A, and 5B are described with respect to acoustic image data and visible light image data, such processes can be similarly performed with a variety of electromagnetic image data. For example, as described elsewhere herein, in various embodiments, various such processes can be performed using combinations of acoustic image data and one or more of visible light image data, infrared image data, ultraviolet image data, or the like.

As described elsewhere herein, in some embodiments, the back-propagation of acoustic signals to form an acoustic image can be based on a distance to target value. That is, in some examples, the back-propagation calculations can be based on a distance, and can include determining a two-dimensional acoustic scene located at that distance from the acoustic sensor array. Given a two-dimensional imaging plane, spherical sound waves emanating from a source in the plane would generally appear circular in cross-section, with a radial decay in intensity as shown in FIGS. 5A-5B.

In some such examples, portions of an acoustic scene representing data not located at the distance-to-target used in the back-propagation calculation will result in errors in the acoustic image data, such as inaccuracies in the location of one or more sounds in the scene. Such errors can, when the acoustic image is displayed simultaneously (e.g., blended, combined, etc.) with other image data (e.g., electromagnetic image data, such as visible light, infrared, or ultraviolet image data), lead to parallax errors between the acoustic image data and other image data. Thus, in some embodiments, some techniques for correcting parallax error (e.g., as shown in FIGS. 5A and 5B) comprise adjusting a distance-to-target value used in the back-propagation calculation for generating acoustic image data.

In some cases, the system can be configured to perform a back-propagation process using a first distance-to-target value and display a display image such as shown in FIG. 5A in which the acoustic image data and another data stream may not be aligned. Subsequently, the acoustic analysis system can adjust the distance-to-target value used for back-propagation, perform the back-propagation again, and update the display image with the new acoustic image data. This process can repeat, with the acoustic analysis system cycling through a plurality of distance-to-target values while a user observes the resulting display images on a display. As the distance-to-target value changes, the user may observe a gradual transition from the display image shown in FIG. 5A to the display image shown in FIG. 5B. In some such cases, a user may visually observe when the acoustic image data appears properly registered with another data stream, such as electromagnetic image data. A user may signal to the acoustic analysis system that the acoustic image data appears properly registered, indicating to the system that the distance-to-target value used to perform the most recent back-propagation is approximately correct, and can save that distance value to memory as the correct distance-to-target. Similarly, a user may manually adjust a distance-to-target value as the display image is updated using new distance values in updated back-propagation processes until the user observes that the acoustic image data is properly registered. The user may choose to save the current distance to target in the acoustic analysis system as a current distance-to-target.

In some examples, correcting a parallax error can include adjusting the position of the acoustic image data relative to other image data (e.g., electromagnetic image data) by a predetermined amount and in a predetermined direction based on the distance-to-target data. In some embodiments, such adjustments are independent of the generation of the acoustic image data by back-propagating acoustic signals to the identified distance-to-target.

In some embodiments, in addition to being used to generate acoustic image data and reduce parallax error between the acoustic image data and other image data, a distance-to-target value can be used for other determinations. For instance, in some examples, a processor (e.g., processor 212) can use a distance to target value in order to focus or assist a user in focusing an image, such as an infrared image, as described in U.S. Pat. No. 7,538,326, which is incorporated by reference. As described therein, this can similarly be used to correct for parallax errors between visible light image data and infrared image data. Thus, in some examples, a distance value can be used to register acoustic image data with electromagnetic imaging data, such as infrared image data and visible light image data.

As described elsewhere herein, in some examples, a distance measuring tool (e.g., distance measuring tool 204) is configured to provide distance information that can be used by the processor (e.g., processor 212) for generating and registering acoustic image data. In some embodiments, the distance measuring tool comprises a laser distance meter configured to emit light onto the target scene at a location to which the distance is measured. In some such examples, the laser distance meter can emit light in the visible spectrum so that the user may view the laser spot in the physical scene to ensure that the distance meter is measuring a distance to a desired portion of the scene. Additionally or alternatively, the laser distance meter is configured to emit light in a spectrum to which one or more imaging components (e.g., camera modules) is sensitive. Thus, a user viewing the target scene via the analysis tool (e.g., via display 214) may observe the laser spot in the scene to ensure that the laser is measuring the distance to the correct location in the target scene. In some examples, the processor (e.g., 212) can be configured to generate a reference mark in a displayed image representative of the location that the laser spot would be located in the acoustic scene based on a current distance value (e.g., based on a known distance-based parallax relationship between the laser distance meter and the acoustic sensor array). The reference mark location can be compared to a location of the actual laser mark (e.g., graphically on a display and/or physically in the target scene) and the scene can be adjusted until the reference mark and the laser coincide. Such processes can be performed similar to the infrared registration and focusing techniques described in U.S. Pat. No. 7,538,326, which is incorporated by reference.

Figure 6:
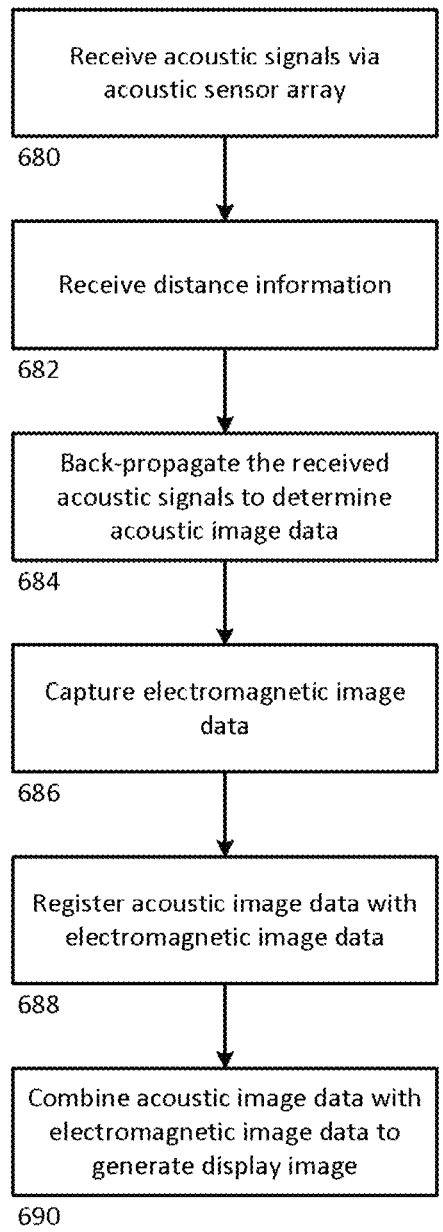
FIG. 6 is a process flow diagram showing an exemplary method for generating a final image combining acoustic image data and electromagnetic image data.

FIG. 6 is a process flow diagram showing an exemplary method for generating a final image combining acoustic image data and electromagnetic image data. The method includes the steps of receiving acoustic signals via an acoustic sensor array (680) and receiving distance information (682). Distance information can be received, for example, via a distance measuring device and/or a user interface, such as via manual entry or as the result of a distance adjustment process by which the distance is determined based on an observed registration.

The method further includes back-propagating the received acoustic signals to determine acoustic image data representative of the acoustic scene (684). As described elsewhere herein, back-propagating can be include analyzing a plurality of acoustic signals received at a plurality of sensor elements in an acoustic sensor array in combination with the received distance information to determine a source pattern of the received acoustic signals.

The method of FIG. 6 further includes the step of capturing electromagnetic image data (686), and registering the acoustic image data with the electromagnetic image data (688). In some embodiments, registering the acoustic image data with the electromagnetic image data is done as part of the back-propagation step for generating the acoustic image data (684). In other examples, registering the acoustic image data with the electromagnetic image data is done separately from the generation of the acoustic image data.

The method of FIG. 6 includes the step of combining acoustic image data with electromagnetic image data in order to generate a display image (690). As described elsewhere herein, combining electromagnetic image data and acoustic image data can comprise alpha blending the electromagnetic image data and the acoustic image data. Combining the image data can include overlaying one image data set onto the other, such as in a picture-in-picture mode or in locations in which certain conditions (e.g., alarm conditions) are satisfied. The display image can be presented to a user, for example, via a display that is supported by a housing that supports the acoustic sensor array and/or via a display separate from the sensor array, such as the display of an external device (e.g., a smartphone, tablet, computer, etc.).

Additionally or alternatively, the display image can be saved in a local (e.g., on-board) memory and/or a remote memory for future viewing. In some embodiments, the saved display image can include metadata that allows for future adjustment of the display image properties, such as blending ratios, back-propagation distance, or other parameters used to generate the image. In some examples, raw acoustic signal data and/or electromagnetic image data can be saved with the display image for subsequent processing or analysis.

While shown as a method for generating a final image combining acoustic image data and electromagnetic image data, it will be appreciated that the method of FIG. 6 could be used to combine acoustic image data with one or more sets of image data spanning any portion of the electromagnetic spectrum, such as visible light image data, infrared image data, ultraviolet image data, and the like. In some such examples, multiple sets of image data, such as visible light image data and infrared image data, can be both combined with acoustic image data to generate a display image via methods similar to that described with respect to FIG. 6.

In some examples, receiving acoustic signals via a sensor array (680) can include a step of selecting an acoustic sensor array with which to receive acoustic signals. As described, for example, with respect to FIGS. 3A-C, acoustic analysis systems can include a plurality of acoustic sensor arrays that can be suited for analyzing acoustic signals of varying frequencies. Additionally or alternatively, in some examples, different acoustic sensor arrays can be useful for analyzing acoustic signals propagating from different distances. In some embodiments, different arrays can be nested inside one another. Additionally or alternatively, partial arrays can be selectively used to receive acoustic image signals.

For example, FIG. 3A shows first array 320 and a second array 322 nested within the first array. In an exemplary embodiment, the first array 320 can include a sensor array configured (e.g., spaced) for receiving acoustic signals and generating acoustic image data for frequencies in a first frequency range. Second array 322 can include, for example, a second sensor array configured to be used alone or in combination with all or part of the first array 320 for generating acoustic image data for frequencies in a second frequency range.

Similarly, FIG. 3C shows a first array 392, a second array 394 at least partially nested within the first array 392, and a third array 396 at least partially nested within the first array 392 and the second array 394. In some embodiments, the first array 392 can be configured for receiving acoustic signals and generating acoustic image data for frequencies in a first frequency range. The second array 394 can be used with all or part of the first array 392 for receiving acoustic signals and generating acoustic image data for frequencies in a second frequency range. The third array 396 can be used alone, with all or part of the second array 394, and/or with all or part of the first array 392 for receiving acoustic signals and generating acoustic image data for frequencies in a third frequency range.

In some embodiments, in a nested array configuration, acoustic sensor elements from one array may be positioned between the acoustic sensor elements, such as elements of third array 396 being generally between elements of first array 392. In some such examples, the acoustic sensor elements in a nested array (e.g., third array 396) may be positioned in the same plane as, in front of, or behind the acoustic sensor elements in the array into which it is nested (e.g., first array 392).

In various implementations, arrays used for sensing higher frequency acoustic signals generally require less distance between individual sensors. Thus, with respect to FIG. 3C, for instance, third array 396 may be better suited for performing acoustic imaging processes involving higher frequency acoustic signals. Other sensor arrays (e.g., first array 392) may be sufficient for performing acoustic imaging processes involving lower frequency signals, and may be used in order to reduce the computational demand of processing signals from a smaller number of acoustic sensor elements when compared to array 396. Thus, in some examples, high-frequency sensor arrays may be nested within low-frequency sensor arrays. As described elsewhere herein, such arrays may generally be operated individually (e.g., via switching between active arrays) or together.

In addition or alternatively to selecting an appropriate sensor array based on an expected/desired frequency spectrum for analysis, in some examples, different sensor arrays may be better suited for performing acoustic imaging processes at difference distances to the target scene. For example, in some embodiments, if the distance between an acoustic sensor array and a target scene is small, outer sensor elements in the acoustic sensor array may receive significantly less useful acoustic information from the target scene than sensor elements more centrally located.

On the other hand, if the distance between an acoustic sensor array and a target scene is large, closely spaced acoustic sensor elements may not provide separately useful information. That is, if first and second acoustic sensor elements are close together, and the target scene is generally far away, the second acoustic sensor element may not provide any information that is meaningfully different from the first. Thus, data streams from such first and second sensor elements may be redundant and unnecessarily consume processing time and resources for analysis.

In addition to impacting which sensor arrays may be best suited for performing acoustic imaging, as described elsewhere herein, the distance to target may also be used in performing the back-propagating for determining acoustic image data from received acoustic signals. However, in addition to being an input value into a back-propagation algorithm, the distance-to-target may be used to select an appropriate back-propagation algorithm to use. For instance, in some examples, at far distances, spherically-propagating sound waves may be approximated as being substantially planar compared to the size of an acoustic sensor array. Thus, in some embodiments, when the distance-to-target is large, back-propagation of received acoustic signals can include an acoustic beamforming calculation. However, when closer to the source of the sound waves, a planar approximation of the sound wave may not be appropriate. Thus, different back-propagation algorithms may be used, such as near-field acoustic holography.

Figure 7:
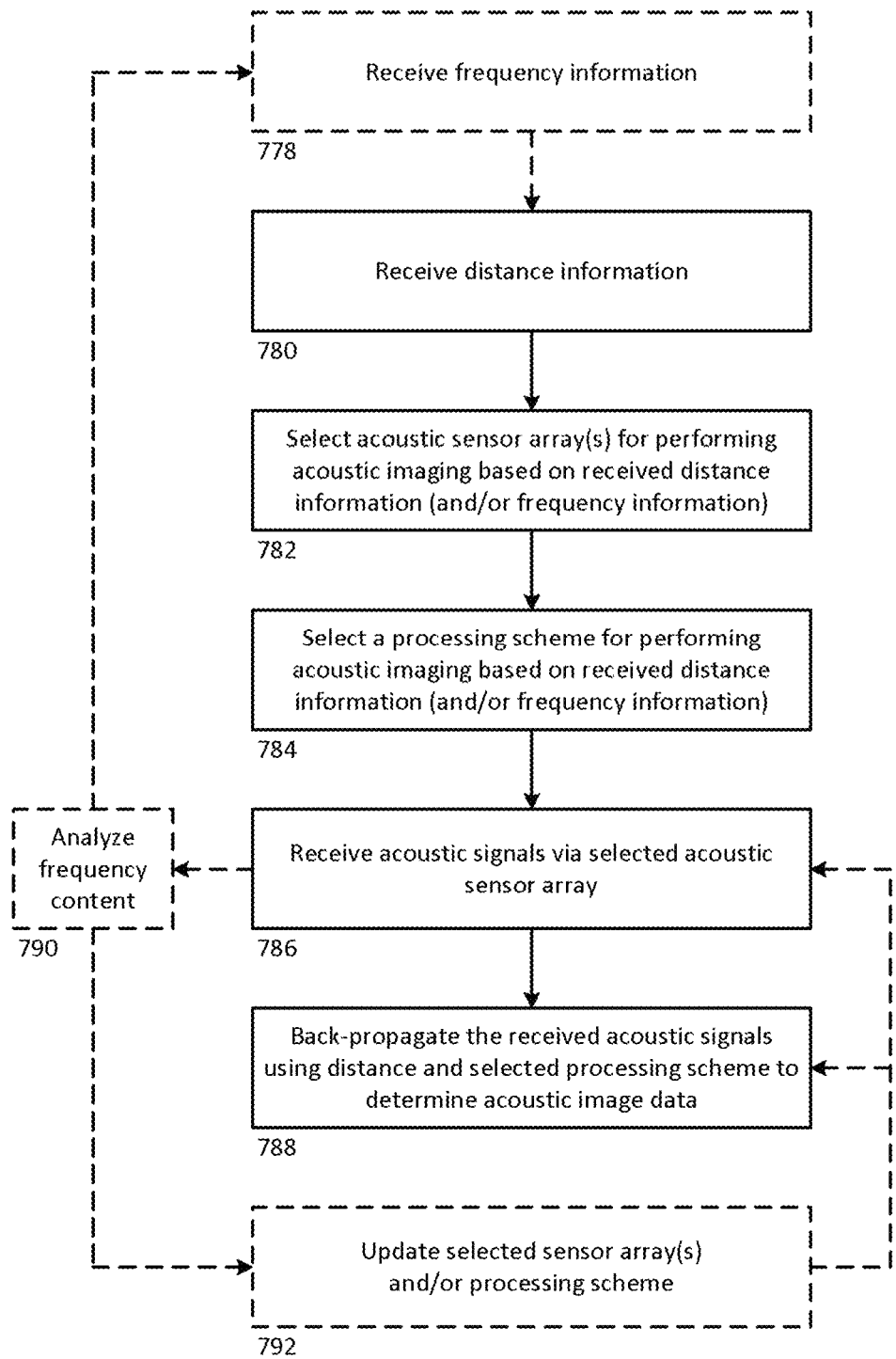
FIG. 7 is a process-flow diagram showing an exemplary process for generating acoustic image data from received acoustic signals.

As described, a distance-to-target metric can be used in a variety of ways in an acoustic imaging process, such as determining active sensor array(s), determining a back-propagation algorithm, performing the back-propagation algorithm, and/or registering a resulting acoustic image with electromagnetic image data (e.g., visible light, infrared, etc.). FIG. 7 is a process-flow diagram showing an exemplary process for generating acoustic image data from received acoustic signals.

The process of FIG. 7 includes receiving distance information (780), for example, from a distance measuring device or entered distance information, such as via a user interface. The method further includes the step of selecting one or more acoustic sensor array(s) for performing acoustic imaging based on the received distance information (782). As described, in various examples, selected array(s) can include a single array, a combination of multiple arrays, or portions of one or more arrays.

The method of FIG. 7 further includes the step of selecting a processing scheme for performing acoustic imaging based on the received distance information (784). In some examples, selecting a processing scheme can include selecting a back-propagation algorithm for generating acoustic image data from acoustic signals.

After selecting an acoustic sensor array (782) and processing scheme (784) for performing acoustic imaging, the method includes the steps of receiving acoustic signals via the selected acoustic sensor array (786). The received acoustic signals are then back-propagated using the distance and the selected processing scheme to determine acoustic image data (788).

In various embodiments, steps of FIG. 7 can be performed by a user, an acoustic analysis system (e.g., via processor 212), or a combination thereof. For example, in some embodiments, a processor can be configured to receive distance information (780) via a distance measuring tool and/or a user input. In some examples, a user can input a value to override a measured distance to use as the distance information, for instance, if the distance to an object is known and/or is difficult to analyze via the distance measuring tool (e.g., small object size and/or large distance to target, etc.). The processor can be further configured to automatically select an appropriate acoustic sensor array for performing acoustic imaging based on the received distance information, for example, using a lookup table or other database. In some embodiments, selecting an acoustic sensor array comprises enabling and/or disabling one or more acoustic sensor elements in order to achieve a desired acoustic sensor array.

Similarly, in some examples, the processor can be configured to automatically select a processing scheme (e.g., back-propagation algorithm) for performing acoustic imaging based on the received distance information. In some such examples, this can include selecting one from a plurality of known processing schemes stored in memory. Additionally or alternatively, selecting a processing scheme may amount to adjusting portions of a single algorithm to arrive at a desired processing scheme. For example, in some embodiments, a single back-propagation algorithm may include a plurality of terms and variable (e.g., based on distance information). In some such examples, selecting a processing scheme (784) can include defining one or more values in the single algorithm, such as adjusting coefficients for one or more terms (e.g., setting various coefficients to zero or one, etc.).

Thus, in some embodiments, an acoustic imaging system can automate several steps of an acoustic imaging process by suggesting and/or automatically implementing a selected acoustic sensor array and/or a processing scheme (e.g., a back-propagation algorithm) based on received distance data. This can speed up, improve, and simplify acoustic imaging processes, eliminating the requirements of an acoustic imaging expert to carry out an acoustic imaging process. Thus, in various examples, the acoustic imaging system can automatically implement such parameters, notify the user that such parameters are about to implemented, ask a user for permission to implement such parameters, suggest such parameters for manual input by a user, or the like.

Automatic selection and/or suggestion of such parameters (e.g., processing scheme, sensor array) can be useful to optimize localization of the acoustic image data with respect to other forms of image data, processing speed, and analysis of the acoustic image data. For instance, as described elsewhere herein, accurate back-propagation determination (e.g., using a proper algorithm and/or an accurate distance metric) can reduce parallax errors between acoustic image data and other (e.g., electromagnetic, such as visible light, infrared, etc.) image data. Additionally, utilizing proper algorithms and/or sensor arrays such as may be automatically selected or suggested by an acoustic analysis system can optimize the accuracy of the thermal image data, allowing for analysis of the received acoustic data.

Figure 8:
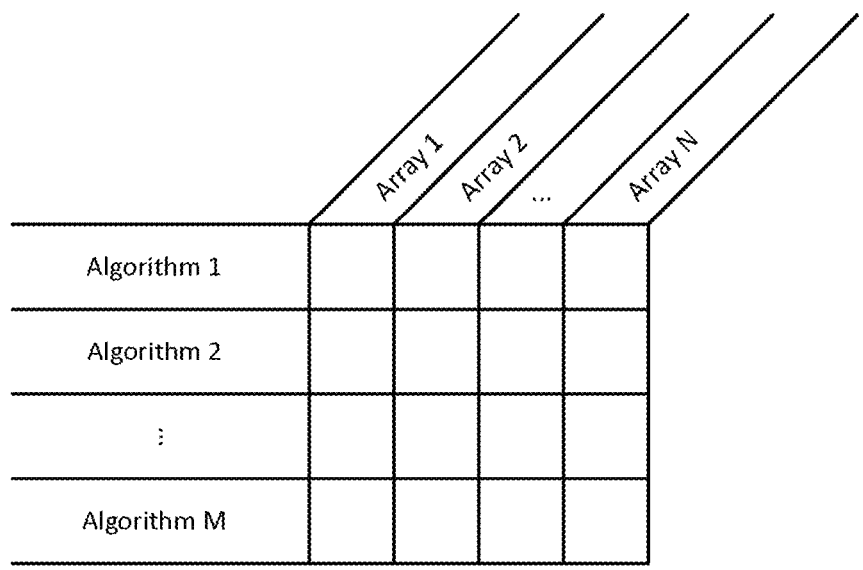
FIG. 8 shows an exemplary lookup table for determining an appropriate algorithm and sensor array for use during an acoustic imaging process.

As described, in some examples, an acoustic analysis system can be configured to automatically select an algorithm and/or a sensor array for performing acoustic imaging processes based on received distance information. In some such embodiments, a system includes a lookup table, for example, stored in memory, for determining which of a plurality of back-propagation algorithms and acoustic sensor arrays to use for determining acoustic image data. FIG. 8 shows an exemplary lookup table for determining an appropriate algorithm and sensor array for use during an acoustic imaging process.

In the illustrated example, the lookup table of FIG. 8 includes N columns, each representing different arrays: Array 1, Array 2, . . . , Array N. In various examples, each array comprises a unique set of acoustic sensor elements arranged. Different arrays may comprise sensor elements arranged into a lattice (e.g., array 392 and array 396 in FIG. 3C). Arrays within the lookup table can also include combinations of sensor elements from one or more such lattices. In general, in some embodiments, each of arrays Array 1, Array 2, . . . , Array N corresponds to a unique combination of acoustic sensor elements. Some of such combinations can include an entire set of sensor elements arranged in a particular lattice, or can include a subset of sensor elements arranged in a particular lattice. Any of a variety of combinations of acoustic sensor elements are possible options for use as a sensor array in the lookup table.

The lookup table of FIG. 8 further includes M rows, each representing a different algorithm: Algorithm 1, Algorithm 2, . . . , Algorithm M. In some examples, different algorithms may include different processes for performing back-propagation analysis of received acoustic signals. As described elsewhere herein, in some examples, some different algorithms can be similar to one another while having different coefficients and/or terms for modifying the back-propagation results.

The exemplary lookup table of FIG. 8 includes M×N entries. In some embodiments, the acoustic analysis system utilizing such a lookup table is configured to analyze received distance information and classify the distance information into one of M×N bins, wherein each bin corresponds to an entry in the lookup table of FIG. 8. In such examples, when the acoustic analysis system receives distance information, the system can find the entry (i,j) in the lookup table corresponding to the bin in which the distance information lies, and determine the appropriate algorithm and sensor array for use during an acoustic imaging process. For example, if the received distance information corresponds to the bin associated with entry (i,j), the acoustic analysis system can automatically utilize or suggest using Algorithm i and Array j for an acoustic imaging process.

In various such examples, distance information bins can correspond to uniformly sized distance ranges, for example, a first bin corresponding to distances of within one foot, a second bin corresponding to distances between one and two feet, and so on. In other examples, bins need not correspond to uniformly sized distance spans. Additionally, in some embodiments, fewer than M×N bins can be used. For example, in some embodiments, there may be an algorithm (e.g., Algorithm x) that is not ever used with a particular array (e.g., Array y). Thus, in such an example, there would be no corresponding distance information bin corresponding to entry (x,y) in the M×N lookup table.

In some embodiments, statistical analysis on the populated distance bins can be used for identifying a most common distance or distance range within the target scene. In some such embodiments, the distance bin having the highest number of corresponding locations (e.g., a highest number of locations with acoustic signals) can be used as distance information in the process of FIG. 7. That is, in some embodiments, a utilized acoustic sensor array and/or processing scheme may be implemented and/or recommended based on statistical analysis of the distance distribution of various objects in the target scene. This can increase the likelihood that sensor array and/or processing scheme used for acoustic imaging of a scene is appropriate for the largest number of locations within the acoustic scene.

Additionally or alternatively, parameters other than distance information can be used to select appropriate sensor arrays and/or processing schemes to use in generating acoustic image data. As described elsewhere herein, various sensor arrays can be configured to be sensitive to certain frequencies and/or frequency bands. In some examples, different back-propagation calculations similar can be used according to different acoustic signal frequency content. Thus, in some examples, one or more parameters can be used to determine a processing scheme and/or acoustic sensor array.

In some embodiments, the acoustic analysis system can be used to initially analyze various parameters of received acoustic signals processing/analysis. With reference back to FIG. 7, a method for generating acoustic image data can include a step of, after receiving acoustic signals (786), analyzing frequency content of the received signals (790). In some such examples, if the acoustic sensor array(s) and/or processing schemes have been selected (e.g., via steps 782 and/or 784, respectively), the method can include the steps of updating the selected array(s) and/or updating the selected processing scheme (792), for example, based on the analyzed frequency content.

After updating the sensor array(s) and/or processing scheme, the method can perform various actions using the updated parameters. For example, if the selected sensor array(s) is updated (792) based on analyzed frequency content (790), then new acoustic signals can be received from the (newly) selected acoustic sensor array (786), which can then be back-propagated to determine acoustic image data (788). Alternatively, if the processing scheme is updated at 792, already-captured acoustic signals can be back-propagated according to the updated processing scheme to determine updated acoustic image data. If both the processing scheme and the sensor array(s) are updated, new acoustic signals can be received using the updated sensor array and can be back-propagated according to the updated processing scheme.

In some embodiments, an acoustic analysis system can receive frequency information (778) without analyzing frequency content of received acoustic signals (790). For instance, in some examples, an acoustic analysis system can receive information regarding a desired or expected frequency range for future acoustic analysis. In some such examples, the desired or expected frequency information can be used to select one or more sensor arrays and/or a processing scheme that best fits the frequency information. In some such examples, the step(s) of selecting acoustic sensor array(s) (782) and/or selecting a processing scheme (784) can be based on received frequency information in addition or alternatively to received distance information.

In some examples, received acoustic signals (e.g., received via the acoustic sensor elements) can be analyzed, for example, via a processor (e.g., 210) of an acoustic analysis system. Such analysis can be used to determine one or more properties of the acoustic signals, such as frequency, intensity, periodicity, apparent proximity (e.g., a distance estimated based on received acoustic signals), measured proximity, or any combinations thereof. In some examples, acoustic image data can be filtered, for instance, to only show acoustic image data representing acoustic signals having a particular frequency content, periodicity, or the like. In some examples, any number of such filters can be applied simultaneously.

As described elsewhere herein, in some embodiments, a series of frames of acoustic image data can be captured over time, similar to acoustic video data. Additionally or alternatively, even if acoustic image data is not repeatedly generated, in some examples, acoustic signals are repeatedly sampled and analyzed. Thus, with or without repeated acoustic image data generation (e.g., video), parameters of acoustic data, such as frequency, can be monitored over time.

Figure 9A:
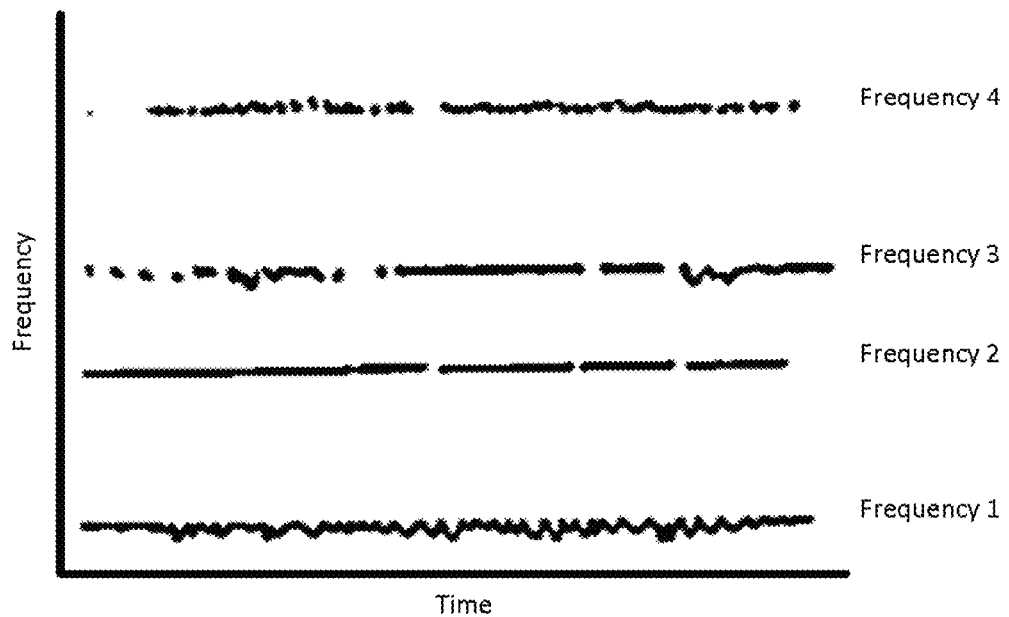
FIG. 9A is an exemplary plot of frequency content of received image data over time in an acoustic scene.

FIG. 9A is an exemplary plot of frequency content of received image data over time in an acoustic scene. As shown, the acoustic scene represented by the plot of FIG. 9A generally includes four sustained frequencies over time, labeled as Frequency 1, Frequency 2, Frequency 3, and Frequency 4. Frequency data, such as the frequency content of a target scene, can be determined via processing received acoustic signals, for example, using a Fast Fourier Transform (FFT) or other known method of frequency analysis.

Figure 9B:
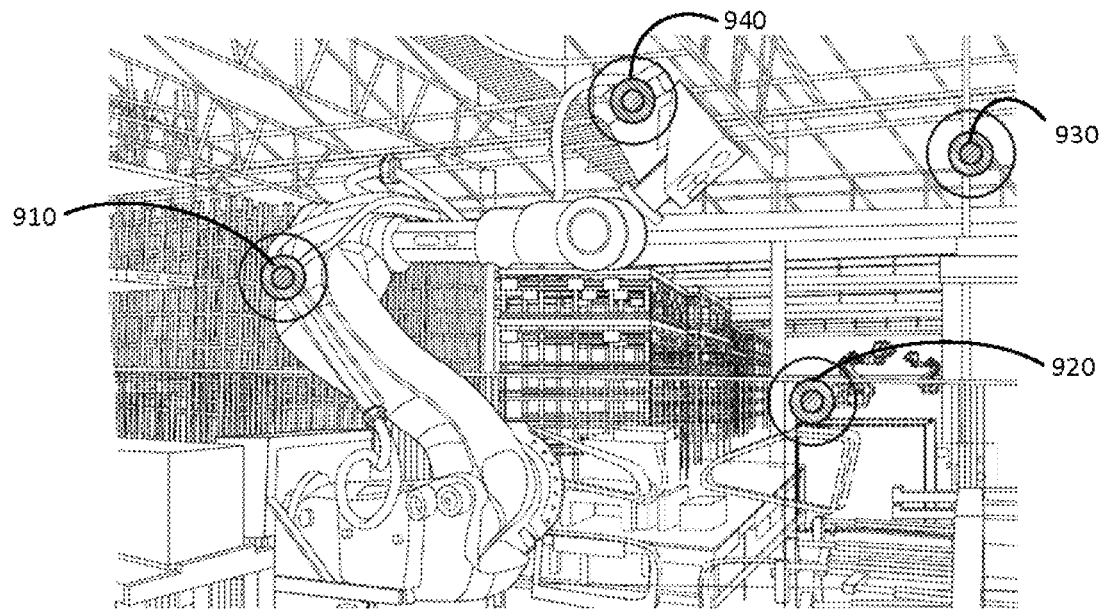
FIG. 9B shows an exemplary scene including a plurality of locations emitting acoustic signals.

FIG. 9B shows an exemplary scene including a plurality of locations emitting acoustic signals. In the illustrated image, acoustic image data is combined with visible light image data, and shows acoustic signals present at locations 910, 920, 930, and 940. In some embodiments, acoustic analysis system is configured to display acoustic image data of any detected frequency range. For instance, in an exemplary embodiment, location 910 includes acoustic image data including Frequency 1, location 920 includes acoustic image data including Frequency 2, location 930 includes acoustic image data including Frequency 3, and location 940 includes acoustic image data including Frequency 4.

In some such examples, displaying acoustic image data representative frequency ranges is a selectable mode of operation. Similarly, in some embodiments, acoustic analysis system is configured to display acoustic image data representative of frequencies only within a predetermined frequency band. In some such examples, displaying acoustic image data representing a predetermined frequency range comprises selecting one or more acoustic sensor arrays for receiving acoustic signals from which to generate acoustic image data. Such arrays can be configured to receive a selective frequency range. Similarly, in some examples, one or more filters can be employed to limit the frequency content used to generate the acoustic image data. Additionally or alternatively, in some embodiments, acoustic image data comprising information representative of a broad range of frequencies can be analyzed and shown on the display only if the acoustic image data satisfies a predetermined condition (e.g., falls within a predetermined frequency range).

Figure 9C:
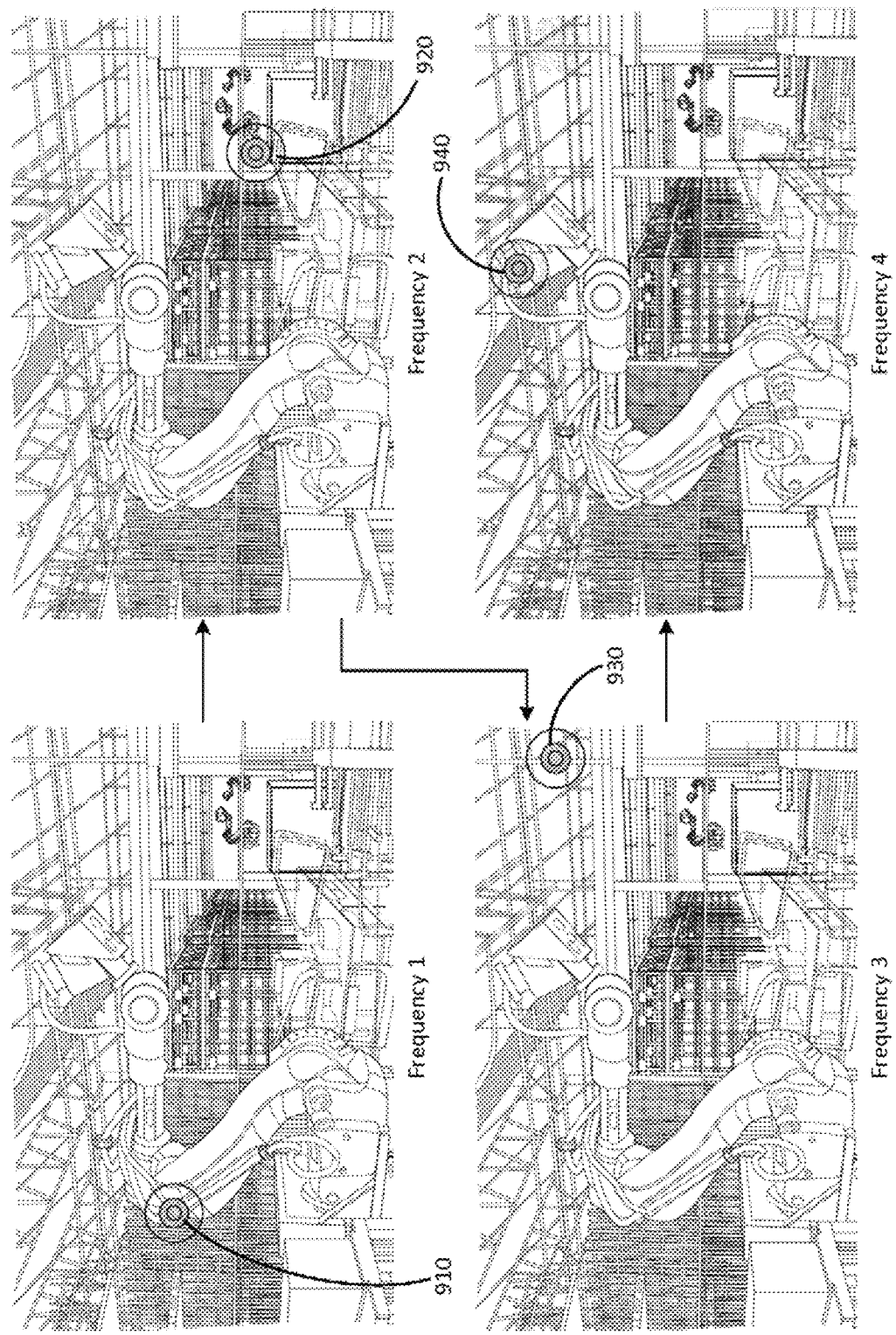
FIG. 9C shows a plurality of combined acoustic and visible light image data at a plurality of predefined frequency ranges.

FIG. 9C shows a plurality of combined acoustic and visible light image data at a plurality of predefined frequency ranges. A first image includes acoustic image data at a first location 910 that includes frequency content of Frequency 1. A second image includes acoustic image data at a second location 920 that includes frequency content of Frequency 2. A third image includes acoustic image data at a third location 930 that includes frequency content of Frequency 3. A fourth image includes acoustic image data at a fourth location 940 that includes frequency content of Frequency 4.

In an exemplary embodiment, a user may select various frequency ranges, such as ranges including Frequency 1, Frequency 2, Frequency 3, or Frequency 4, for filtering acoustic image data representative of frequency content other than the selected frequency range. Thus, in such examples, any of the first, second, third, or fourth images may be displayed as a result of a desired frequency range being selected by a user.

Additionally or alternatively, in some examples, an acoustic analysis system may cycle between a plurality of display images, each having different frequency content. For instance, with respect to FIG. 9C, in an exemplary embodiment, an acoustic analysis system may display, in a sequence, the first, second, third, and fourth images, such as shown by the arrows in FIG. 9C.

In some examples, display images can include a text or other display representative of the frequency content being displayed in the image so that a user may observe which locations in the image include acoustic image data representative of certain frequency content. For example, with respect to FIG. 9C, each image may show a textual representation of the frequency represented in the acoustic image data. With respect to FIG. 9B, an image showing a plurality of frequency ranges may include indications of the frequency content at each location including acoustic image data. In some such examples, a user may select a location in the image, for example, via a user interface, for which to view the frequency content present at that location it the acoustic scene. For example, a user may select first location 910, and the acoustic analysis system may present the frequency content of the first location (e.g., Frequency 1). Thus, in various examples, a user can use the acoustic analysis system in order to analyze the frequency content of an acoustic scene, such as by viewing where in the scene corresponds to certain frequency content and/or by viewing what frequency content is present at various locations.

During exemplary acoustic imaging operation, filtering acoustic image data by frequency can help reduce image clutter, for example, from background or other unimportant sounds. In an exemplary acoustic imaging procedure, a user may wish to eliminate background sounds, such as floor noise in an industrial setting. In some such instances, background noise can include mostly low frequency noise. Thus, a user may choose to show acoustic image data representative of acoustic signals greater than a predetermined frequency (e.g., 10 kHz). In another example, a user may wish to analyze a particular object that generally emits acoustic signals within a certain range, such as corona discharge from a transmission line (e.g., as shown in FIGS. 5A and 5B). In such an example, a user may select a particular frequency range (e.g., between 11 kHz and 14 kHz for corona discharge) for acoustic imaging.

In some examples, an acoustic analysis system can be used to analyze and/or present information associated with the intensity of received acoustic signals. For example, in some embodiments, back-propagating received acoustic signals can include determining an acoustic intensity value at a plurality of locations in the acoustic scene. In some examples, similar to frequency described above, acoustic image data is only included in a display image if the intensity of the acoustic signals meets one or more predetermined requirements.

In various such embodiments, a display image can include acoustic image data representative of acoustic signals above a predetermined threshold (e.g., 15 dB), acoustic signals below a predetermined threshold (e.g., 100 dB), or acoustic signals within a predetermined intensity range (e.g., between 15 dB and 40 dB). In some embodiments, a threshold value can be based on a statistical analysis of the acoustic scene, such as above or below a standard deviation from the mean acoustic intensity.

Similar to as described above with respect to frequency information, in some embodiments, restricting acoustic image data to represent acoustic signals satisfying one or more intensity requirements can include filtering received acoustic signals so that only received signals that satisfy the predetermined conditions are used to generate acoustic image data. In other examples, acoustic image data is filtered to adjust which acoustic image data is displayed.

Additionally or alternatively, in some embodiments, acoustic intensity at locations within an acoustic scene can be monitored over time (e.g., in conjunction with a video acoustic image representation or via background analysis without necessarily updating a display image). In some such examples, predetermined requirements for displaying acoustic image data can include an amount or rate of change in acoustic intensity at a location in an image.

Figure 10A:
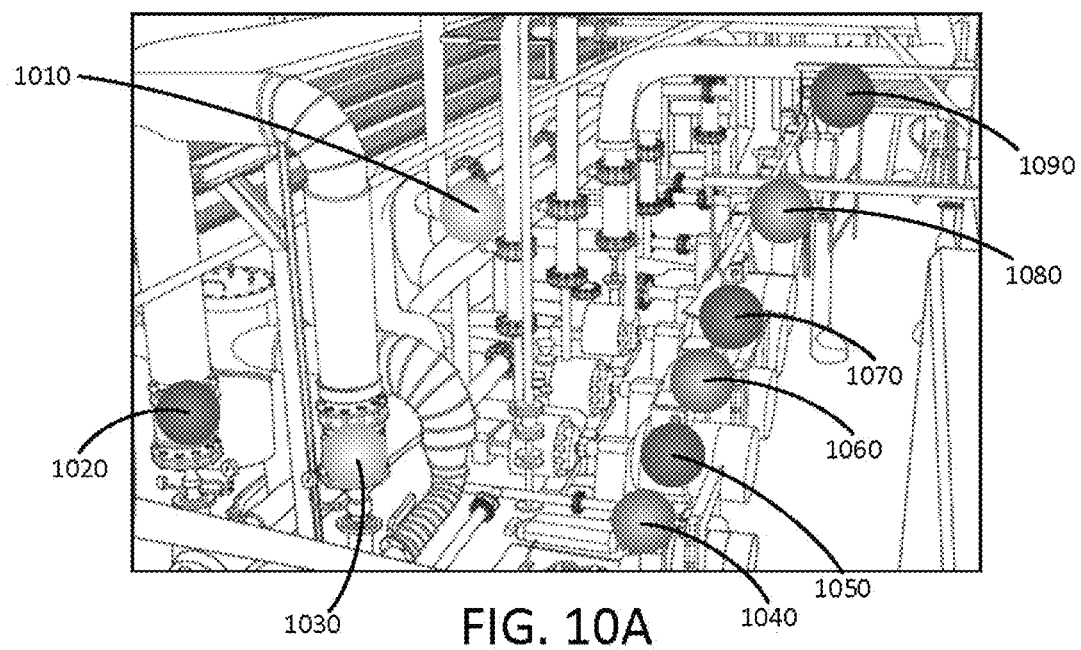
FIGS. 10A and 10B are exemplary display images including combined visible light image data and acoustic image data.
Figure 10B:
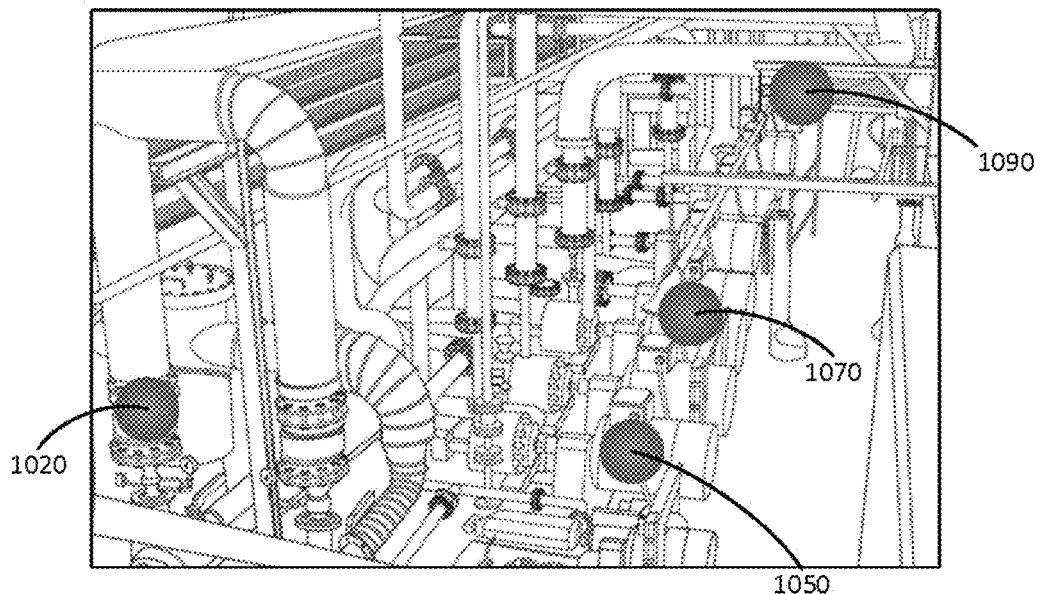

FIGS. 10A and 10B are exemplary display images including combined visible light image data and acoustic image data. FIG. 10A shows a display image including acoustic image data shown at a plurality of locations 1010, 1020, 1030, 1040, 1050, 1060, 1070, 1080, and 1090. In some examples, intensity values can be palettized, for example, wherein an acoustic intensity value is assigned a color based on a predetermined palettization scheme. In an exemplary embodiment, intensity values can be categorized according to intensity ranges (e.g., 10 dB-20 dB, 20 dB-30 dB, etc.). Each intensity range can be associated with a particular color according to a palettization scheme. Acoustic image data can include a plurality of pixels, wherein each pixel is colorized in the color associated with the intensity range into which the intensity represented by the pixel of acoustic image data falls. In addition or alternatively to being differentiated by color, different intensities can be distinguished according to other properties, such as transparency (e.g., in an image overlay in which acoustic image data is overlaid onto other image data) or the like.

Additional parameters may also be palettized, such as a rate of change of acoustic intensity. Similar to intensity, varying rates of change in acoustic intensity can be palettized such that portions of the scenes exhibiting different rates and/or amounts of acoustic intensity change are displayed in different colors.

In the illustrated example, the acoustic image data is palettized according to an intensity palette, such that acoustic image data representative of different acoustic signal intensities are shown in a different color and/or shade. For instance, acoustic image data at locations 1010 and 1030 show a palettized representation of a first intensity, locations 1040, 1060, and 1080 show a palettized representation of a second intensity, and locations 1020, 1050, 1070, and 1090 show a palettized representation of a third intensity. As shown in the exemplary representation in FIG. 10A, each location showing a palettized representation of acoustic image data shows circular pattern having a color gradient extending outward from the center. This can be due to the decay of acoustic intensity as the signals propagate from a source of the acoustic signals.

In the example of FIG. 10A, acoustic image data is combined with visible light image data to generate a display image, which may be presented to a user, for example, via a display. A user may view the display image of FIG. 10A in order to view which locations in a visible scene are producing acoustic signals, and the intensities of such signals. Thus, a user may quickly and easily observe which locations are producing sounds and compare the intensities of the sounds coming from various locations in the scene.

Similar to as described with respect to frequencies elsewhere herein, in some embodiments, acoustic image data may be presented only if the corresponding acoustic signals meet a predetermined intensity condition. FIG. 10B shows an exemplary display image similar to the display image of FIG. 10A and including visible light image data and acoustic image representing acoustic signals above a predetermined threshold. As shown, of locations 1010, 1020, 1030, 1040, 1050, 1060, 1070, 1080, and 1090 in FIG. 10A that include acoustic image data, only locations 1020, 1050, 1070, and 1090 include acoustic image data representing acoustic signals that meet a predetermined condition.

In an exemplary scenario, FIG. 10A can include all acoustic image data above a noise floor threshold at each of locations 1010-990, while FIG. 10B shows the same scene as FIG. 10A, but only showing acoustic image data having an intensity greater than 40 dB. This can help a user identify which sources of sound in an environment (e.g., in the target scene of FIGS. 10A and 10B) are contributing certain sounds (e.g., the loudest sounds in a scene).

In addition or alternatively to being compared directly to an intensity threshold (e.g., 40 dB), as described elsewhere herein, in some such examples, predetermined requirements for displaying acoustic image data can include an amount or rate of change in acoustic intensity at a location in an image. In some such examples, acoustic image data may be presented only if a rate of change or an amount of change in acoustic intensity at a given location satisfies a predetermined condition (e.g., is greater than a threshold, less than a threshold, within a predetermined range, etc.). In some embodiments, amount or rate of change of acoustic intensity can be palettized and displayed as or in conjunction with intensity acoustic image data. For instance, in an exemplary embodiment, when a rate of change is used as a threshold to determine in which locations to include acoustic image data, the acoustic image data can include a palettized intensity rate of change metric for display.

In some examples, a user may manually set an intensity requirement (e.g., minimum value, maximum value, range, rate of change, amount of change, etc.) for the acoustic image data to be displayed. As discussed elsewhere herein, including acoustic image data that only meets the intensity requirement can be achieved during acoustic image data generation (e.g., via filtering received acoustic signals) and/or can be performed by not displaying generated acoustic image data representing acoustic signals that do not meet the set requirement(s). In some such examples, filtering a display image according to intensity values can be performed after the acoustic image data and visible light image data have been captured and stored in memory. That is, data stored in memory can be used to generate display images including any number of filtering parameters, such as only showing acoustic image data meeting predefined intensity conditions and the like.

In some examples, setting a lower bound for intensity in an acoustic image (e.g., only displaying acoustic image data representative of acoustic signals above a predetermined intensity) can eliminate the inclusion of undesired background or ambient sounds and/or sound reflections from the acoustic image data. In other instances, setting an upper bound for intensity in an acoustic image (e.g., only display-ing acoustic image data representative of acoustic signals below a predetermined intensity) can eliminate the inclusion of expected loud sounds in acoustic image data in order to observe acoustic signals ordinarily masked by such loud sounds.

Several display functions are possible. For example, similar to the frequency analysis/display discussed with respect to FIG. 9C, in some examples, the acoustic analysis system can cycle through a plurality of display images, each showing acoustic image data satisfying different intensity requirements. Similarly, in some examples, a user may scroll through a series of acoustic intensity ranges in order to view the locations in the acoustic image data having acoustic intensity in the given range.

Figure 11A:
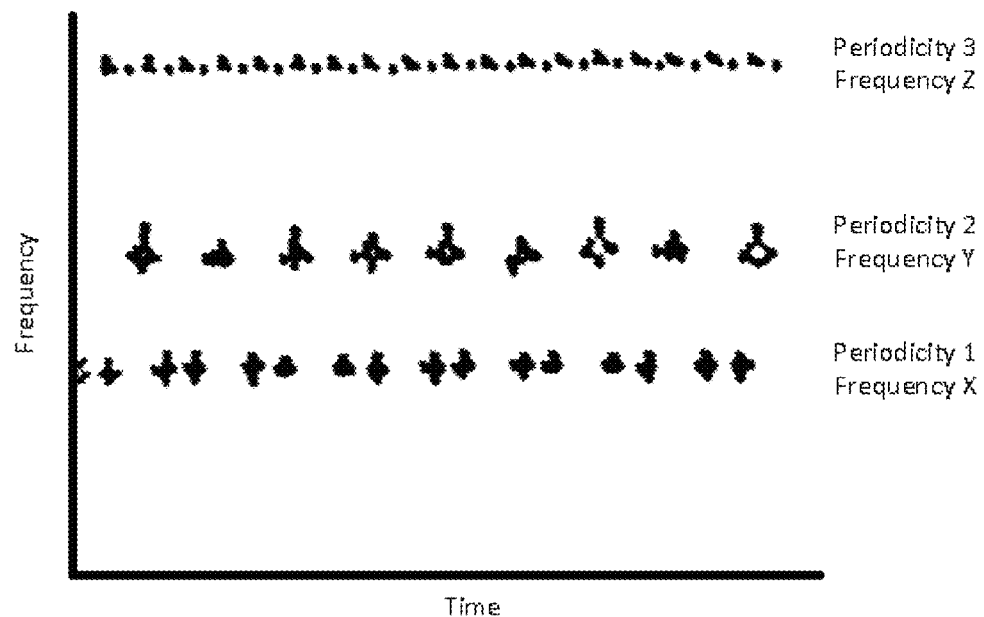
FIGS. 11A and 11B show exemplary plots of frequency vs. time of acoustic data in an acoustic scene.
Figure 11B:
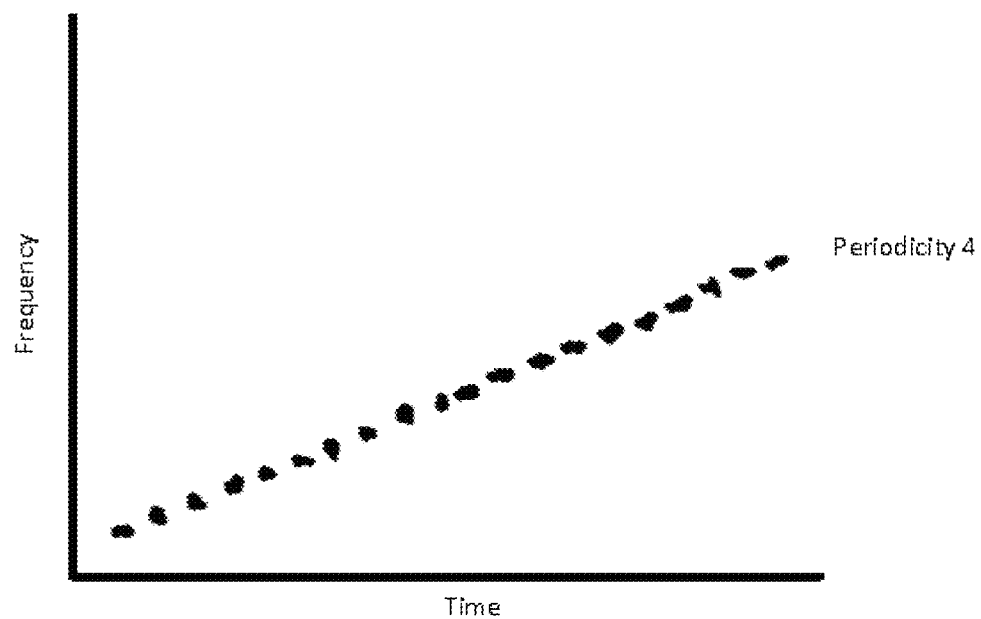

Another parameter that can be used to analyze acoustic data is a periodicity value of an acoustic signal. FIGS. 11A and 11B show exemplary plots of frequency vs. time of acoustic data in an acoustic scene. As shown in the plot of FIG. 11A, the acoustic data includes signals at a frequency X having a first periodicity, signals at a frequency Y having a second periodicity, and signals at a frequency Z having a third periodicity. In the illustrated example, acoustic signals having different frequencies may also include different periodicity in the acoustic signals.

In some such examples, acoustic signals can be filtered based on periodicity in addition or alternatively to frequency content. For instance, in some examples, multiple sources of acoustic signals in an acoustic scene may produce acoustic signals at a particular frequency. If a user wishes to isolate one such sound source for acoustic imaging, the user may choose to include or exclude acoustic image data from a final display image based on the periodicity associated with the acoustic data.

FIG. 11B shows a plot of frequency vs. time of an acoustic signal. As shown, the frequency increases over time approximately linearly. However, as shown, the signal includes an approximately constant periodicity over time. Thus, such a signal may or may not appear in an acoustic image depending on selected display parameters. For instance, the signal may at some points in time satisfy frequency criteria for being displayed, but at other points in time, be outside of a displayed frequency range. However, a user could choose to include or exclude such a signal from acoustic image data based on the periodicity of the signals regardless of the frequency content.

In some examples, extracting acoustic signals of a particular periodicity can be helpful in analyzing a particular portion of a target scene (e.g., a particular piece of equipment or type of equipment that typically operates at a certain periodicity). For example, if an object of interest operates at a certain periodicity (e.g., once per second), excluding signals having periodicity distinct from this can improve acoustic analysis of the object of interest. For example, with reference to FIG. 11B, if an object of interest operates at periodicity 4, isolating signals having periodicity 4 for analysis may yield improved analytics of the object of interest. For example, the object of interest may emit sounds having periodicity 4, but increasing frequency, such as shown in FIG. 11B. This can imply that the properties of the object may be changing (e.g., increased torque or load, etc.) and should be inspected.

In an exemplary acoustic imaging process, background noises (e.g., floor noise in an industrial setting, wind in an outdoor environment, etc.) are generally not periodic while certain objects of interest within a scene emit period acoustic signals (e.g., machinery operating at a regular interval). Thus, a user may choose to exclude non-periodic acoustic signals from an acoustic image in order to remove background signals and more clearly present acoustic data of interest. In other examples, a user may be looking to find the source of a constant tone, and so may choose to exclude period signals from acoustic image data that may obscure viewing of a constant tone. In general, a user may choose to include in acoustic image data acoustic signals that are above a certain periodicity, below a certain periodicity, or within a desired range of periodicities. In various examples, periodicity can be identified by either a length of time between periodic signals or a frequency of occurrence of periodic signals. Similar to frequency as shown in FIG. 11B, an analysis of intensity at a given periodicity (e.g., due to an object of interest operating at that periodicity) can similar be used to track how acoustic signals from the object change over time. In general, in some embodiments, periodicity can be used to perform rate-of-change analysis for a variety of parameters, such as frequency, intensity, and the like.

In some cases, a user may wish to capture a plurality of overlapping acoustic images. For instance, in some examples, a user may wish to emphasize different types of acoustic signals in various portions of the target scene, such as acoustic signals comprising different acoustic parameters (e.g., differences in frequency, sound intensity (e.g., dB level), distance to target, periodicity, etc.). Additionally or alternatively, in some examples, a user may wish to capture an acoustic image representing an acoustic scene that is larger than the acoustic field of view (FOV) of the acoustic sensor array (e.g., acoustic sensor array 102) being used. Capturing multiple acoustic images can provide information regarding portions of the target scene outside of the FOV of a single such image. Acoustic image data from such multiple acoustic images can be viewed in combination to provide acoustic information for an overall larger target scene. Capturing multiple acoustic images can therefore provide a larger virtual FOV when viewed together than the individual FOV of each individual acoustic image. To capture multiple acoustic images, panoramic scans of a scene by the acoustic sensor array may be used, such as vertical panoramic scans, horizontal panoramic scans, a combination thereof, or the like.

Panoramic scans may be captured by adjusting the position and/or orientation of the acoustic analysis system to adjust the FOV of the acoustic sensor array. In some embodiments, the acoustic analysis system may be manipulated by a user, such as by being handheld or on an adjustable stand (e.g., tripod, monopod, etc.). Additionally or alternatively, other systems may be used, such as linear movement systems, pan and tilt systems, 360-degree rotation systems, or the like. In some examples, such movement systems may be configured to support a housing that includes an acoustic sensor array and/or electromagnetic imaging tool, and can be configured to manipulate the housing such that the FOV of the acoustic sensor array and/or electromagnetic imaging tool changes. Additionally or alternatively, in some examples, an acoustic analysis system can include an acoustic sensor array positioned on a movement system such that the array can be manipulated (e.g., panned, tilted, rotated, etc.) independent of the housing. In various examples, an electromagnetic imaging tool and acoustic sensor array can be fixedly coupled to one another such that manipulating one (e.g., via a pan, tilt, or rotation) results in a similar manipulation of the other. In other examples, an electromagnetic imaging tool and acoustic sensor array are not coupled to one another such that one such component can be manipulated (e.g., panned, tilted, or rotated) independently of the other.

In some embodiments, the system may comprise a movement mechanism configured to manipulate an electromagnetic imaging tool and/or an acoustic sensor array to adjust the FOV thereof. Movement mechanisms can include, for example, a motorized movement mechanism including a motor configured to move (e.g., pan, tilt, rotate, etc.) the electromagnetic imaging tool and/or acoustic sensor array. In such embodiments, a motorized movement mechanism may be automated or programmed to periodically adjust the FOV of the acoustic sensor array, such as between capturing acoustic image data from a scene. Furthermore, a motorized movement mechanism may be used to periodically scan (e.g., capture multiple acoustic images) of the target scene, such as on a schedule or an input from a controller or a user. In embodiments comprising a schedule, the schedule may be automated, such as by a processor (e.g., processor 212, an external processor, or the like).

Figure 12:
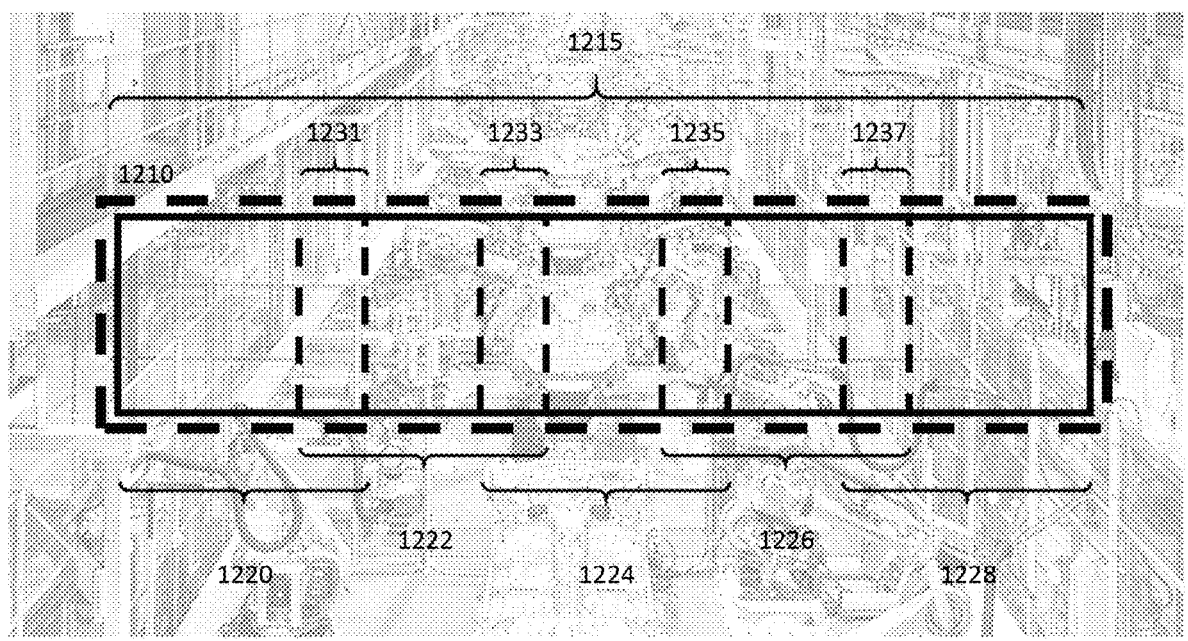
FIG. 12 shows a visualization of a horizontal panoramic scan using a linear horizontal scanning system.

FIG. 12 provides an example embodiment of an acoustic analysis system using a panoramic scan to capture multiple acoustic images of a target scene 1210. In some cases, the FOV of the acoustic sensor array may not capture the entire target scene 1210 desired to be analyzed. In some embodiments, multiple acoustic images with different fields of view may be captured, such as acoustic images 1220-1228, to fully capture the data included in the entire desired acoustic target scene 1210, such as shown in FIG. 12.

In some embodiments, one or more electromagnetic images of a target scene (e.g., target scene 1210) may be captured. For example, electromagnetic images may be captured to correspond with one or more of the acoustic images 1220-1228. In such embodiments, one or more electromagnetic images may be blended with the acoustic images and displayed on a display such as discussed elsewhere herein. Furthermore, in some embodiments, systems may capture no electromagnetic images or may capture an electromagnetic image representing a different field of view than the corresponding acoustic image, such as larger or smaller field of view.

With reference to FIG. 12, acoustic images 1220-1228 may be captured by the same acoustic analysis system (e.g., acoustic imaging device 100, acoustic analysis system 200, etc.), or multiple acoustic analysis systems can be used to capture one or more such acoustic images. In some embodiments, the acoustic analysis system is adjusted prior to taking each acoustic image to capture different portions of the target scene. Such adjustments may be made by a user or by a motorized movement mechanism as described herein. For example, acoustic image 1220 may be captured, and then the acoustic analysis system is panned, tilted, and/or rotated to capture acoustic image 1222. Similarly, the acoustic analysis system can be adjusted for capturing each of the other acoustic images (e.g., acoustic images 1224, 1226, and 1228).

Two or more acoustic images (e.g., acoustic images 1220-1228) may comprise overlapping portions of the desired target scene, such as target scene 1210. In FIG. 12, each acoustic image is shown as overlapping with the neighboring acoustic images. More specifically, acoustic image 1220 and acoustic image 1222 comprise overlapping portion 1231. Similarly, acoustic image 1222 and acoustic image 1224 may comprise overlapping portion 1233; acoustic image 1224 and acoustic image 1226 may comprise overlapping portion 1235; and acoustic image 1226 and acoustic image 1228 may comprise overlapping portion 1237. The overlapping portions may include acoustic information from the acoustic data forming the neighboring acoustic images (e.g., overlapping portion 1231 may include acoustic information from either the acoustic image 1220 or the acoustic image 1222, or from a combination of the acoustic images 1220 and 1222).

As shown in FIG. 12, two or more acoustic images (e.g., acoustic images 1220-1228) may be combined into a panorama, such as panorama 1215. The panorama 1215 may comprise the FOVs of the combined acoustic images, resulting in the panorama comprising a virtual FOV which is larger than the individual FOVs of each acoustic image.

In some embodiments, combining acoustic images to form a panorama comprises registering the acoustic images such that the acoustic images are aligned. In some embodiments, registering the acoustic images comprises spatially aligning the acoustic data based on the FOV of each acoustic image and/or the orientation/position of the acoustic sensor array when the acoustic data was captured. For instance, in some embodiments, various optical or mechanical systems may be used to measure the pan, tilt, and rotation of each acoustic image captured. Such pan, tilt, and rotation information associated with each image can be used to position each acoustic image relative to one another within a panorama. For example, an inertial measuring unit (IMU) may be used to capture the position and/or orientation on the acoustic sensor array and/or relative changes in such information between captured data sets. Such information may be used to orient and position each acoustic image relative to others within a panorama. In embodiments wherein a motorized movement mechanism is used to adjust a FOV of the acoustic analysis system, each adjustment (e.g., change in position, pan, tilt, and rotation) may be recorded and used to register the acoustic images when combining the acoustic images into a panorama. In some examples, a motorized movement mechanism is configured to adjust a FOV of the acoustic analysis system by a predetermined amount, and the acoustic analysis system is configured to use the predetermined amount of FOV adjustment in registering subsequently captured data for creating a panorama.

In some embodiments including electromagnetic images, electromagnetic image data may be used when combining acoustic images. For example, an electromagnetic image may be captured along with each acoustic image. Associated electromagnetic images can be registered (e.g., based on overlapping portions of the electromagnetic images) and such registration information can be used to similarly register the acoustic images.

In some embodiments, after the acoustic images are registered, the acoustic images may be combined to form the panorama. Furthermore, the panorama may be presented to a user, such as displaying the panorama on a display and/or saved to memory for later use. In various examples, the display may be integral with an acoustic imaging device and/or can include an external display, such as on a smart device, computer, tablet, or the like.

Figure 16:
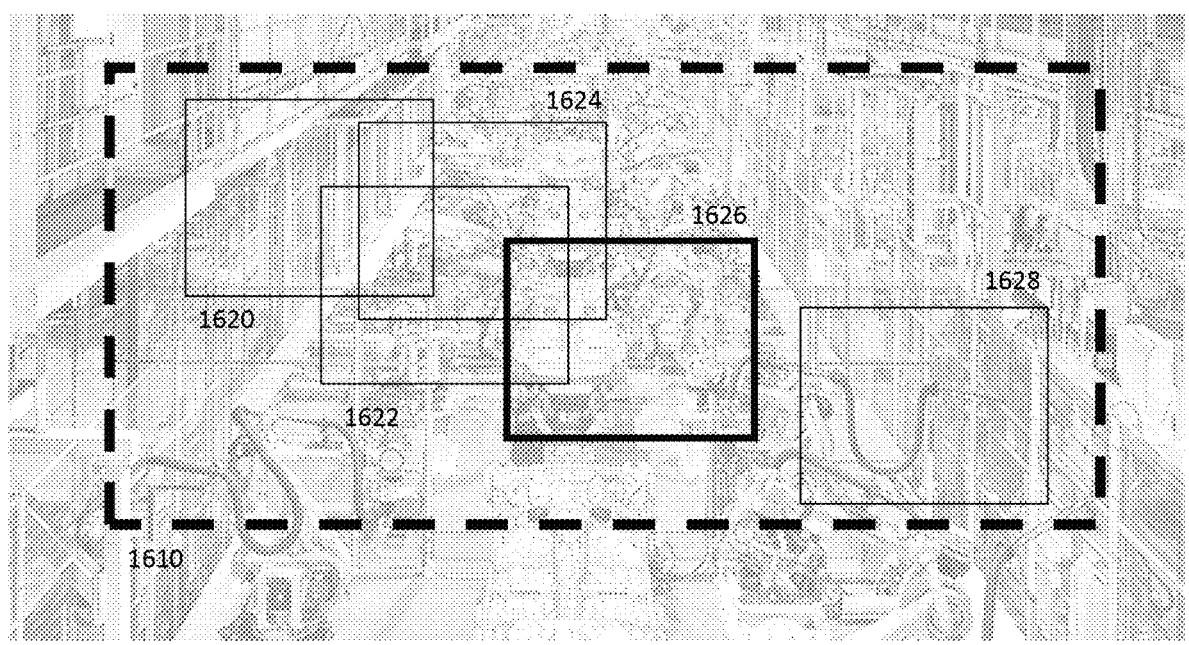
FIG. 16 shows a large area panoramic scan using a combination horizontal panoramic scans and vertical panoramic scans.

For simplicity, FIG. 12 illustrates the acoustic images (e.g., acoustic images 1220-1228) being congruent and the overlapping portions (e.g., overlapping portions 1231-1237) being congruent. However, alternative sizes and shapes may be used for both the acoustic images and the overlapping portions(s). For example, each acoustic image may be captured after a different amount of shifting/panning such that one or more of the overlapping portions 1231-1237 differ from one or more of the other overlapping portions 1231-1237. Moreover, in some examples, the respective fields of view of the different images may have different sizes or shapes, for example, due to changes in the distance to various portions of the scene as the system is tilted, etc. Additionally or alternatively, in some cases, one or more of the captured acoustic images may simply not overlap with any of the other captured acoustic images (e.g., as shown in FIG. 16).

In some embodiments, each of acoustic images 1220-1228 may be captured with the acoustic sensor array in a different position and/or orientation, such as by adjusting the acoustic analysis system as discussed above. Additionally or alternatively, the analysis of acoustic data received by the acoustic sensor array may be adjusted for each of acoustic images 1220-1228, and in some such examples, such acoustic images may be captured without physically adjusting the acoustic sensor array. For example, in some embodiments, different sensor arrays (e.g., different subsets of available acoustic sensors) and/or different backpropagation algorithms may be used to determine the field of view for each acoustic image (e.g., acoustic images 1220-1228).

Figure 13:
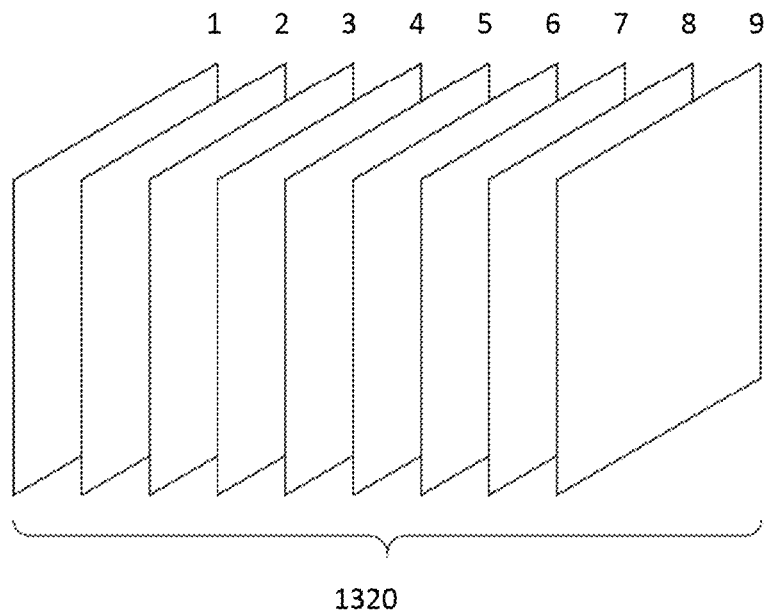
FIG. 13 provides a simplified example of an acoustic image comprising a plurality of acoustic image frames.

In some embodiments, the acoustic analysis system may be configured to display or otherwise capture a plurality of acoustic image frames (e.g., to create a video) associated with each field of view of one or more of the acoustic images 1220-1228, for example including frames of acoustic data captured in succession. FIG. 13 provides a simplified example of an acoustic image 1320 comprising a plurality of acoustic image frames. As shown, acoustic image 1320 comprises nine acoustic image frames showing approximately the same field of view. While acoustic image 1320 as shown comprises nine acoustic image frames, more or fewer than nine acoustic image frames may be comprised within an acoustic image. The acoustic image 1320 may comprise a plurality of acoustic image frames (e.g., acoustic image frames 1-9) captured in quick succession, such as 24 acoustic image frames per second, 30 acoustic image frames per second, 60 acoustic image frames per second, or the like. The plurality of acoustic frames (e.g., acoustic frames 1-9) may also not be captured in quick succession, but rather be captured over time, such as with a time lapse.

In some embodiments, other acoustic image frames/acoustic images may be captured between acoustic image frames used in acoustic image 1320, such as acoustic images comprising other fields of view. For instance, in some examples, the system can be configured to cycle through a plurality of fields of view (e.g., to create a panorama). The system can be configured to associate data (e.g., acoustic image data) captured from the same field of view even if intervening data sets are captured from other fields of view. In some such examples, this is similar to a time-lapse data collection for each of a plurality of fields of view.

In some embodiments, each acoustic image (e.g., acoustic image 1320) may be displayed by displaying a plurality of acoustic imaging frames in succession such as in a video. In some such examples, the plurality of frames can be repeated such that once the last acoustic image frame in the sequence is displayed (e.g., acoustic image frame 9), the first acoustic image frame is displayed again (e.g., acoustic image frame 1). Additionally or alternatively, acoustic images may be repeated based on a received input, such as by a user via a user interface or a processor. Acoustic images may be displayed in real time, sped up, or slowed down to provide a user with ease of analysis.

With respect to FIG. 12, each acoustic image (e.g., acoustic images 1220-1228) may comprise a single still acoustic image frame or a plurality of acoustic image frames (e.g., acoustic image 1320 comprising acoustic image frames 1-9). In some embodiments, each one of acoustic images 1220-1228 may comprise a plurality of acoustic image frames. For instance, in some examples, the acoustic analysis system can be configured to store a plurality of frames of acoustic image data for a given acoustic field of view. In some such examples, even if the sensor array is moved to a new field of view, a plurality of acoustic image frames from a previous field of view may be viewable, such as by being displayed in a loop (as described elsewhere herein) or otherwise upon selection (e.g., via a user interface). For example, in an example, a user can select acoustic image 1220 via a user interface. The system can be configured to provide the user with an option to view a plurality of acoustic image frames associated with image 1220, such as via scrolling through such images or viewing such images as a video.

Additionally or alternatively, in some examples, the current field of view of the acoustic sensor array may be displayed showing a plurality of acoustic images (e.g., as a live acoustic video) and the other acoustic images may be displayed as single still acoustic images (e.g., the most recent acoustic image data captured from the FOV associated with the acoustic image). For example, if the acoustic sensor array is positioned at a given time to generate acoustic image data for the field of view of acoustic image 1224, acoustic image 1224 may comprise a plurality of acoustic image frames displayed as a live video, while acoustic images 1220, 1222, 1226, and 1228 are shown as still acoustic images within a panorama.

In some embodiments, acoustic images which comprise a plurality of acoustic image frames may have corresponding electromagnetic images with a plurality of electromagnetic image frames. Additionally or alternatively, the electromagnetic image representing the current field of view for the electromagnetic imaging tool (e.g., 203) may comprise a plurality of electromagnetic image frames. For example, similar to acoustic image data described above, in some embodiments, in the context of a panorama, the current field of view of an electromagnetic imaging tool may be displayed in real time (e.g., as a live video), while electromagnetic image data outside of a current FOV could be displayed as static. Similar to acoustic image data discussed elsewhere herein, an acoustic analysis system can be configured to store a plurality of electromagnetic images for such past FOV(s) accessible by a user.

In some embodiments, the acoustic sensor array may capture a larger FOV than does an associated electromagnetic imaging tool. For instance, in some examples, the FOV for an acoustic sensor array may be larger than the FOV for an electromagnetic imaging tool. In such embodiments, a panorama may comprise multiple electromagnetic images associated with each acoustic image. In such embodiments, panoramas may be captured by adjusting the position and/or orientation of the electromagnetic imaging tool (e.g., 203) in order to span a greater portion of the acoustic FOV. For example, the electromagnetic imaging tool may be manually manipulated by a user, such as being handheld or on an adjustable stand (e.g., tripod, monopod, etc.). Additionally or alternatively, other systems may be used, such as linear movement systems, pan and tilt systems, 360-degree rotation systems, or the like. In some embodiments, the system may comprise a motorized movement mechanism system. In such embodiments, the motorized movement mechanism may be automated or programmed to periodically adjust the field of view of the electromagnetic imaging tool, such as between capturing electromagnetic images. In general, various processes described herein for generating panoramas may be implemented in some such systems by changing the FOV of an electromagnetic imaging tool.

Figure 14:
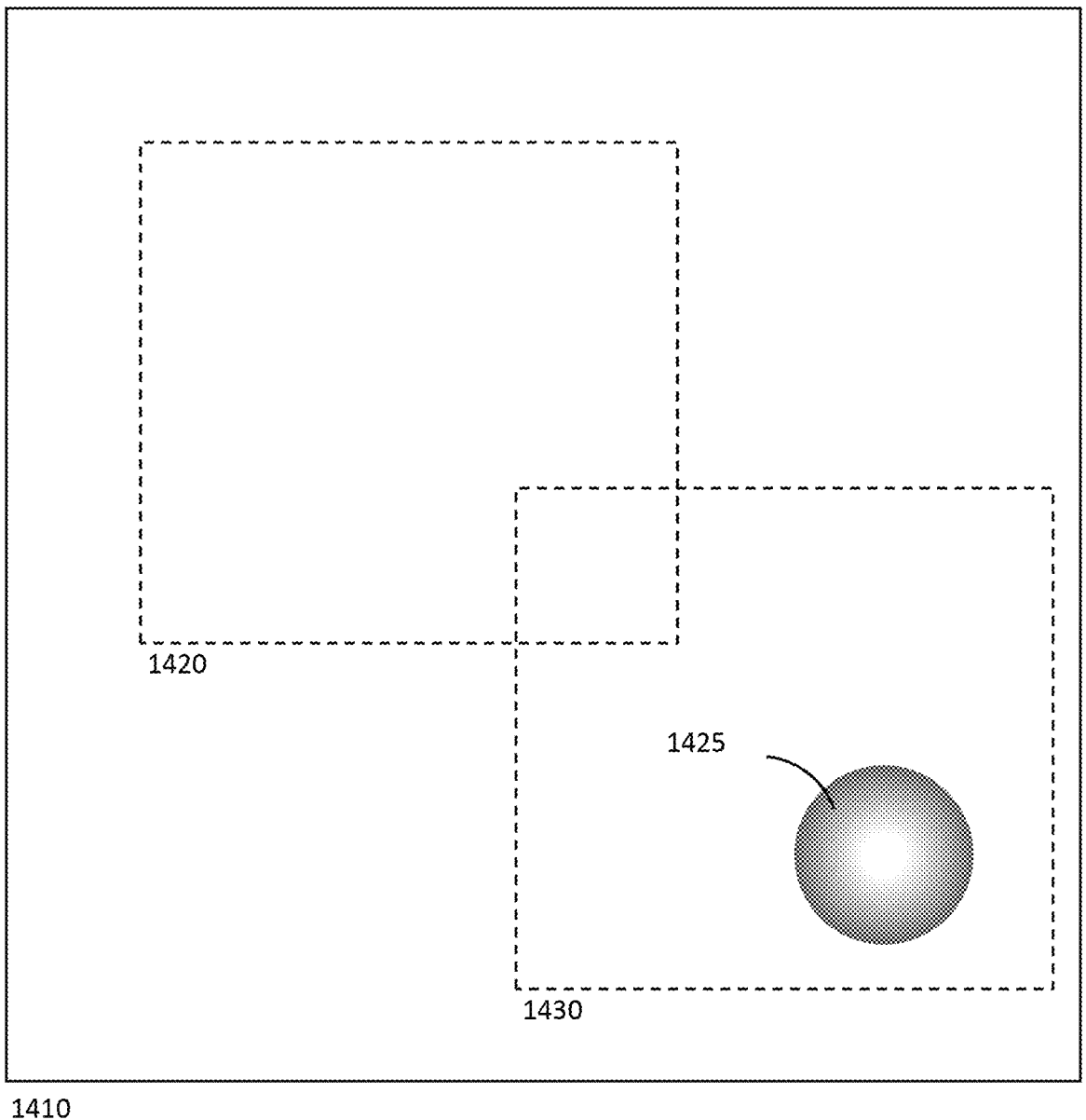
FIG. 14 shows a visualization of an acoustic image field of view and an electromagnetic image field of view.

FIG. 14 shows an acoustic imaging field of view and an electromagnetic imaging field of view. In the illustrated example, the acoustic imaging FOV 1410 is larger than the electromagnetic imaging FOV 1420. In some examples, an acoustic analysis system can be configured to manipulate the electromagnetic imaging FOV in order to capture electromagnetic image data at several fields of view in order to acquire electromagnetic image data for a larger portion of the acoustic imaging FOV 1410 than a single electromagnetic image. In some examples, the system can be configured to adjust the FOV of the electromagnetic imaging tool through a predefined sequence of fields of view and create a panorama of electromagnetic image data corresponding to portions of the acoustic imaging FOV 1410.

In some embodiments, an acoustic analysis system can be configured to recognize an acoustic signal (e.g., at location 1425) within the acoustic imaging FOV 1410 that is outside of electromagnetic imaging field of view 1420. The system can be configured to manipulate the electromagnetic imaging tool (e.g., via a motorized movement mechanism) to a new FOV (e.g., 1430) that includes the acoustic signal previously not within the electromagnetic imaging FOV 1420. In some such examples, the system can be configured to determine a location of the acoustic signal relative to the electromagnetic imaging FOV based on information received from an acoustic sensor array and manipulate the electromagnetic imaging tool accordingly.

Additionally or alternatively, the system can be configured to capture a plurality of electromagnetic images having different fields of view in order to create an electromagnetic panorama to span all or part of the acoustic imaging FOV. Accordingly, electromagnetic image data corresponding to acoustic signals (e.g., at location 1425) outside of one electromagnetic imaging FOV may still be included in a larger electromagnetic image panorama. For instance, in some examples, a system including a motorized movement mechanism can be used to periodically scan the target scene, such as on a schedule or an input from a controller or a user. In embodiments comprising a schedule, the schedule may be automated, such as by a processor (e.g., processor 212, an external processor, or the like).

In some embodiments, the electromagnetic imaging tool may be positioned independently from the acoustic sensor array, for example, within a separate housing from the acoustic sensor array. For example, the acoustic analysis system may be configured such that an adjustment mechanism for manipulating the FOV of the electromagnetic imaging tool is not attached to the acoustic sensor array. Additionally or alternatively, the acoustic sensor array may comprise an adjustment mechanism configured to counter-adjust the acoustic sensor array such that when the electromagnetic imaging tool is re-positioned and the FOV of the electromagnetic imaging tool is changed, the FOV of the acoustic sensor array remains comparatively unchanged.

Figure 15:
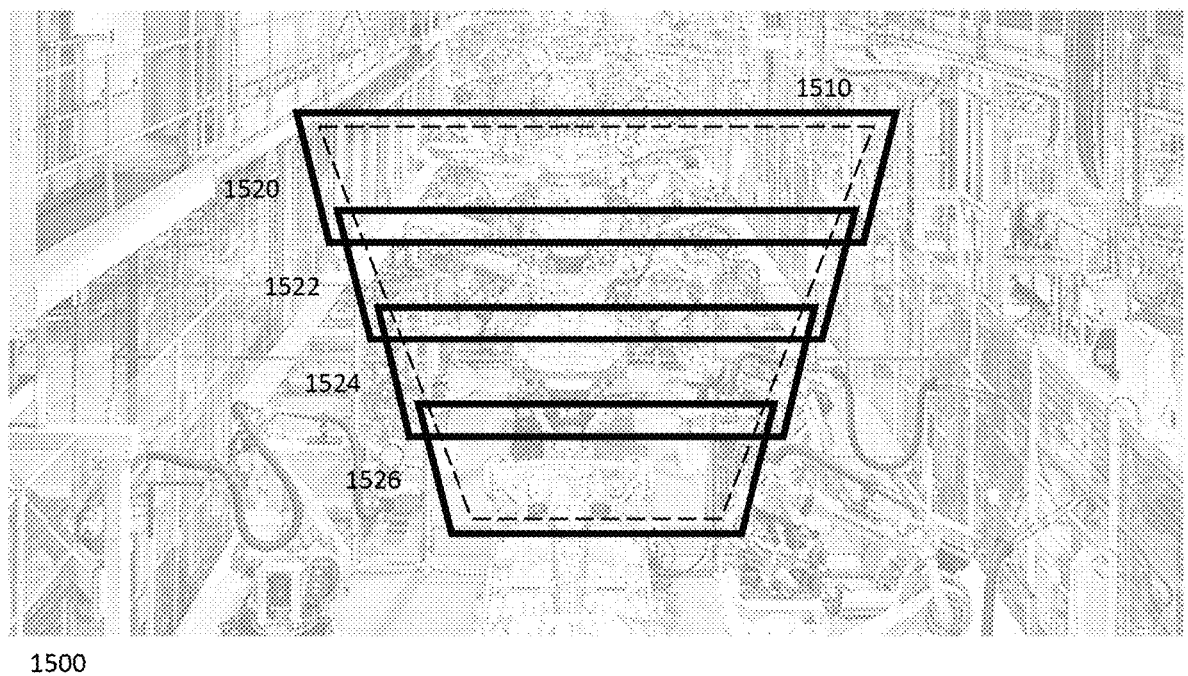
FIG. 15 shows a visualization of a vertical panoramic scan using a pan and tilt system.

As discussed herein, various panoramic scans may be used to generate a panorama. FIG. 15 provides an exemplary embodiment of using a vertical panoramic scan to capture multiple acoustic images of a target scene 1510. As shown, multiple acoustic images (e.g., acoustic images 1520-1526) are used to capture the desired acoustic target scene 1510. The multiple acoustic images (e.g., acoustic images 1520-1528) may be captured using systems and methods described herein, such as a pan and tilt mechanism.

As shown with respect to FIG. 15, the portion of the scene associated with each acoustic image (1520-1526) is shown as a different size from the perspective of the figure. In some cases, when a panorama includes images spanning a variety of different distances to target, the area within the field of view of each of the images changes. Moreover, in acoustic imaging, acoustic signals from closer sources may appear more intense than those emitted from further away. In some examples, distance information associated with each image and/or various objects within the image can be determined and used, for example, to appropriately combine images (for generating a panorama) and/or correctly determine acoustic intensity information. In various examples, such distance information can include three-dimensional depth information regarding various portions in the target scene. Additionally or alternatively, a user may be able to measure (e.g., with a laser distance tool) or manually input distance values associated with a plurality of locations in a target scene and/or a plurality of acoustic image portions. In some examples, such different distance values for various portions of the target scene can be used to adjust the back-propagation calculations at such locations to accommodate the specific distance value at that location or within that acoustic image portion.

In some embodiments, portions of a target scene may be captured using a variety of techniques. With respect to FIG. 16, multiple acoustic images (e.g., acoustic images 1620-1628) may be captured to cover some or all of a target scene, such as target scene 1610. As shown, some of the acoustic images may overlap with one or more other acoustic images, such as acoustic images 1620-1626. Additionally, one or more acoustic images may be disjoint from the other acoustic images, such as acoustic image 1628.

Figure 17:
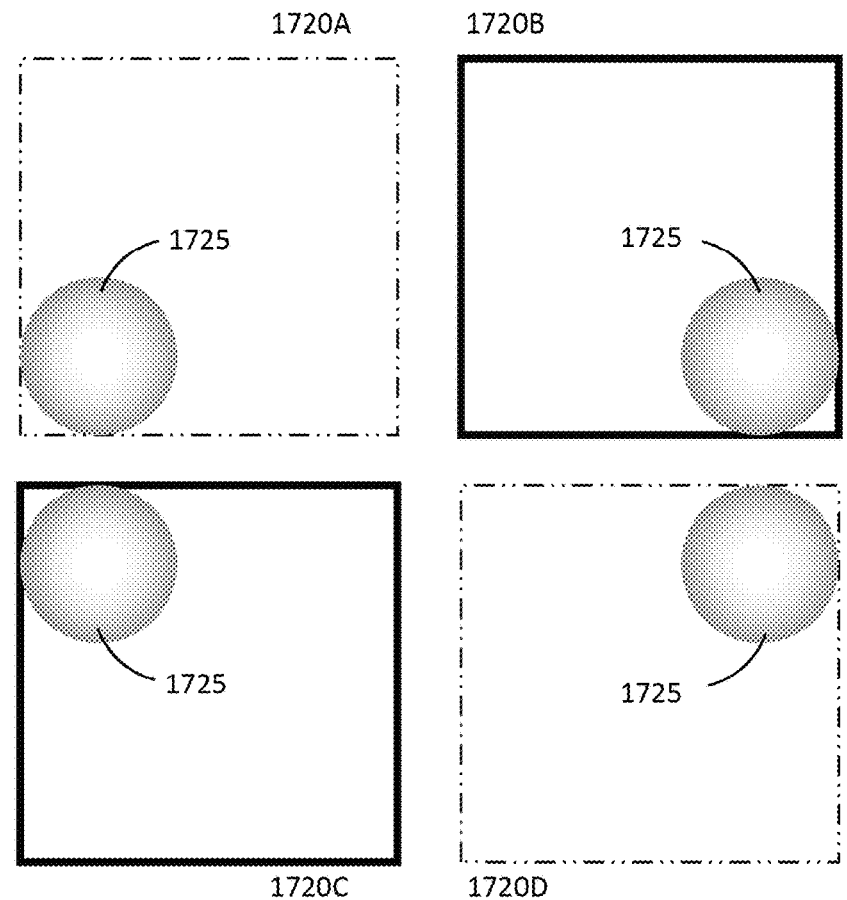
FIG. 17 shows an example embodiment of using a beacon acoustic signal to align acoustic images.
Figure 17:
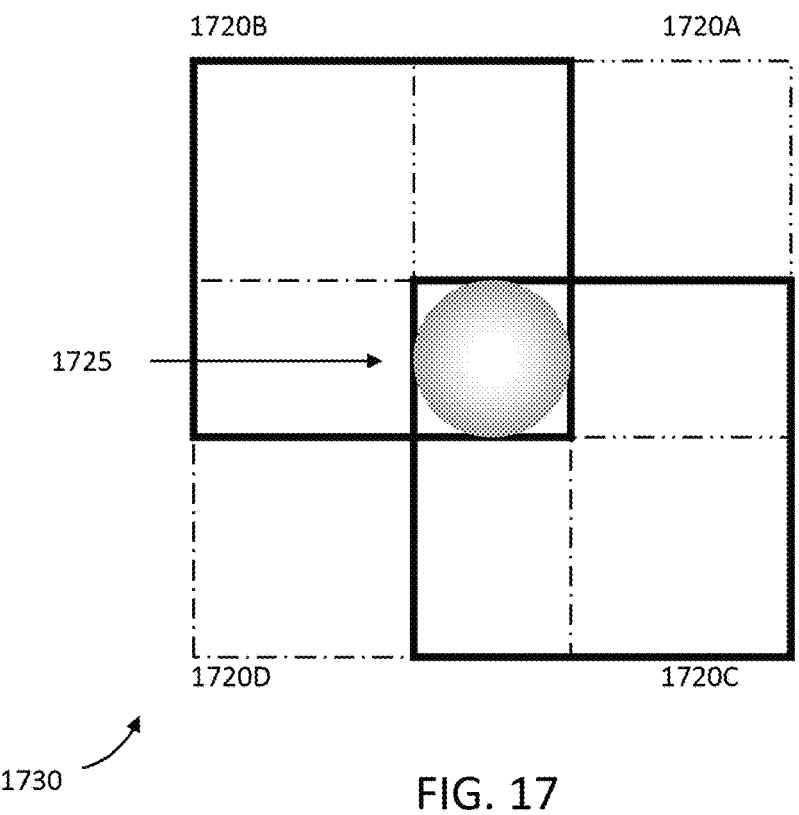
Figure 18A:
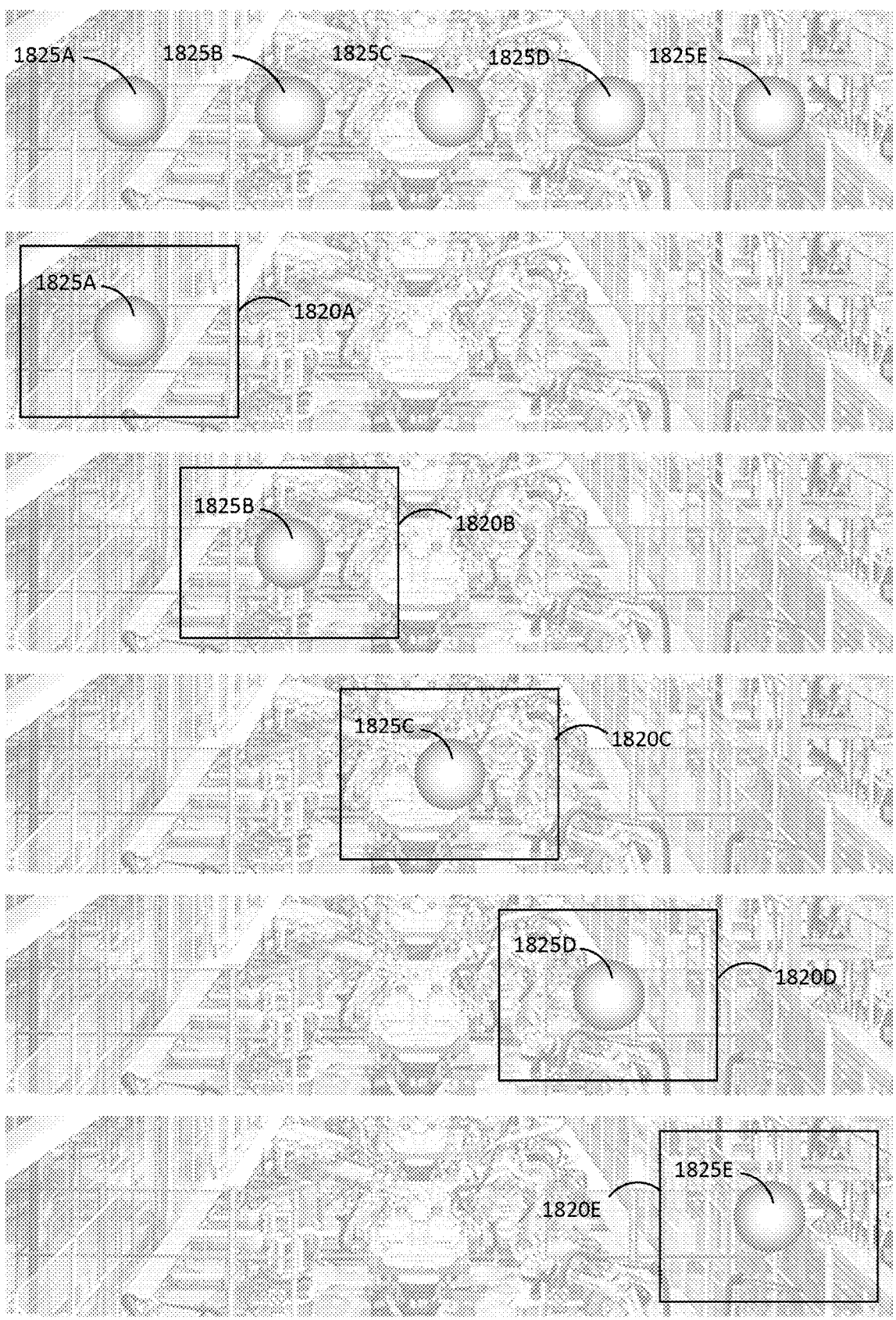
FIGS. 18A, 18B, and 18C provide example embodiments of using one or more beacon acoustic signals to capture multiple acoustic images in a target scene.
Figure 18B:
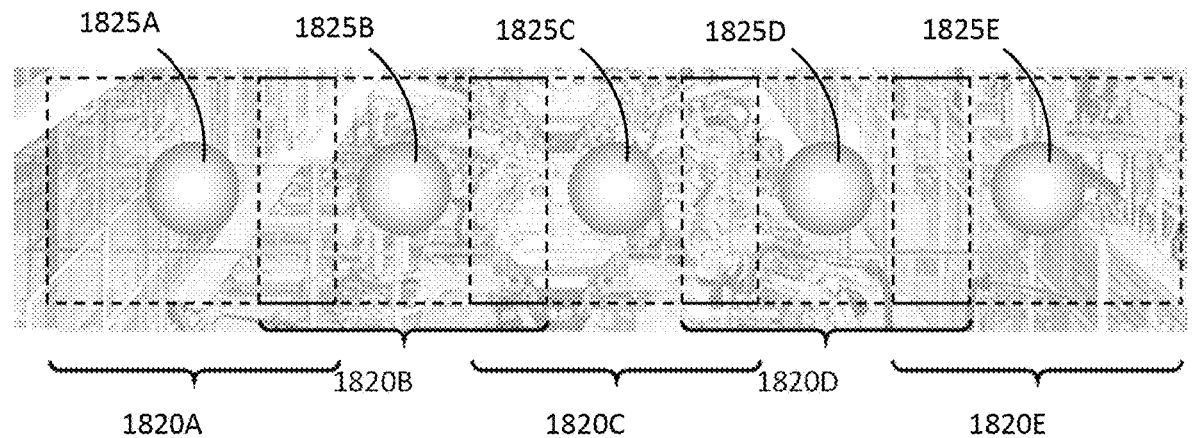
Figure 18C:
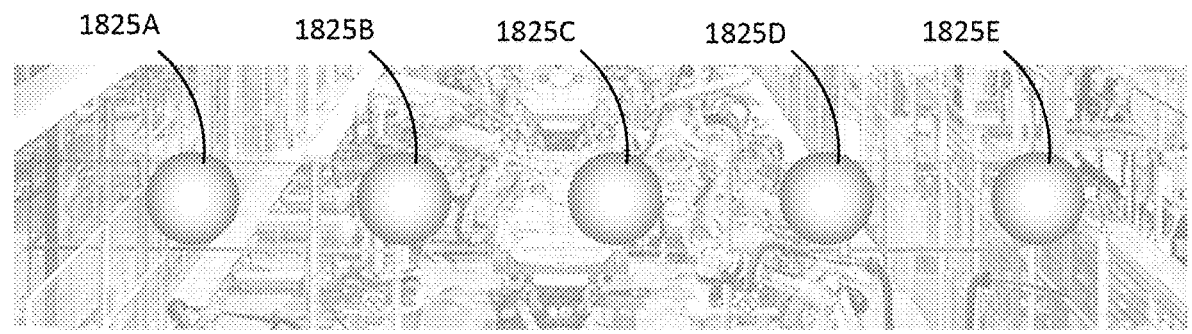
Figure 19:
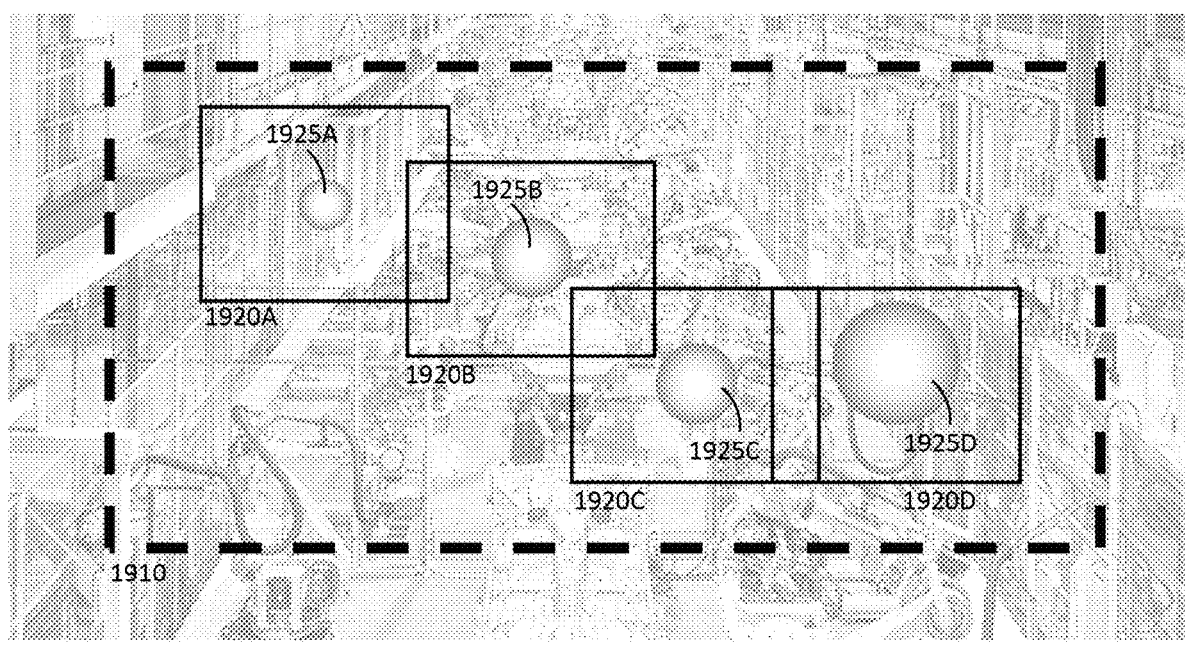
FIG. 19 shows an example embodiment of using one or more beacon acoustic signals to capture multiple acoustic images in a target scene.

In some embodiments, as discussed herein, capturing portions of the target scene may comprise adjusting the position and/or orientation of the acoustic analysis system, such as adjusting the position of the acoustic sensor array. In some embodiment, as shown in FIGS. 17-19, various portions of the target scene may be chosen and/or images stitched together based on predetermined acoustic signals emitted from the target scene, herein referred to as beacon acoustic signals. In some examples, beacon acoustic signals may comprise sounds emitted from one or more devices present in the target scene which may provide context to the acoustic analysis system for where targets of interest are, how to stitch together acoustic images, the size and/or position of the target scene, or the like. In some embodiments, beacon devices may be placed within the target scene, such as by a user, to emit the beacon acoustic signals. In such embodiments, the beacon devices may emit acoustic signals continually or intermittently, e.g., on a schedule, based on inputs receives from the acoustic analysis system, a user, or the like. The beacon acoustic signals may be unique with respect to other acoustic signals present within the target scene. For example, the beacon acoustic signals may comprise unique frequencies, periodicity, or the like to allow the acoustic analysis system to easily differentiate the beacon acoustic signals from other acoustic signals emitted from within the target scene, such as using the filtering techniques discussed herein. Furthermore, the acoustic parameters for the beacon acoustic signals may be provided to the acoustic analysis system, such as via a user and/or via a communication connection (e.g., wireless, wired, or the like) between the beacon devices and the acoustic analysis system.

In some embodiments, an acoustic analysis system can be configured to recognize any number of different beacon acoustic signals. For instance, in various examples, one or more identifiable beacon acoustic signals can have the same or different acoustic parameters. A first beacon device within a scene may emit a first beacon acoustic signal and a second beacon device within a scene may emit a second beacon acoustic signal that is different from the first beacon acoustic signal. An acoustic analysis system can be configured to identify the first and second beacon acoustic signals within a scene. Additionally or alternatively, in some examples, a beacon acoustic signal may be emitted from other objects present in the scene which comprise a predetermined sound. For example, in some embodiments, a motor, a vent, a belt, other machinery, or the like can emit a predetermined and/or a recognizable sound. Such acoustic signals may be used as a beacon acoustic signal for various processes described herein.

FIG. 17 shows an example scene in which a beacon acoustic signal 1725 is used to capture multiple acoustic images, such as acoustic images 1720A-D. As shown, the beacon acoustic signal 1725 is present in various locations within the acoustic images 1720A-D, such as the bottom left corner in acoustic image 1720A, the bottom right corner in acoustic image 1720B, the top left corner in acoustic image 1720C, and the top right corner in acoustic image 1720D. The beacon acoustic signal 1725 can be used to register the acoustic images by aligning the location of the beacon in one image with the location of the beacon in another. In some such examples, and as shown in FIG. 17, aligned acoustic images 1720A-D may be stitched together to form a composite acoustic image 1730 based on aligning the position of the beacon acoustic signal 1725 within each of the acoustic images 1720A-D.

One or more beacon signals may also be used to determine which portions of a scene may be of interest. For example, FIGS. 18A and 18B illustrate a target scene including a plurality of beacon acoustic signals 1825A-E. In some such instances, an acoustic analysis system can be configured to manipulate a field of view (e.g., by manipulating a pointing or position of an acoustic sensor array or changing an active portion of an acoustic sensor array) to capture an image 1820A-E encompassing each respective beacon acoustic signal 1825A-E.

For example, with respect to FIG. 18A, an acoustic analysis system may be positioned and/or oriented to capture acoustic image 1820A wherein beacon acoustic signal 1825A is centered in the acoustic image 1820A. The acoustic analysis system may then be positioned and/or oriented to capture acoustic image 1820B wherein beacon acoustic signal 1825B is centered in the acoustic image 1820B. Such a process may be repeated until all desired beacon acoustic signals (e.g., beacon acoustic signals 1825A-E) are captured within an acoustic image. In some embodiments, all of the beacon acoustic signals (e.g., beacon acoustic signals 1825A-E) may be emitted at the same time. Alternatively, each beacon acoustic signal may be emitted when such beacon acoustic signal is to be captured. For example, beacon acoustic signal 1825A may be emitted, but not beacon acoustic signal 1825B-E, when capturing acoustic image 1820A; then beacon acoustic signal 1825B may be emitted, but not beacon acoustic signals 1825A or 1825C-E, when capturing acoustic image 1820B, and so on. In some such embodiments, a single beacon device may be used and repositioned between locations corresponding to beacon acoustic signals 1825A-E. Additionally or alternatively, one or more beacon devices may movable through the target scene, such as one or more beacon devices positioned on a line, a belt, or other moving mechanism. For example, in an illustrative example, a beacon device may start initially in the position of beacon acoustic signal 1825A and traverse the target scene, eventually to the position of beacon acoustic signal 1825E, wherein the multiple acoustic images (e.g., acoustic images 1820A-E) are captured while the beacon device is moving. In some embodiments, the beacon device may pause while an acoustic image encompassing the beacon acoustic signal is captured.

FIG. 18B illustrates an exemplary composite acoustic image and/or target scene comprising the beacon acoustic signals shown in FIG. 18A. As shown, the beacon acoustic signals 1825A-E may be used to determine which portions of a scene should be captured for including in a composite image (e.g., a panorama). Acoustic images (e.g., 1820A-E) may be stitched together in any of a variety of ways, such as those described herein. FIG. 18C shows a resulting panorama 1850 including the beacon acoustic signals 1825A-E.

In some embodiments, the acoustic analysis system can be configured to generate a panorama including representations of the beacon acoustic signals 1825A-E, such as shown in FIG. 18C. Additionally or alternatively, in some examples, the system can be configured to exclude the beacon acoustic signals from the resulting image data. For instance, in some examples, acoustic beacon devices can be used to guide the system to capture image data from a plurality of fields of view (e.g., corresponding to acoustic images 1820A-E), for example, using recognizable acoustic signatures in one or more beacon signals within an area to be analyzed. However, in some such examples, the acoustic data from the beacon itself is not of interest within the scene. Accordingly, in some embodiments, acoustic signals matching one or more acoustic signatures of the beacon device(s) can be excluded from generated acoustic image data.

The examples in FIGS. 18A-C illustrate an embodiment wherein the beacon acoustic signals are positioned horizontal to each other. However, in some embodiments, the beacon acoustic signals may be located elsewhere relative to each other, and in general can be positioned anywhere in an area to be analyzed.

FIG. 19 provides an exemplary embodiment wherein beacon acoustic signals are located in various positions and depths within the target scene 1910. As shown via the sizes of the beacon acoustic signals, beacon acoustic signal 1925A is located at a further distance, beacon acoustic signal 1925D is located at a nearer distance, and beacon acoustic signals 1925B, 1925C are located between (e.g., at a middle distance). In some embodiments the acoustic analysis system may determine the distance to a beacon device via determining a distance-to-target, as discussed herein. Additionally or alternatively, the distance to a beacon may be provided to the acoustic analysis system via other means, such as if the beacon device is at a predetermined distance from the acoustic analysis system. Beacon devices may be located at various distances in a scene to help focus the acoustic analysis system on objects of interest throughout the target scene. For example, beacon acoustic signal 1925A may be located near an object of interest and/or an acoustic signal of interest which is located farther away whereas acoustic signal 1925D may be located near an object of interest and/or an acoustic signal of interest which is located closer to the acoustic analysis system. Such acoustic signals may help focus the acoustic analysis system on objects of interest and/or acoustic signals of interest, such as when capturing acoustic images of the scene (e.g., acoustic images 1920A-D).

Even though not expressly illustrated, the acoustic analysis system may filter out one or more beacon acoustic signals when presenting an acoustic image to a user. For example, with respect to FIG. 19, one or more of beacon acoustic signals 1925A-D may be filtered out. Such examples may allow a user to better distinguish a beacon acoustic signal from an acoustic signal of interest. In embodiments wherein one or more beacon acoustic signals are of interest (e.g., when the beacon device is an object of interest in the scene), one or more beacon acoustic signals may not be filtered out. In some embodiments, a user, such as via a user interface, may toggle the presence of one or more beacon acoustic signals within the scene.

In some embodiments, the acoustic analysis system may be adjusted in a direction known to comprise another or the next beacon acoustic signal. For example, as shown in FIG. 18A, each beacon acoustic signal is located to the right of the previous beacon acoustic signal. Additionally or alternatively, the next beacon acoustic signal may be either present or partially present within the previous acoustic image, such as located along the periphery of the acoustic image or located just beyond the periphery of the acoustic image such that the next beacon acoustic signal is partially present or is bleeding into the acoustic image.

Figure 20A:
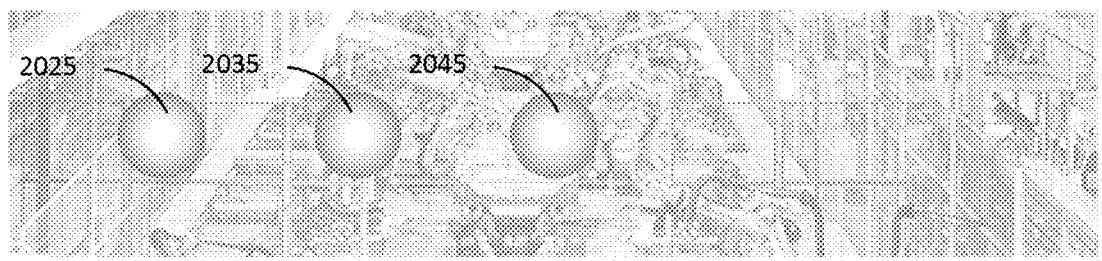
FIGS. 20A, 20B, and 20C show an example embodiment showing indications of acoustic signals outside of a current field of view.
Figure 20B:
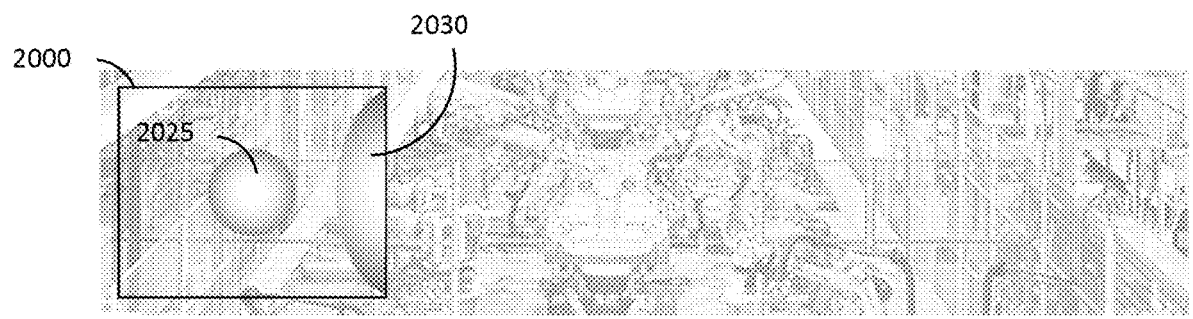

FIG. 20A shows an example scene having acoustic signals present at locations 2025, 2035, and 2045. FIG. 20B shows an acoustic image 2000 including the acoustic signal at 2025. As shown, the acoustic signal at location 2035 is not within the field of view of acoustic image 2000. However, in some examples, the acoustic imaging system is configured to detect the presence of acoustic signals outside of the field of view of the acoustic image. For example, in some examples, active acoustic sensors in an active acoustic sensor array can detect sounds not within the field of view. In some such examples, the sounds outside of the field of view cannot be precisely located or analyzed, but the system can be configured to determine such sounds are nevertheless present within the environment. In some examples, an acoustic analysis system can be configured to display an indication on a display indicating the presence of such sounds outside of the current field of view.

For example, in FIG. 20B, the acoustic analysis system is configured to generate acoustic image 2000, which includes an indication of the acoustic signal at 2025 and further includes indication 2030 at the right-hand side of the screen, indicating the presence of an acoustic signal outside of the field of view to the right of the image. This can indicate to a user that an acoustic signal of interest may be present outside of the current field of view. The user can adjust the field of view of the acoustic analysis system (e.g., by changing a pointing or direction of the system) in order to attempt to capture such additional acoustic signal(s).

Figure 20C:
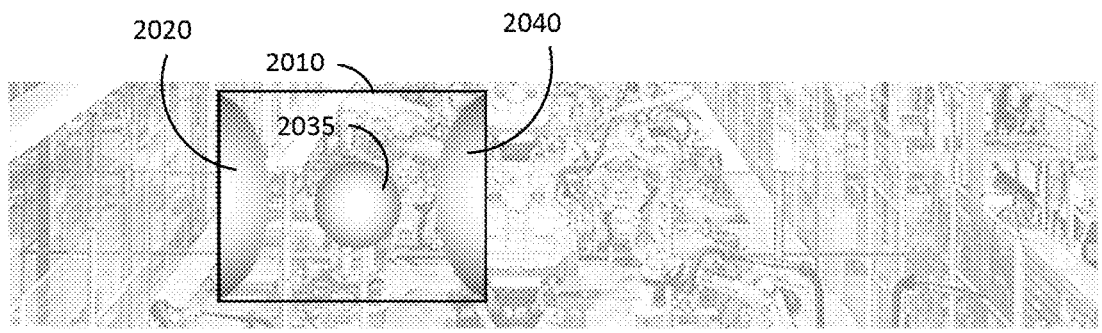

FIG. 20C shows acoustic image 2010, which includes an indication of the acoustic signal at location 2035, for example, after adjusting the field of view of the system in response to noticing indication 2030 in image 2000. As shown, acoustic image 2010 includes indications 2020 and 2040 indicating the presence of sounds outside of the current field of view (e.g., at locations 2025 and 2045, respectively). Such indications can assist a user in observing all sounds of interest within an area, for example, by indicating to the user how to adjust the field of view to capture additional acoustic signals. In some examples, a user can adjust the field of view of the system in order to capture a plurality of acoustic images in response to noticing indications suggesting the presence of sounds outside of the current fields of view. Such plurality of acoustic images can be used to generate a panorama including such sounds, for example, as described elsewhere herein. In various examples, indications such as 2020, 2030, and 2040 indicating the presence of additional acoustic signals outside of the field of view can be included in a captured acoustic image or excluded from a captured acoustic image despite being present as an indication on the display to assist the user in locating the acoustic signals.

In some embodiments, acoustic signals indicated by indications (e.g., 2020, 2030, 2040) are not necessarily outside of the field of view of the acoustic sensor array, but may be outside of the field of view of an electromagnetic imaging tool generating electromagnetic image data for combining with acoustic image data. For example, as described elsewhere herein, in some examples, an acoustic sensor array can have a larger FOV than an associated electromagnetic imaging tool. An acoustic analysis system can be configured to determine an acoustic signal is located outside of the FOV of the electromagnetic imaging tool and provide an indication illustrating the location of an acoustic signal outside of the current electromagnetic imaging tool FOV.

Additionally or alternatively, in some embodiments, indications such as those discussed with respect to FIGS. 20A-C can be shown for acoustic signals outside of a FOV (e.g., an acoustic sensor array FOV and/or an electromagnetic imaging tool FOV) that have one or more acoustic parameters meeting one or more predetermined conditions (e.g., acoustic signals having a predetermined frequency content, a minimum amplitude, etc.). In some embodiments, an acoustic analysis system can determine whether a beacon acoustic signal such as those described elsewhere herein is positioned outside of a FOV, and if so, provide an indicator representing the direction of beacon acoustic signal.

In some embodiments, the location of such acoustic signals outside of a current image field of view may provide information to the acoustic analysis system regarding how to adjust the field of view (e.g., via repositioning or otherwise adjusting the acoustic sensor array) to capture a next acoustic image. As shown, when capturing acoustic image 2000, the acoustic signal at location 2035 is located near or beyond the right periphery of the field of view. The acoustic analysis system may be configured to detect the presence of such acoustic signal and use this information to determine that it should adjust the field of view toward the right, for example, to locate the detected acoustic signal outside of the current acoustic image field of view. Such a process may be used to automatically capture a plurality of acoustic images by continuing to adjust the field of view of the system in order to capture acoustic image data of various acoustic signals. Such plurality of acoustic images can be used to generate a panorama such as described elsewhere herein.

In some embodiments, an acoustic analysis system is configured to automatically adjust the field of view of the system in order to capture a plurality of acoustic images based on detected acoustic signals outside of the current field of view. In some such examples, the acoustic analysis system is configured to limit the amount that the field of view is changed before a new set of acoustic image data is captured while navigating to a detected acoustic signal, for example, so that the system can create a panorama including the entire area between the initial field of view and the final field of view.

In some embodiments, each of the multiple acoustic images making up a panorama of a target scene can be captured in succession within a short time span, for example, using a single imaging array, or simultaneously or approximately simultaneously using a plurality of imaging arrays. For example, in some examples, each of the acoustic image groupings shown in FIGS. 12, 15, and 16-19 (e.g., acoustic images 1220-1228; acoustic images 1520-1526; acoustic images 1620-1628; acoustic images 1720A-D; acoustic images 1820A-E; and acoustic images 1920A-D) may be captured around the same time such that they provide a representation of the acoustic signals in the target scene at approximately a single point in time or over a short time span.

However, in some embodiments, one or more acoustic images may be captured at different times. For example, an acoustic image of a particular portion of the panorama may be updated over time or updated in response to an external event (e.g., a change in acoustics in the target scene, at a predetermined time, after a predetermined amount of time, user input, instructions from a processor, or the like). Additionally or alternatively, in some examples, different images used to create the panoramic representation are captured at different times. In some embodiments, an indication may be presented to indicate when each acoustic image was captured and/or when each portion of a panorama has been last updated. For example, when an acoustic panorama is displayed on a display, the panorama may include information indicative of when the last image was captured, in real time or relative to the other acoustic images. Such an indication may represent the "freshness" of a given portion of an acoustic image and/or panorama. In some embodiments, "freshness" may be an indication of the amount of time which has passed since the acoustic image and/or panorama was captured. For example, the amount of time may be the difference between the time the acoustic image was captured and the real time, the most recent acoustic image that has been captured, relative to a predetermined time, or the like.

For example, in FIG. 16 acoustic image 1626 is shown to have a border which is bolded relative to the other acoustic images (e.g., acoustic images 1620, 1622, 1624, and 1628). The bolded border of acoustic image 1626 may provide an indication to a user that acoustic images 1620, 1622, 1624, and 1628 have been updated recently or within a predetermined amount of time and acoustic image 1626 has not been updated recently. Additionally or alternatively, other indications may be used to indicate whether or not a portion of the panorama has been updated recently (e.g., within a predetermined amount of time) such as using various colors, shades, opaqueness, providing a time-stamp, a countdown timer, or the like. In some cases the acoustic analysis system is further configured to toggle between displaying an updated panorama and a previous panorama based on user input received via a user interface. Additionally or alternatively, as described elsewhere herein, in some examples, each FOV can be associated with a plurality of frames of image data stored in memory. In some examples, each portion of a panorama can include a cycling of the plurality of frames associated with the FOV corresponding to such portion of the panorama. In some examples, the rate at which such frames are cycled through depends on the freshness of the acoustic image data. For example, as described elsewhere herein, in some examples, the "live" FOV may be displayed as a "real-time" video. In some such examples, portions of the panorama from previously captured FOVs can display frames cycled at a different speed than real time, such as looping more slowly or more quickly than the rate at which such frames were captured.

In some embodiments, such visual representation of data freshness can be incorporated into visualizations of the acoustic data, such as shown at locations 554, 556, and 558 in FIG. 5B. For instance, in an example embodiment, freshness of acoustic image data can be represented based on a transparency of the visualization of the acoustic data at a given location within the image. Portions of an acoustic panorama captured more recently than others can include acoustic image data comparatively more opaque than acoustic image data in portions of the panorama captured longer ago. In some examples, time information (e.g., when a given set of data was captured, its freshness, etc.) can be included within metadata for the acoustic images, or the like.

In some embodiments, a user may be prompted (e.g., via an indication) to capture an acoustic image for portions comprised within the target scene which have not been updated recently. In embodiments comprising a motorized movement mechanism, the motorized movement mechanism may be automatically prompted to adjust the acoustic analysis system to capture the portion which has not been updated recently, such as via a controller or processor as described herein.

In some embodiments, different acoustic images used to create an acoustic panorama include different parameters, such as different frequency information or distance-to-target values. In some embodiments, the acoustic imaging system can be configured to adjust data collection and/or representation based on one or more such parameters. For example, in some embodiments, the system can be configured to determine a distance-to-target value associated with various locations within an individual acoustic image, and similarly, for the panorama including such acoustic image data. The system can be configured to account for different distance-to-target values when presenting acoustic image data, for example, when determining acoustic intensity associated with each of a plurality of locations. For instance, with respect to FIG. 15, acoustic signals within image 1526 are closer than those within image 1520. An acoustic signal having the same intensity in each image would, without correction, appear quieter in image 1520 due to its distance. The system can be configured to use distance information to adjust for intensity across different locations and across different images used to create a panorama.

Additionally or alternatively, in some embodiments, the acoustic analysis system can be configured to use one or more parameters of a scene, such as detected frequency content or distance information, to adjust operation during the acquisition of a plurality of images to create a panorama. For example, capturing each acoustic image can include determining and representing frequency bands associated with the particular field of view for that image. In some examples, the system can be configured to select an acoustic sensor array (e.g., 320, 322 in FIG. 3) for capturing each acoustic image for use in creating the acoustic panorama. Accordingly, in various examples, the system can be configured to automatically change frequency bands (e.g., in data acquisition via selected acoustic sensor arrays and/or via representation within the acoustic image data) and compensate for distance-to-target changes as the system collects acoustic information from a plurality of fields of view. Additionally or alternatively, the system can be configured to, for each image, display acoustic image data based on acoustic parameters associated with that image, such as based on distance-to-target and/or frequency content information. Such image-specific display settings can be included in corresponding locations in an acoustic panorama.

In some embodiments, the target scene may comprise one or more locations of interest (e.g., locations within the target scene emitting acoustic signals of interest). Furthermore, one or more locations of interest may comprise a variety of acoustic signals having different acoustic parameters or criteria (e.g., differences in frequency, sound intensity (e.g., dB level), distance to target, periodicity, etc.). Accordingly, it may be beneficial to capture different acoustic parameters among the acoustic images used to construct the acoustic panorama, such as various frequency ranges, decibel ranges, distances to target, periodicity, etc. In such embodiments, it may be beneficial to compensate for the differences in acoustic parameters as the acoustic analysis system adjusts to capture acoustic images of the target scene (e.g., adjusting the sound intensity levels based on distance to target or adjusting the size of the acoustic sensor).

In some embodiments, different acoustic parameters may be displayed and/or captured for different portions of a single acoustic image (including an acoustic panorama). In some examples, the field of view of a single acoustic image may comprise one or more locations of interest (e.g., locations within the target scene emitting acoustic signals of interest). Such one or more locations of interest may comprise a variety of different acoustic parameters, and different parameters may be more important or more of interest in some locations compared to others. Accordingly, it may be beneficial to display different acoustic parameters (e.g., differences in frequency, sound intensity, distance to target, periodicity, etc.) in various portions of an acoustic image and/or to display acoustic image data representing acoustic signals meeting one or more predefined acoustic parameter criteria (e.g., above a threshold, below a threshold, within a range, etc.).

Additionally or alternatively, in some embodiments, an acoustic analysis system can be configured to, for a given portion of an acoustic image (e.g., a panorama), display or highlight one or more acoustic parameters based on one or more detected parameters within the portion of the scene. For instance, in some examples, a given portion can be configured to display acoustic parameters reflective of those of a loudest source of acoustic signals within that portion (e.g., a frequency band including the frequency information of the loudest sound) or the highest frequency within that portion.

In some embodiments, different acoustic parameters may be displayed such that acoustic signals satisfying one or more predefined criteria within a particular portion visually contrast from acoustic signals or other areas within the portion not satisfying the criteria. In some embodiments, this can include displaying acoustic signals that satisfy the criteria and not displaying acoustic signals which do not satisfy the criteria. Alternatively, acoustic signals which satisfy the criteria can be displayed with a different palettization, size, and/or opacity than acoustic signals that do not. In some embodiments, such criteria can be used to define an acoustic profile, which can include one or more criteria associated with one or more acoustic parameters. Acoustic signals satisfying each of the one or more criteria defining an acoustic profile matches the acoustic profile. In various embodiments, an acoustic profile can include one or more frequency ranges, one or more intensity ranges, and/or one or more distance ranges. Such ranges can include closed ranges (e.g., between a minimum and a maximum intensity level) or can be defined by a single threshold value (e.g., above a threshold intensity level).

Figure 21:
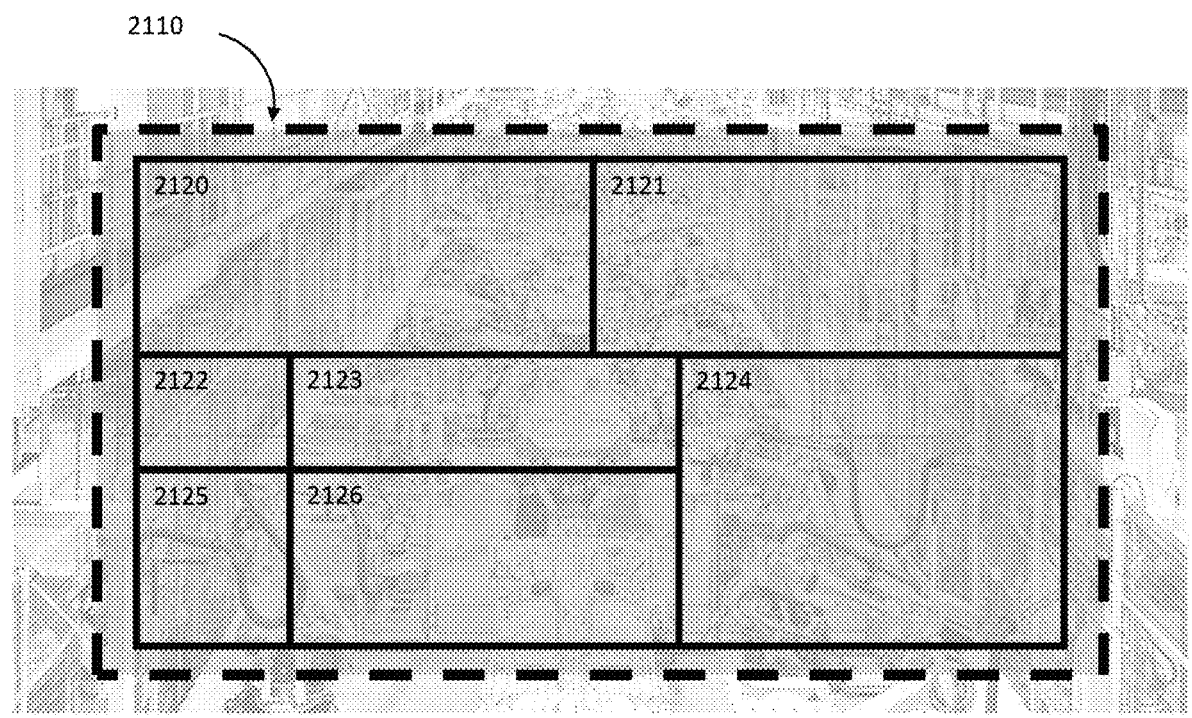
FIG. 21 shows a segmented field of view (FOV) associated with multiple acoustic image portions providing virtualized acoustic imaging devices.

FIG. 21 provides an exemplary embodiment, wherein target scene 2110 is segmented or divided into multiple acoustic image portions (e.g., acoustic image portions 2120-2126). As shown, each acoustic image portion (e.g., acoustic image portions 2120-2126) can border each other. However, in various embodiments, alternative configurations may be used, such as having overlapping acoustic image portions and/or one or more disjoint acoustic image portions.

In various examples, an acoustic image portion can correspond to a single acoustic image (e.g., in the case of an acoustic panorama). Additionally or alternatively, acoustic image portions can be located within the same acoustic image. In some embodiments, acoustic image portions can span portions of multiple acoustic images (e.g., a portion within a panorama including acoustic image data from separately captured images).

In some embodiments, the acoustic image portions (e.g., acoustic image portions 2120-2126) may be defined by a user, such as via a user interface (e.g., via a touchscreen, one or more buttons, a mouse, etc.). In some such embodiments, the user may partition the acoustic image portions using freeform and/or predefined geometric shapes via the user interface. Additionally or alternatively, a user can designate portions of the acoustic image based on one or more acoustic parameters associated with the target scene, such as distance-to-target values, acoustic intensity values, or the like. As will be understood from the description herein, segmenting or partitioning an acoustic image into multiple acoustic image portions effectively allows an acoustic analysis system to operate as if the system were comprised of multiple acoustic imaging devices, even though the system contains fewer acoustic imaging devices or even just one acoustic imaging device. Each of the multiple acoustic image portions effectively corresponds to a "virtual" acoustic imaging device. Different criteria can be established for each acoustic image portion prescribing when and how to display (or not display) representations of the acoustic data received from the target scene within the "field of view" of the corresponding virtual acoustic imaging device (i.e., within each respective acoustic image portion).

Additionally or alternatively, in some examples, acoustic image portions (e.g., acoustic image portions 2120-2126) can be created automatically. For example, in some embodiments, the acoustic analysis system can be configured to partition or segment an acoustic image of a target scene into portions based on the locations or acoustic parameters of acoustic signals within the target scene, such as based on current and/or historical information regarding the target scene. In some embodiments, acoustic image portions may be defined by the position of objects in the target scene, the direction of objects within the target scene relative to the acoustic analysis system, or the like. For example, if the target scene comprises various pieces of machinery emitting acoustic signals, the acoustic analysis system can be configured to partition the acoustic image into portions such that each machine is within a separate acoustic image portion (e.g., via acoustic signature recognition). Additionally or alternatively, in embodiments comprising electromagnetic images, the acoustic analysis system can be configured to identify features or objects (e.g., pieces of machinery) in the electromagnetic images and automatically designate and partition the corresponding acoustic images into portions based on the locations of the one or more identified objects in the electromagnetic images.

In some embodiments, the acoustic analysis system can be configured to automatically identify objects within the scene, for example, via machine learning techniques. In various examples, systems can be configured to employ machine learning techniques to identify one or more locations within a scene.

Additionally or alternatively, in some examples, a user, such as via a user interface, may provide the acoustic analysis system with information regarding the positions of objects within the target scene and the system can generate a portion of the image based on the received information from the user.

In some embodiments, acoustic image portions can be defined by coordinates, for example, relative to a portion of the acoustic analysis system. For example, the system can be configured to define portions based on areas and/or volumes within the target scene (e.g., within a certain range of horizontal and/or vertical angles from a direction normal to the acoustic sensing array or electromagnetic imaging plane). In some such examples, a system can be configured to adjust the pointing of the acoustic sensor array and/or electromagnetic imaging tool by a predetermined amount based on such predefined portions in order to collect data from a plurality of portions. Such data can be combined to form a panorama including acoustic and/or electromagnetic image data such as described elsewhere herein, for example, based on the predetermined amount that the pointing of the system components is adjusted. Such information can be used to align data captured from multiple fields of view to construct such a panorama.

As discussed herein, acoustic image portions (e.g., acoustic image portions 2120-2126) can be configured to display particular acoustic parameters and/or acoustic signals having acoustic parameters satisfying predefined criteria within the given image portion. For example, a set of predefined acoustic criteria may be determined (e.g., identified, accessed or received) and the acoustic signals may be filtered such that acoustic signals having acoustic parameters within the set of predefined acoustic criteria are displayed. Acoustic signals that do not meet such predefined criteria are not displayed. In various embodiments, such criteria can include one or more parameters having a particular value (e.g., 60 Hz, 13 dB, etc.), one or more parameters satisfying a corresponding one or more threshold conditions, or one or more parameters each within a corresponding a range of values (e.g., 50-100 Hz, 10-15 dB, etc.). In general, such criteria can be based on any number of different acoustic parameters. For instance, in one example, one region might display only acoustic image data representing acoustic signals within a particular distance and having a particular frequency content. Criteria can also be defined by logical combinations of criteria, such as acoustic signals meeting any one or more of a predefined set of criteria. In some examples, the criteria can include matching acoustic signals to one or more acoustic signatures, such as acoustic signatures for acoustic signals captured in previous recordings (e.g., recordings of a machine running correctly and/or recordings of a machine having identified issues).

As described elsewhere herein, in some embodiments, one or more criteria can define an acoustic profile. In some embodiments, an acoustic image portion (e.g., acoustic image portions 2120-2126) can have an associated acoustic profile designating one or more criteria. In some such examples, a given portion of the acoustic image includes only acoustic image data representing acoustic signals within the associated acoustic profile. In some embodiments, a system can be configured to generate an acoustic profile by analyzing an acoustic scene (e.g., by determining a common range of frequencies, intensities, etc. present within the scene) and/or access an existing acoustic profile. Existing acoustic profiles can be previously generated by the system or loaded from another source.

In some examples, one or more profiles can be generated using machine learning techniques. For example, a system can be configured to analyze acoustic information representative of a portion of a scene, a specific piece of equipment, or the like, and determine one or more profiles associated therewith. Such profiles can include, for example, information regarding acoustic parameters representing normal and/or abnormal operating conditions.

Similarly, in some examples, a user can generate such profiles and/or input information into a machine learning process for generating such profiles. For example, in some instances, a user may identify a portion of an acoustic scene operating in a particular state or severity level (e.g., good, moderate issue, severe issue, critical issue, failed) based on the user's own experience. The user can capture acoustic image data and/or other acoustic parameters (e.g., frequency and intensity information) representing such portion of the scene and enter information regarding the status of the scene (e.g., critical operating issue). The acoustic analysis system can be configured to create a profile based on the received status and acoustic information. Additionally or alternatively, such input can serve as a datapoint to be analyzed via a machine learning system for generating such profiles. Such acoustic profiles can be associated with one or more portions of a scene (e.g., when a system is programmed to capture a prescribed set of acoustic data from a plurality of predefined fields of view) and/or with specific equipment or objects within the scene. Profiles can be used by a system and/or a user for future analysis of like portions of the scene and/or objects.

In some embodiments, a system can be configured to configure profiles for one or more portions of an acoustic scene, such as portions defined by a user and/or portions defined automatically. For example, in some embodiments, a user can define a portion of the acoustic scene and the acoustic analysis system can be configured to sample acoustic data from such portion and generate an acoustic profile therefrom. Additionally or alternatively, in some examples, a system can be configured to sample information from a scene and identify different portions therein, for example, using machine learning or other analytics processes based on information received from different parts of the scene. In some such cases, the system can be further configured to associate a profile to each such portion of the scene based on the sampled data. Accordingly, in some examples, an acoustic analysis system can be configured to automatically partition a scene into a plurality of portions and associate an acoustic profile with one or more such portions via machine learning or other analytics processes sampling data from the scene.

Additionally or alternatively, in some embodiments, a user can generate an acoustic profile and assign it to a particular portion of an acoustic scene and/or associate an existing acoustic profile with a portion of the scene. In some examples, the system can be configured to automatically associate an acoustic profile with a portion of the scene, for example, by recognizing particular equipment within such portions (e.g., via recognizing an acoustic signature or recognizing a particular equipment shape or configuration) or receiving an input from a user indicating that such equipment is present within such portions.

In some examples, the predefined criteria can be based on an alarm profile for a given portion of the acoustic image and/or the target scene. For instance, in one example, an acoustic signal is represented within the acoustic image data when the acoustic signal matches an alarm profile. An alarm profile may comprise a set of alarm acoustic parameter criteria similar to the predefined acoustic parameter criteria described herein. In some examples, if an acoustic signal comprises acoustic parameters within an alarm profile, the acoustic analysis system can be configured to notify a user of the satisfied alarm profile.

For instance, in some embodiments, an acoustic analysis system can be configured to notify a user when an alarm condition of an alarm profile associated with a portion of a scene is met. A notification may comprise a visual, audible, and/or tactical notification, such as a notification on a display, a tone, and/or a vibration. In some embodiments, acoustic image data representing acoustic signals that satisfy an alarm condition may be presented in a distinguishing way from acoustic image data representing acoustic signals that do not satisfy an alarm condition on a display image within the portion of the scene having the associated alarm profile. In various examples, distinguishing the acoustic signals that satisfy an alarm condition can include providing a different palettization, opaqueness, intensity of color, periodic blinking, or the like.

Additionally or alternatively, in some examples, acoustic signals satisfying an alarm condition may be represented via acoustic image data on a display within the portion of the scene having the associated alarm profile, whereas acoustic signals not satisfying an alarm condition are not presented within such a portion. In some embodiments, a user can receive notifications via a user interface, display, or the like integrated with the acoustic analysis system. Additionally or alternatively, other notification mechanisms may be used, such as a notification sent to a central station, through an operations management system, computerized maintenance management system, a smart device (e.g., tablet, phone, wearable device, computer, etc.), or the like.

In some embodiments, an alarm condition can include a hysteresis component. For example, in some embodiments, an alarm condition is satisfied if an acoustic parameter (e.g., an intensity for a given frequency range) meets a threshold value (e.g., in dB) a predetermined number of times within a given timeframe. In an example embodiment, an acoustic analysis system can detect an alarm condition if the acoustic intensity within a predetermined frequency range meets a predetermined intensity threshold more than 10 times in a day. Other numbers and time periods are possible. In some embodiments, such numbers and time periods can be selected by a user. In some examples, multiple such alarm conditions can be used simultaneously. For example, an alarm condition can be satisfied if an acoustic intensity meets a first threshold a first predetermined number of times, but also if the acoustic intensity meets a second threshold a second predetermined number of times. For instance, in addition to an alarm condition meeting a predetermined intensity threshold more than 10 times per day, an alarm condition could also be detected if the intensity meets a second, higher predetermined intensity threshold 5 times per day.

In some examples, a recency threshold can be used to generate an alarm condition based on intermittent signals such as discussed elsewhere herein. For instance, as described herein, in some examples, an acoustic analysis system can generate and display a display image having acoustic image data showing intermittent acoustic signals that are not present in real time, but were detected at a previous time. In some embodiments, such intermittent signals can satisfy an alarm condition, for example, having occurred within a predetermined range of times. Systems can be configured to include acoustic image data representing such acoustic signals, for example, as signals satisfying an alarm condition, even if such acoustic signals are not present at the time of generating or viewing the acoustic image data. Similarly, such timing (e.g., recency) thresholds can be used as a parameter in a multimodal alarm. For example, in some embodiments, systems can be configured to detect an alarm condition if an acoustic signal satisfied a threshold intensity within a recency threshold (e.g., within the past day, within the past hour, or the like).

In some embodiments, the locations of alarm conditions may be labeled on a display, such as on or near the portion of the acoustic image having the alarm condition. Additionally or alternatively, acoustic signals meeting alarm conditions may be labeled on a display, user interface, or the like. In various examples, labels can include information such as: a title/brief description (e.g., Pipe gasket, Motor 1); one or more values for acoustic parameters (e.g., dB level, frequency, or the like); historical minimum/maximum values for acoustic parameters; one or more alarm conditions (e.g., min value, max value, or the like); as well as alarm history, such as one or more times when an alarm condition was satisfied. In embodiments wherein an area/object comprises multiple alarm conditions, a label may include such multiple alarm conditions. Additionally or alternatively, a user may be able to toggle through each alarm condition, such as via a user interface. Similarly, in some embodiments, the acoustic analysis system can be configured to cycle through a plurality of such labels, providing labels to a user in a sequence.

In some examples, one or more acoustic profiles can be defined manually by a user and/or automatically selected or recommended by the acoustic analysis system. For instance, in some examples, the acoustic analysis system can determine an acoustic profile for one or more acoustic image portions based on objects located within the corresponding portion of the scene (e.g., including machines, vents, wires, other electronics, etc.). The acoustic analysis system can be configured to create such a profile, for example, by sampling the target scene over time to build such a profile (e.g., to establish a baseline "normal" sound profile). Additionally or alternatively, the system can access such a profile stored in memory or from a database (e.g., including information about how particular equipment behaves acoustically during normal operation).

In some embodiments, predefined acoustic criteria can be used based on locations of interest within each acoustic image portion. For instance, with reference to FIG. 21, acoustic image portion 2124 comprises acoustic signals for machinery closer to the acoustic analysis system compared to acoustic image portions 2120 and 2121. Acoustic image portion 2125 comprises acoustic signals for particular machinery. One or more such acoustic image portions may have different acoustic parameters of interest associated therewith. For example, certain machinery (e.g., in acoustic image portions 2120 and 2121) may be of interest when the acoustic signal is of a lower intensity than other machinery (e.g., in acoustic image portion 2124). In such an example, different acoustic profiles can be associated with such portions such that acoustic signals comprising lower intensities may be displayed on a display in acoustic image portions 2120 and 2121 than in acoustic image portion 2124. Similarly, different machinery in each such portion may have associated therewith one or more alarm conditions that can be implemented within the particular portion of the image (e.g., as incorporated into an associated acoustic profile). For example, the acoustic analysis system can be configured to provide a visual indication within portion 2120 when an acoustic signal in portion 2120 crosses a first intensity threshold and/or within portion 2124 when an acoustic signal in portion 2124 crosses a second threshold that is different from the first threshold. Furthermore, different acoustic parameters may be of interest when observing the equipment in portion 2125 (e.g., periodicity rather than intensity). As such, acoustic signals comprising different acoustic parameters may be displayed in image portion 2125.

As described herein, in some embodiments, acoustic image data for a given acoustic signal may be filtered according to one or more acoustic parameters based the portion of the acoustic image in which it is located. Such parameters can include, for example, intensity, frequency, periodicity, apparent proximity, measured proximity, sound pressure, particle velocity, particle displacement, sound power, sound energy, sound energy density, sound exposure, pitch, amplitude, brilliance, harmonics, rates of change of any such parameters, or the like. For example, a particular portion of the acoustic image may show acoustic image data representing acoustic signals having a particular frequency content, while another portion of the acoustic image can be configured to show only acoustic image data representing acoustic signals having intensity within a particular range. Additionally or alternatively, textual representations of one or more acoustic parameters can be included, wherein the parameters represented textually are based on acoustic profile associated with the portion of the image.

In some examples, a user may combine various acoustic parameters for defining an acoustic profile using any appropriate logical combinations, such as AND, OR, XOR, etc. For instance, a user may wish to display acoustic signals within acoustic image portions 2123, 2124, and 2126 which have an intensity within a first intensity range AND have a frequency within a first frequency range; and then (sequentially or concurrently) display acoustic signals within acoustic image portion 2125 having a second frequency range.

Similar to embodiments described elsewhere herein, in some examples, acoustic image portions (e.g., acoustic image portions 2120-2126) can be associated with different distances from the acoustic analysis system. For example, distance information can include three-dimensional depth information regarding various portions in the target scene. Additionally or alternatively, a user may be able to measure (e.g., with a laser distance tool) or manually input distance values associated with a plurality of locations in a target scene and/or plurality of acoustic image portions. In some examples, such different distance values for various portions of the scene can be used to adjust the back-propagation calculations at such locations to accommodate the specific distance value at that location or within that acoustic image portion.

Various functionalities of components described herein can be combined. In some embodiments, features described in this application can be combined with features described in the following applications, each of which was filed on Jul. 24, 2019, and is assigned to the assignee of the instant application and which is incorporated herein by reference:

PCT Application entitled "SYSTEMS AND METHODS FOR PROJECTING AND DISPLAYING ACOUSTIC DATA," having WIPO Publication No. WO2020/023622;

PCT Application entitled "SYSTEMS AND METHODS FOR TAGGING AND LINKING ACOUSTIC IMAGES," having WIPO Publication No. WO2020/023633;

PCT Application entitled "SYSTEMS AND METHODS FOR DETACHABLE AND ATTACHABLE ACOUSTIC IMAGING SENSORS," having WIPO Publication No. WO2020/023631;

PCT Application entitled "SYSTEMS AND METHODS FOR ANALYZING AND DISPLAYING ACOUSTIC DATA," having WIPO Publication No. WO2020/023627; and PCT Application entitled "SYSTEMS AND METHODS FOR REPRESENTING ACOUSTIC SIGNATURES FROM A TARGET SCENE," having WIPO Publication No. WO2020/023629.

Additionally or alternatively, features of this disclosure can be used in combination with features described in any one or more of the following patent applications, filed concurrently herewith and assigned to the assignee of the instant application, each of which is incorporated herein by reference:

U.S. Application No. 63/077,441, filed Sep. 11, 2020, entitled SYSTEMS AND METHODS FOR GENERATING PANORAMIC AND/OR SEGMENTED ACOUSTIC IMAGES;

U.S. Application No. 63/077,445, filed Sep. 11, 2020, entitled ACOUSTIC IMAGING WITH ACCUMULATED-TIME VIEW; and U.S. Application No. 63/077,449, filed Sep. 11, 2020, entitled SYSTEMS AND METHODS FOR GENERATING PANORAMIC AND/OR SEGMENTED ACOUSTIC IMAGES.

Various examples of embodiments have been described. Such examples are non-limiting, and do not define or limit the scope of the invention in any way.

For example, various embodiments of the acoustic analysis system described herein may include any of the following features, individually or in any combination: an acoustic sensor array comprising a plurality of acoustic sensor elements, each of the plurality of acoustic sensor elements being configured to receive acoustic signals from a target scene and output acoustic data based on the received acoustic signals; a display; a processor in communication with the acoustic sensor array; a processor in communication with the acoustic sensor array and the display; the processor configured to receive a first set of acoustic data, the first set of acoustic data representing a first portion of the target scene and having a first field of view (FOV), generate a first acoustic image based on the received first set of acoustic data; the processor configured to receive a second set of acoustic data, the second set of acoustic data representing a second portion of the target scene and having a second FOV, wherein the second FOV is different than the first FOV; generate a second acoustic image based on the received second set of acoustic data; register the first acoustic image and the second acoustic image to form an aligned first acoustic image and an aligned second acoustic image; generate a panorama comprising the aligned first acoustic image and the second acoustic image; and present the panorama on the display.

The acoustic analysis system may further comprise an electromagnetic imaging tool configured to generate electromagnetic image data of a target scene, wherein the processor is in communication with the electromagnetic imaging tool and is configured to receive first electromagnetic image data from the electromagnetic imaging tool and combine the electromagnetic image data and acoustic image data to create a display image.

Various embodiments of the acoustic analysis system may further include any of the following features, individually or in any combination: wherein the panorama comprises electromagnetic image data; a housing configured to support elements such as the acoustic sensor array, the electromagnetic imaging tool, the display, and the processor; wherein the first acoustic image and the second acoustic image comprise an overlapping portion within the target scene, the overlapping portion having acoustic information from the first set of acoustic data and the second set of acoustic data; wherein the processor is further configured to determine a first set of predefined acoustic criteria and determine a second set of predefined acoustic criteria, wherein the displayed panorama comprises: acoustic image data within the first acoustic image data representing acoustic signals satisfying the first set of predefined acoustic criteria and acoustic image data within the second acoustic image only representing acoustic signals satisfying the second set of predefined acoustic criteria; wherein the acoustic sensor array is configured to capture acoustic signals comprising the first set of predefined acoustic criteria in the first set of acoustic data and capture acoustic signals satisfying the second set of predefined acoustic criteria in the second set of acoustic data; wherein the first set of predefined acoustic criteria comprises one or more frequency ranges, one or more decibel ranges, one or more distance to target ranges, and/or one or more periodicity ranges; and the second set of predefined acoustic criteria comprises one or more frequency ranges, one or more decibel ranges, one or more distance to target ranges, and/or one or more periodicity ranges.

Additionally, the acoustic analysis system may be handheld by a user; wherein the user positions the acoustic analysis system to capture the first FOV for the first set of acoustic data and the second FOV for the second set of acoustic data; wherein the acoustic analysis system further comprises an adjustment mechanism, wherein the adjustment mechanism is configured to position the acoustic analysis system to capture the first FOV for the first set of acoustic data, and position the acoustic analysis system to capture the second FOV for the second set of acoustic data; wherein the processor is in communication with the adjustment mechanism and is configured to receive a first set of position information regarding the position of the acoustic analysis system for the first FOV, and receive a second set of position information regarding the position of the acoustic analysis system for the second FOV, wherein registering the first register the first acoustic image and the second acoustic image is based on the first set of position information and the second set of position information; and wherein the adjustment mechanism comprises a linear movement system, a pan and tilt system, and/or a 360 degree rotation system.

The processor of the acoustic analysis system may be configured to receive an updated first set of acoustic data, the updated first set of acoustic data representing the first portion of the target scene and captured at a different time than the first set of acoustic data, generate an updated first acoustic image based on the received first set of acoustic data, register the updated first acoustic image and the second acoustic image, and generate an updated panorama including the updated first acoustic image data and the second acoustic image.

The acoustic analysis system may further comprise an indication on the display that represents when the first acoustic image has been last updated, and/or a user interface; wherein the processor is further configured to toggle between the updated panorama and a previous panorama based on a received input via the user interface; wherein the processor is further configured to receive an updated second set of acoustic data, the updated second set of acoustic data representing the second portion of the target scene and captured at a different time than the second set of acoustic data; generate an updated second acoustic image based on the received second set of acoustic data; register the updated first acoustic image and the updated second acoustic image; generate a second updated panorama comprising the registered updated first acoustic image data and updated second acoustic image data portion; and present the updated panorama on the display.

In some cases, the acoustic analysis system is configured to receive one or more beacon acoustic signals that are emitted from the target scene, and at least one of the first FOV and the second FOV are designated based on the locations of one or more beacon acoustic signals; wherein the one or more beacon acoustic signals comprises a predetermined acoustic signal; wherein the one or more beacon acoustic signals are distinguishable from other acoustic signals in the target scene; wherein the one or more beacon acoustic signals comprise acoustic parameters which are different than other acoustic signals in the target scene.

The acoustic analysis system may further comprise one or more beacon devices positioned in the target scene, wherein the one or more beacon devices are configured to emit the one or more beacon acoustic signals. The one or more beacon acoustic signals are located in both the first acoustic image and the second acoustic image. The first acoustic image and the second acoustic image are registered by aligning the one or more beacon acoustic signals.

The processor of the acoustic analysis system may be configured to determine a freshness value for acoustic image data in the panorama representing relative recency of the acoustic image data and indicate the freshness data on the display such that acoustic image data captured more recently is visually disguisable from acoustic image data captured less recently; wherein at least one of the first acoustic image data portion and the second acoustic image data portion comprise a plurality of acoustic image frames; and wherein the acoustic analysis system is positioned such that the current FOV of the acoustic sensor array is the first FOV, and the first acoustic image data portion comprises a plurality of acoustic image frames.

Additional embodiments of the acoustic analysis system described herein may include any of the following features, individually or in any combination: an acoustic sensor array comprising a plurality of acoustic sensor elements, each of the plurality of acoustic sensor elements being configured to receive acoustic signals from a target scene and output acoustic data based on the received acoustic signals; a display; a processor in communication with the acoustic sensor array and the display; the processor configured to receive the acoustic data from the acoustic sensor array; generate acoustic image data of the target scene based on the received acoustic data; partition the acoustic image data into a plurality of acoustic image portions, the plurality of acoustic image portions comprising a first acoustic image portion and a second acoustic image portion, wherein the first acoustic image portion is different than the second acoustic image portion; determine a first set of predefined acoustic criteria; determine a second set of predefined acoustic criteria; generate a display image, wherein generating the display image comprises visually contrasting the acoustic image data within the first acoustic image portion satisfying the first set of predefined acoustic parameters from acoustic image data within the first acoustic image portion not satisfying the first set of predefined acoustic criteria; visually contrasting acoustic image data within the second acoustic image portion satisfying the second set of predefined acoustic criteria and the acoustic image data within the second acoustic image portion not satisfying the second set of predefined acoustic criteria; and present the display image on the display.

The acoustic analysis system may further include any of the following features, individually or in any combination: wherein partitioning the acoustic image data into a plurality of acoustic image portions comprises receiving a selection of the first acoustic image portion and receiving a selection of the second acoustic image portion; wherein receiving the selection of the first acoustic image portion comprises receiving a first selection from a user via a user interface; and receiving the selection of the second acoustic image portion comprises receiving a second selection from the user via the user interface; wherein determining the first set of predefined acoustic criteria comprises receiving the first set of predefined acoustic criteria from a user via a user interface, and determining the second set of predefined acoustic criteria comprises receiving the second set of predefined acoustic criteria from the user via the user interface; wherein visually contrasting the acoustic image data within the first acoustic image portion satisfying the first set of predefined acoustic parameters from acoustic image data within the first acoustic image portion not satisfying the first set of predefined acoustic criteria comprises displaying acoustic image data within the first acoustic image portion for acoustic signals satisfying the first set of predefined acoustic criteria while not displaying acoustic image data within the first acoustic image portion for acoustic signals not satisfying the first set of predefined acoustic criteria; wherein the first acoustic image portion comprises acoustic image data from a first field of view and the second acoustic image portion comprises acoustic image data from a second field of view; and wherein the display image comprises a panorama comprising acoustic image data from the first field of view and the second field of view.

The acoustic analysis system may further comprise features, individually or in any combination, wherein at least one of the first acoustic image portion and the second acoustic image portion comprises a plurality of acoustic image frames; wherein the first set of predefined acoustic criteria comprises one or more frequency ranges such that acoustic signals not within any of the one or more frequency ranges do not satisfy the first set of predefined criteria; wherein the first set of predefined acoustic criteria comprises a first decibel range and a first frequency range such that acoustic signals not within the first decibel range or not within the first frequency range do not satisfy the first set of predefined acoustic criteria; wherein the first set of predefined acoustic criteria correspond to a predetermined acoustic signature; wherein the first set of predefined acoustic criteria comprise one or more alarm profiles associated with the first acoustic image portion; wherein the one or more alarm profiles corresponding to an object within the first acoustic image portion; and wherein the one or more alarm profiles are associated with a predetermined location within the first acoustic image portion.

Further embodiments of the acoustic analysis system described herein may include any of the following features, individually or in any combination: an acoustic sensor array comprising a plurality of acoustic sensor elements, each of the plurality of acoustic sensor elements being configured to receive acoustic signals from a target scene and output acoustic data based on the received acoustic signals; a processor in communication with the acoustic sensor array and configured to receive the acoustic data from the acoustic sensor array; generate acoustic image data of the target scene based on the received acoustic data; partition the acoustic image data into a plurality of acoustic image portions; associate, with each of the plurality of acoustic image portions, an acoustic profile, each acoustic profile comprising one or more predefined acoustic criteria; generate a display image comprising, for each of the plurality of acoustic image portions, acoustic image data representing acoustic signals satisfying the one or more predefined acoustic criteria corresponding to the acoustic profile associated with the acoustic image portion, wherein such acoustic image data is presented within the corresponding acoustic image portion in a distinguishing way from acoustic signals not satisfying the one or more predefined acoustic criteria corresponding to the acoustic profile.

Additionally, the acoustic analysis system may further comprise an electromagnetic imaging tool in communication with the processor and configured to generate electromagnetic image data of a target scene, wherein the processor is configured to receive electromagnetic image data from the electromagnetic imaging tool, and register the electromagnetic image data and the acoustic image data; wherein the display image comprises electromagnetic image data and acoustic image data; further comprise a display in communication with the processor, wherein the processor is configured to present the display image on the display; may further comprise a user interface, wherein the processor is configured to receive an input from the user interface defining the one or more acoustic image portions; wherein the processor is configured to recognize one or more features within the received electromagnetic image data and designate at least one portion of the acoustic image data based on the recognized one or more features; wherein a single acoustic profile is associated with multiple acoustic image portions; wherein at least one acoustic profile includes one or more alarm conditions; wherein presenting acoustic image data satisfying the one or more predefined acoustic criteria corresponding to an acoustic profile within an acoustic image portion in a distinguishing way from acoustic signals not satisfying the one or more predefined acoustic criteria corresponding to the acoustic profile comprises not displaying acoustic image data in the acoustic image portion that does not satisfy the one or more predefined acoustic criteria of the acoustic profile associated with the portion; wherein the processor is further configured to sample acoustic data from the target scene over time, and automatically partition the acoustic image data into a plurality of acoustic image portions based on the sampling of the acoustic data over time; and wherein the processor is further configured to define at least one acoustic profile associated with one of the plurality of acoustic image portions based on the sampling of the acoustic data over time.

The various embodiments described above can be combined to provide yet further embodiments. All of the U.S. and foreign patents, patent application publications, and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An acoustic analysis system comprising:
   an acoustic sensor array configured to receive one or more acoustic signals emitted from a target scene and output acoustic data based on the one or more acoustic signals; and
   a processor in communication with the acoustic sensor array, the processor configured to:
      receive a first set of acoustic data representing a first portion of the target scene and having a first field of view (FOV);
      generate a first acoustic image based on the first set of acoustic data;
      receive a second set of acoustic data representing a second portion of the target scene and having a second FOV, wherein the second FOV is different than the first FOV;
      generate a second acoustic image based on the second set of acoustic data;
      register the first acoustic image and the second acoustic image to form an aligned first acoustic image and second acoustic image; and
      generate a panorama comprising the aligned first acoustic image and second acoustic image,
   wherein one or more beacon acoustic signals are emitted from the target scene, and at least one of the first FOV or the second FOV is based on a location of the one or more beacon acoustic signals.

2. The acoustic analysis system of claim 1, further comprising an electromagnetic imaging tool configured to generate electromagnetic image data of the target scene,
   wherein the processor is in communication with the electromagnetic imaging tool and is configured to:
      receive electromagnetic image data from the electromagnetic imaging tool and generate an electromagnetic image based on the electromagnetic image data; and
      combine the electromagnetic image and the first acoustic image in the panorama.

3. The acoustic analysis system of claim 1, wherein the first acoustic image and the second acoustic image comprise an overlapping portion within the target scene, the overlapping portion having acoustic information from the first set of acoustic data and the second set of acoustic data.

4. The acoustic analysis system of claim 1, wherein the processor is further configured to:
   determine a first set of predefined acoustic criteria; and
   determine a second set of predefined acoustic criteria;
   wherein the panorama comprises:
      acoustic image data within the first acoustic image representing acoustic signals satisfying the first set of predefined acoustic criteria; and
      acoustic image data within the second acoustic image representing acoustic signals satisfying the second set of predefined acoustic criteria,
      wherein the first set of predefined acoustic criteria or the second set of predefined acoustic criteria comprises one or more frequency ranges, one or more decibel ranges, one or more distance to target ranges, and/or one or more periodicity ranges.

5. The acoustic analysis system of claim 1, further comprising an adjustment mechanism configured to position the acoustic analysis system to capture the first set of acoustic data having the first FOV, and position the acoustic analysis system to capture the second set of acoustic data having the second FOV.

6. The acoustic analysis system of claim 5, wherein the processor is in communication with the adjustment mechanism, and is configured to:
   receive a first set of position information to adjust the acoustic analysis system to capture the first set of acoustic data having the first FOV;
   receive a second set of position information to adjust the acoustic analysis system to capture the second set of acoustic data having the second FOV; and
   register the first acoustic image and the second acoustic image based on the first set of position information and the second set of position information.

7. The acoustic analysis system of claim 1, wherein the processor is further configured to:
- receive an updated first set of acoustic data representing the first portion of the target scene and captured at a different time than the first set of acoustic data;
- generate an updated first acoustic image based on the updated first set of acoustic data;
- register the updated first acoustic image and the second acoustic image to form an aligned updated first acoustic image and second acoustic image; and
- generate an updated panorama including the aligned updated first acoustic image and second acoustic image.

8. The acoustic analysis system of claim 7, further comprising a user interface, wherein the processor is further configured to toggle between displaying the updated panorama and a previous panorama based on user input received via the user interface.

9. The acoustic analysis system of claim 7, wherein the processor is further configured to:
- receive an updated second set of acoustic data representing the second portion of the target scene and captured at a different time than the second set of acoustic data;
- generate an updated second acoustic image based on the updated second set of acoustic data;
- register the updated first acoustic image and the updated second acoustic image to form an aligned updated first acoustic image and updated second acoustic image; and
- generate the updated panorama including the aligned updated first acoustic image and updated second acoustic image.

10. The acoustic analysis system of claim 1, wherein:
- the one or more beacon acoustic signals are located in both the first acoustic image and the second acoustic image; and
- registering the first acoustic image and the second acoustic image includes aligning the one or more beacon acoustic signals in the first acoustic image and the second acoustic image.

11. The acoustic analysis system of claim 1, wherein the processor is configured to determine a freshness value for acoustic image data in the panorama representing a relative recency of the acoustic image data and indicate the freshness value on the display such that acoustic image data captured more recently is visually disguisable from acoustic image data captured less recently.

12. The acoustic analysis system of claim 1, wherein the acoustic analysis system is positioned such that a current FOV of the acoustic sensor array is the first FOV, and the first acoustic image includes a plurality of acoustic image frames.

13. The acoustic analysis system of claim 1, wherein the one or more beacon acoustic signals comprise a predetermined acoustic signal.

14. The acoustic analysis system of claim 1, wherein the one or more beacon acoustic signals are distinguishable from other acoustic signals in the target scene.

15. The acoustic analysis system of claim 1, further comprising one or more beacons positioned in the target scene, wherein the one or more beacons are configured to emit the one or more beacon acoustic signals.

16. The acoustic analysis system of claim 1, at least one of the first acoustic image or the second acoustic image comprise a plurality of acoustic image frames.

17. A method for acoustic analysis of a target scene, comprising:
- positioning an acoustic sensor array to output acoustic data having a first field of view (FOV) of the target scene;
- receiving a first set of acoustic data representing a first portion of the target scene and having the first FOV;
- generating a first acoustic image based on the first set of acoustic data;
- repositioning the acoustic sensor array to output acoustic data having a second FOV of the target scene, wherein the second FOV is different than the first FOV;
- receiving a second set of acoustic data representing a second portion of the target scene and having the second FOV;
- generating a second acoustic image based on the second set of acoustic data;
- receiving one or more beacon acoustic signals from the target scene;
- aligning the first acoustic image and the second acoustic image to form an aligned first acoustic image and second acoustic image, wherein the first acoustic image and the second acoustic image are aligned by aligning the one or more beacon acoustic; and
- generating a panorama comprising the aligned first acoustic image and second acoustic image.

18. The method of claim 17, wherein the one or more beacon acoustic signals are located in both the first acoustic image and the second acoustic image.

19. The method of claim 17, wherein the acoustic sensor array is automatically positioned or repositioned by a motorized movement mechanism that adjusts a field of view of the acoustic sensor array.

20. An acoustic analysis system comprising:
- an acoustic sensor array configured to receive one or more acoustic signals emitted from a target scene and output acoustic data based on the one or more acoustic signals; and
- a processor in communication with the acoustic sensor array, the processor configured to:
  - receive a first set of acoustic data representing a first portion of the target scene and having a first field of view (FOV);
  - generate a first acoustic image based on the first set of acoustic data;
  - receive a second set of acoustic data representing a second portion of the target scene and having a second FOV, wherein the second FOV is different than the first FOV;
  - generate a second acoustic image based on the second set of acoustic data;
  - register the first acoustic image and the second acoustic image to form an aligned first acoustic image and second acoustic image; and
  - generate a panorama comprising the aligned first acoustic image and second acoustic image;
- wherein the processor is further configured to:
  - receive an updated first set of acoustic data representing the first portion of the target scene and captured at a different time than the first set of acoustic data;
  - generate an updated first acoustic image based on the updated first set of acoustic data;
  - register the updated first acoustic image and the second acoustic image to form an aligned updated first acoustic image and second acoustic image; and
  - generate an updated panorama in which the updated first acoustic image replaces the first acoustic image, the updated panorama comprising the aligned updated first acoustic image and second acoustic image.

21. The acoustic analysis system of claim 20, further comprising a user interface, wherein the processor is further configured to toggle between displaying the updated panorama and a previous panorama based on user input received via the user interface.

22. The acoustic analysis system of claim 20, wherein the processor is further configured to:
receive an updated second set of acoustic data representing the second portion of the target scene and captured at a different time than the second set of acoustic data;
generate an updated second acoustic image based on the updated second set of acoustic data;
register the updated first acoustic image and the updated second acoustic image to form an aligned updated first acoustic image and updated second acoustic image; and
generate a further updated panorama in which the updated second acoustic image replaces the second acoustic image, the further updated panorama comprising the aligned updated first acoustic image and updated second acoustic image.

23. The acoustic analysis system of claim 20, wherein one or more beacon acoustic signals are emitted from the target scene, and at least one of the first FOV or the second FOV is based on a location of the one or more beacon acoustic signals.

24. The acoustic analysis system of claim 23, wherein:
the one or more beacon acoustic signals are located in both the first acoustic image and the second acoustic image; and
registering the first acoustic image and the second acoustic image includes aligning the one or more beacon acoustic signals in the first acoustic image and the second acoustic image.

\* \* \* \* \*